US012798962B2

(12) United States Patent
Raynel et al.

(10) Patent No.: US 12,798,962 B2
(45) Date of Patent: Nov. 17, 2026

(54) HYDROGEN PRODUCTION BY SULFUR STEAM REFORMING

(71) Applicant: Saudi Arabian Oil Company, Dhahran (SA)

(72) Inventors: Guillaume Robert Jean-Francois Raynel, Dhahran (SA); Sebastien A. Duval, Dhahran (SA); Jose Choy Pernia, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 981 days.

(21) Appl. No.: 17/946,413

(22) Filed: Sep. 16, 2022

(65) Prior Publication Data

US 2024/0109772 A1 Apr. 4, 2024

(51) Int. Cl.

*C01B 3/06* (2026.01)
*B01D 53/00* (2006.01)
(Continued)

(52) U.S. Cl.

CPC .............. *C01B 3/06* (2013.01); *B01D 53/002* (2013.01); *B01D 53/1468* (2013.01); *B01D 53/1481* (2013.01); *B01D 53/265* (2013.01); *B01D 53/8615* (2013.01); *B01J 19/0013* (2013.01); *B01J 19/245* (2013.01); *B01J 19/2465* (2013.01); *C01B 3/506* (2013.01); *C01B 3/52* (2013.01); *B01D 2252/103* (2013.01); *B01D 2252/204* (2013.01); *B01J 2219/00157* (2013.01); *C01B 2203/0415* (2013.01); *C01B 2203/046* (2013.01); *C01B 2203/0485* (2013.01); *C01B 2203/148* (2013.01)

(58) Field of Classification Search

None

See application file for complete search history.

(56) References Cited

U.S. PATENT DOCUMENTS 2,221,518 A 11/1940 Jennings
2,383,674 A 8/1945 Osborne
(Continued)

FOREIGN PATENT DOCUMENTS

AU 2004204512 7/2004
AU 2016214075 2/2020
(Continued)

OTHER PUBLICATIONS

Chegg, Sulfur reacts with steam to produce the sulfur dioxide and hydrogen gases, 2020 (Chegg), https://www.chegg.com/homework-help/questions-and-answers/sulfur-reacts-steam-produce-sulfur-dioxide-hydrogen-gases-shown-equation-s-s-2-h20-9-so2-g-q61496626 (Year: 2020).*
(Continued)

*Primary Examiner* — Keling Zhang
(74) *Attorney, Agent, or Firm* — DINSMORE & SHOHL LLP

(57) ABSTRACT

A system and method for producing hydrogen, including steam reforming elemental sulfur to generate hydrogen gas and sulfur dioxide, to give a mixture including hydrogen gas, sulfur dioxide, elemental sulfur gas, and water vapor, removing the elemental sulfur gas to give a process gas including the hydrogen gas, sulfur dioxide, and water vapor, and isolating the hydrogen gas or a hydrogen gas rich stream.

16 Claims, 19 Drawing Sheets

(51) Int. Cl.

| | |
|---|---|
| ***B01D 53/14*** | (2006.01) |
| ***B01D 53/26*** | (2006.01) |
| ***B01D 53/86*** | (2006.01) |
| ***B01J 19/00*** | (2006.01) |
| ***B01J 19/24*** | (2006.01) |
| ***C01B 3/506*** | (2026.01) |
| ***C01B 3/52*** | (2006.01) |

(56) References Cited

U.S. PATENT DOCUMENTS

| | | | |
|---|---|---|---|
| 2,499,370 | A | 3/1950 | De Groote et al. |
| 2,557,081 | A | 6/1951 | De Groote et al. |
| 2,602,053 | A | 7/1952 | De Groote et al. |
| 2,711,388 | A | 6/1955 | Mottern et al. |
| 2,758,477 | A | 8/1956 | Albert |
| 2,825,026 | A | 2/1958 | Holaday et al. |
| 2,979,384 | A | 4/1961 | Weiner et al. |
| 3,133,437 | A | 5/1964 | Remke |
| 3,222,918 | A | 12/1965 | Kuntz |
| 3,462,596 | A | 8/1969 | Saunders |
| 3,528,775 | A | 9/1970 | Siegfriedt |
| 3,539,917 | A | 11/1970 | Chleck |
| 3,546,926 | A | 12/1970 | Dunavent, jr. et al. |
| 3,553,576 | A | 1/1971 | Petitjean |
| 3,684,735 | A | 8/1972 | De Groote et al. |
| 3,727,049 | A | 4/1973 | Saunders |
| 3,752,877 | A | 8/1973 | Beavon |
| 3,778,706 | A | 12/1973 | Thompson |
| 3,806,435 | A | 4/1974 | Ohta |
| 3,982,564 | A | 9/1976 | Clabburn et al. |
| 4,001,386 | A | 1/1977 | Klein et al. |
| 4,034,219 | A | 7/1977 | Louden et al. |
| 4,084,306 | A | 4/1978 | Barker |
| 4,157,247 | A | 6/1979 | Collins, III et al. |
| 4,178,358 | A | 12/1979 | Smith et al. |
| 4,180,457 | A | 12/1979 | Popp et al. |
| 4,207,304 | A | 6/1980 | Beavon |
| 4,253,928 | A | 3/1981 | Blutas et al. |
| 4,301,400 | A | 11/1981 | Paap |
| 4,302,434 | A | 11/1981 | Hellmer et al. |
| 4,428,839 | A | 1/1984 | Davies et al. |
| 4,430,317 | A | 2/1984 | Reed et al. |
| 4,466,946 | A | 8/1984 | Goddin, Jr. et al. |
| 4,481,130 | A | 11/1984 | Robertson |
| 4,526,662 | A | 7/1985 | Bylery et al. |
| 4,537,701 | A | 8/1985 | Oppenlaender et al. |
| 4,543,191 | A | 9/1985 | Stewart et al. |
| 4,581,134 | A | 4/1986 | Richter, Jr. et al. |
| 4,589,896 | A | 5/1986 | Chen et al. |
| 4,592,849 | A | 6/1986 | McMillen |
| 4,627,458 | A | 12/1986 | Prasad |
| 4,701,187 | A | 10/1987 | Choe |
| 4,717,407 | A | 1/1988 | Choe et al. |
| 4,737,265 | A | 4/1988 | Merchant, Jr. et al. |
| 4,742,304 | A | 5/1988 | Schnall et al. |
| 4,765,407 | A | 8/1988 | Yuvancic et al. |
| 4,797,550 | A | 1/1989 | Nelson et al. |
| 4,818,410 | A | 4/1989 | Bellos et al. |
| 4,826,670 | A | 5/1989 | Hegarty |
| 4,959,160 | A | 9/1990 | Lake |
| 4,961,858 | A | 10/1990 | Spei et al. |
| 4,995,952 | A | 2/1991 | Dandapani et al. |
| 5,023,069 | A | 6/1991 | Serrand |
| 5,035,065 | A | 7/1991 | Parkinson |
| 5,067,345 | A | 11/1991 | Mougne |
| 5,089,781 | A | 2/1992 | Arichika et al. |
| 5,187,101 | A | 2/1993 | Kato |
| 5,246,597 | A | 9/1993 | Jenson et al. |
| 5,256,305 | A | 10/1993 | Hart |
| 5,259,239 | A | 11/1993 | Gaisford |
| 5,294,553 | A | 3/1994 | Kawahara |
| 5,353,237 | A | 10/1994 | Bass et al. |
| 5,381,002 | A | 1/1995 | Morrow et al. |
| 5,401,300 | A | 3/1995 | Lokhandwala et al. |
| 5,407,466 | A | 4/1995 | Lokhandwala et al. |
| 5,407,467 | A | 4/1995 | Lokhandwala et al. |
| 5,431,877 | A | 7/1995 | Brucken et al. |
| 5,454,258 | A | 10/1995 | Capuano |
| 5,531,865 | A | 7/1996 | Cole |
| 5,632,803 | A | 5/1997 | Stoner |
| 5,693,257 | A | 12/1997 | Hart |
| 5,837,032 | A | 11/1998 | Moll et al. |
| 5,843,395 | A | 12/1998 | Wang |
| 5,885,424 | A | 3/1999 | Davis et al. |
| 6,039,880 | A | 3/2000 | Morataya |
| 6,096,239 | A | 8/2000 | Fung et al. |
| 6,153,656 | A | 11/2000 | Bourg |
| 6,168,702 | B1 | 1/2001 | Varadaraj et al. |
| 6,179,900 | B1 | 1/2001 | Behling et al. |
| 6,241,871 | B1 | 6/2001 | Donini et al. |
| 6,352,680 | B1 | 3/2002 | Watson et al. |
| 6,361,582 | B1 | 3/2002 | Pinnau et al. |
| 6,364,940 | B1 | 4/2002 | Prueter et al. |
| 6,402,813 | B2 | 6/2002 | Monereau et al. |
| 6,403,051 | B1 | 6/2002 | Keller |
| 6,451,252 | B1 | 9/2002 | Ruan et al. |
| 6,555,009 | B2 | 4/2003 | Varadaraj |
| 6,614,242 | B2 | 9/2003 | Matter et al. |
| 6,656,249 | B1 | 12/2003 | Buisnnan |
| 6,896,717 | B2 | 5/2005 | Pinnau et al. |
| 7,036,531 | B2 | 5/2006 | Manini et al. |
| 7,306,735 | B2 | 12/2007 | Baggott et al. |
| 7,469,188 | B2 | 12/2008 | Wee |
| 7,901,646 | B2 | 3/2011 | Ayala et al. |
| 7,976,710 | B2 | 7/2011 | Minhas et al. |
| 8,043,418 | B2 | 10/2011 | Ruud et al. |
| 8,101,086 | B2 | 1/2012 | Varadaraj et al. |
| 8,115,481 | B2 | 2/2012 | Chen |
| 8,197,673 | B2 | 6/2012 | Khan |
| 8,323,392 | B2 | 12/2012 | Jones |
| 8,361,200 | B2 | 1/2013 | Sayaryi et al. |
| 8,397,765 | B2 | 3/2013 | Jackson et al. |
| 8,524,184 | B2 | 9/2013 | Iyengar et al. |
| 8,551,199 | B2 | 10/2013 | Thacker et al. |
| 8,617,509 | B1 | 12/2013 | Rameshni et al. |
| 8,685,236 | B2 | 4/2014 | Miller |
| 8,716,689 | B2 | 5/2014 | Chen et al. |
| 8,722,003 | B1 | 5/2014 | Avagliano et al. |
| 8,790,509 | B2 | 7/2014 | Vu |
| 8,805,587 | B1 | 8/2014 | Elshafei et al. |
| 8,828,121 | B1 | 9/2014 | He et al. |
| 9,092,124 | B2 | 7/2015 | Amminudin et al. |
| 9,096,805 | B2 | 8/2015 | Williams |
| 9,149,761 | B2 | 10/2015 | Northrop et al. |
| 9,157,035 | B1 | 10/2015 | Ball, IV et al. |
| 9,181,499 | B2 | 11/2015 | Mason et al. |
| 9,242,859 | B2 | 1/2016 | Molinari et al. |
| 9,244,017 | B2 | 1/2016 | Cadieux et al. |
| 9,295,957 | B2 | 3/2016 | Choi et al. |
| 9,399,866 | B2 | 7/2016 | Alawadhi |
| 9,435,571 | B2 | 9/2016 | Ghoshal et al. |
| 9,448,221 | B2 | 9/2016 | Duval et al. |
| 9,493,712 | B2 | 11/2016 | Barroeta et al. |
| 9,555,345 | B2 | 1/2017 | Al-Shafei et al. |
| 9,708,196 | B2 | 7/2017 | Brenize et al. |
| 9,731,974 | B2 | 8/2017 | Weiss et al. |
| 9,861,910 | B2 | 1/2018 | Hammad et al. |
| 9,863,571 | B2 | 1/2018 | Critsinelis et al. |
| 9,927,169 | B2 | 3/2018 | Baker et al. |
| 9,943,802 | B1 | 4/2018 | Ballaguet et al. |
| 10,024,835 | B2 | 7/2018 | Sreekumar |
| 10,106,410 | B2 | 10/2018 | Ballaguet et al. |
| 10,106,411 | B2 | 10/2018 | Ballaguet et al. |
| 10,188,988 | B2 | 1/2019 | Debrock et al. |
| 10,197,545 | B2 | 2/2019 | Sreekumar et al. |
| 10,260,007 | B2 | 4/2019 | Barroeta et al. |
| 10,260,010 | B2 | 4/2019 | Soliman |
| 10,365,049 | B2 | 7/2019 | Tso et al. |
| 10,386,284 | B2 | 8/2019 | Zhang |
| 10,472,576 | B2 | 11/2019 | Salu et al. |
| 10,479,684 | B2 | 11/2019 | Ballaguet et al. |
| 10,508,033 | B2 | 12/2019 | Ballaguet et al. |
| 10,513,663 | B2 | 12/2019 | Soliman et al. |
| 10,525,404 | B2 | 1/2020 | Ingram et al. |

(56) References Cited

U.S. PATENT DOCUMENTS

| | | | |
|---|---|---|---|
| 10,589,223 | B1 | 3/2020 | Raynel et al. |
| 10,654,719 | B2 | 5/2020 | Molinari et al. |
| 10,662,061 | B1 | 5/2020 | Lithoxoos et al. |
| 10,765,995 | B2 | 9/2020 | Hamad et al. |
| 10,889,766 | B2 | 1/2021 | Barreau et al. |
| 11,008,521 | B1 | 5/2021 | Raynel et al. |
| 11,112,190 | B2 | 9/2021 | Villette et al. |
| 11,130,094 | B2 | 9/2021 | Ingram et al. |
| 11,131,660 | B2 | 9/2021 | Ahmed et al. |
| 11,148,962 | B2 | 10/2021 | Alghunaimi et al. |
| 11,241,652 | B2 | 2/2022 | Ernst et al. |
| 11,247,919 | B2 | 2/2022 | Raynel |
| 11,548,784 | B1 | 1/2023 | Raynel et al. |
| 2003/0082096 | A1 | 5/2003 | Lynn |
| 2003/0099594 | A1 | 5/2003 | Lyon |
| 2005/0158235 | A1 | 7/2005 | Ramani et al. |
| 2005/0217479 | A1 | 10/2005 | Hale et al. |
| 2006/0186340 | A1 | 8/2006 | Lievois |
| 2006/0286675 | A1 | 12/2006 | Coleman |
| 2007/0183953 | A1 | 8/2007 | Kerley et al. |
| 2009/0166028 | A1 | 7/2009 | Varadaraj et al. |
| 2009/0179636 | A1 | 7/2009 | Chen |
| 2009/0321323 | A1 | 12/2009 | Sharma et al. |
| 2010/0230296 | A1 | 9/2010 | Northrop |
| 2010/0260551 | A1 | 10/2010 | Jespersen et al. |
| 2010/0264014 | A1 | 10/2010 | Mignon et al. |
| 2011/0073206 | A1 | 3/2011 | Na |
| 2011/0138854 | A1 | 6/2011 | Huang et al. |
| 2011/0185896 | A1 | 8/2011 | Sethna et al. |
| 2011/0194105 | A1 | 8/2011 | LaFrancois et al. |
| 2011/0268650 | A1 | 11/2011 | Lamar et al. |
| 2011/0309463 | A1 | 12/2011 | Kruglick |
| 2012/0012804 | A1 | 1/2012 | Chen |
| 2012/0111051 | A1 | 5/2012 | Kulkarni et al. |
| 2012/0168154 | A1 | 7/2012 | Chinn et al. |
| 2012/0273367 | A1 | 11/2012 | Themy et al. |
| 2012/0308474 | A1 | 12/2012 | Rameshni et al. |
| 2012/0323059 | A1 | 12/2012 | Liu et al. |
| 2013/0026082 | A1 | 1/2013 | Al-Shafei et al. |
| 2013/0104772 | A1 | 5/2013 | Schabron et al. |
| 2013/0110411 | A1 | 5/2013 | Black et al. |
| 2013/0213892 | A1 | 8/2013 | Henthorne et al. |
| 2013/0277551 | A1 | 10/2013 | Bourrel et al. |
| 2014/0246382 | A1 | 9/2014 | Matza et al. |
| 2014/0262953 | A1 | 9/2014 | Ng et al. |
| 2014/0338395 | A1 | 11/2014 | Oelfke et al. |
| 2015/0106027 | A1 | 4/2015 | Koseoglu et al. |
| 2015/0136234 | A1 | 5/2015 | Zulfiquar |
| 2015/0152340 | A1 | 6/2015 | Cherney et al. |
| 2015/0175904 | A1 | 6/2015 | Yeganeh et al. |
| 2015/0225655 | A1 | 8/2015 | Adams et al. |
| 2015/0231555 | A1 | 8/2015 | He et al. |
| 2015/0240717 | A1 | 8/2015 | Starcher et al. |
| 2015/0267127 | A1 | 9/2015 | Yeganeh et al. |
| 2015/0290575 | A1 | 10/2015 | Rothermel et al. |
| 2015/0298972 | A1 | 10/2015 | Ballaguet et al. |
| 2016/0018049 | A1 | 1/2016 | Yodogawa et al. |
| 2016/0121258 | A1 | 5/2016 | First |
| 2016/0195344 | A1 | 7/2016 | Tomita et al. |
| 2016/0228813 | A1 | 8/2016 | Schwartz |
| 2017/0045290 | A1 | 2/2017 | Ploeger et al. |
| 2017/0190574 | A1 | 7/2017 | Ercan et al. |
| 2017/0254793 | A1 | 9/2017 | Al-Amri |
| 2017/0312682 | A1 | 11/2017 | Keller |
| 2017/0319984 | A1 | 11/2017 | Oshinowo |
| 2017/0320736 | A1 | 11/2017 | Voss et al. |
| 2017/0369791 | A1 | 12/2017 | Khan et al. |
| 2018/0031524 | A1 | 2/2018 | Hassell |
| 2018/0066194 | A1 | 3/2018 | Soliman et al. |
| 2018/0179097 | A1 | 6/2018 | Navarro et al. |
| 2018/0187095 | A1 | 7/2018 | Soliman |
| 2018/0195010 | A1 | 7/2018 | Salu et al. |
| 2018/0202726 | A1 | 7/2018 | Tso et al. |
| 2018/0216016 | A1 | 8/2018 | Bakas et al. |
| 2018/0291282 | A1 | 10/2018 | Soliman |
| 2018/0371876 | A1 | 12/2018 | Lopez et al. |
| 2019/0010052 | A1 | 1/2019 | Ballaguet et al. |
| 2019/0016598 | A1 | 1/2019 | Ballaguet et al. |
| 2019/0027615 | A1 | 1/2019 | Zheng et al. |
| 2019/0062645 | A1 | 2/2019 | Al Seraihi et al. |
| 2019/0136113 | A1 | 5/2019 | Holtsclaw et al. |
| 2019/0194526 | A1 | 6/2019 | Holtsclaw et al. |
| 2019/0211274 | A1 | 7/2019 | Soliman et al. |
| 2019/0227020 | A1 | 7/2019 | Tamida et al. |
| 2019/0240613 | A1 | 8/2019 | Raynel et al. |
| 2019/0247770 | A1 | 8/2019 | Oshinowo |
| 2019/0353356 | A1 | 11/2019 | Fischer |
| 2020/0023310 | A1 | 1/2020 | Luo et al. |
| 2020/0028053 | A1 | 1/2020 | Strano |
| 2020/0040263 | A1 | 2/2020 | Khuzzan et al. |
| 2021/0031139 | A1 | 2/2021 | Hamad et al. |
| 2021/0080446 | A1 | 3/2021 | Ahmed |
| 2021/0172689 | A1 | 6/2021 | Villette |
| 2021/0189260 | A1 | 6/2021 | Robert |
| 2021/0363032 | A1 | 11/2021 | Robert et al. |
| 2021/0395619 | A1 | 12/2021 | Raynel et al. |
| 2021/0396731 | A1 | 12/2021 | Duval et al. |
| 2022/0177306 | A1 | 6/2022 | Thellefsen et al. |
| 2022/0199908 | A1 | 6/2022 | Maier-Flaig et al. |
| 2024/0092635 | A1 | 3/2024 | Robert et al. |

FOREIGN PATENT DOCUMENTS

| | | |
|---|---|---|
| CA | 2968601 | 6/2016 |
| CN | 1386563 | 12/2002 |
| CN | 1844066 | 10/2006 |
| CN | 101522595 | 9/2009 |
| CN | 102085454 | 6/2011 |
| CN | 103980950 | 8/2014 |
| CN | 104001408 | 8/2014 |
| CN | 104520411 | 4/2015 |
| CN | 205534838 | 8/2016 |
| CN | 105974098 | 9/2016 |
| CN | 109696372 | 4/2019 |
| CN | 109882683 | 6/2019 |
| CN | 110127623 | 8/2019 |
| CN | 110280941 | 9/2019 |
| CN | 110711995 | 1/2020 |
| CN | 111167317 | 5/2020 |
| CN | 111365568 | 7/2020 |
| DE | 102004010650 | 9/2005 |
| EP | 0230683 | 8/1987 |
| EP | 0195447 | 10/1989 |
| EP | 0684066 | 11/1995 |
| EP | 2932239 | 10/2015 |
| EP | 3254010 | 12/2017 |
| EP | 2932248 | 2/2020 |
| FR | 2675709 | 10/1992 |
| FR | 2676006 | 11/1992 |
| GB | 1374010 | 11/1974 |
| GB | 2336668 | 10/1999 |
| GB | 0908527 | 5/2009 |
| JP | S56162001 | 12/1981 |
| JP | S 6140555 | 2/1986 |
| JP | 2001133450 | 5/2001 |
| JP | 3764701 | 4/2006 |
| KR | 20110134562 | 12/2011 |
| KR | 101947311 | 5/2019 |
| KR | 102128754 | 7/2020 |
| SU | 1183890 | 10/1985 |
| TW | 1579034 | 4/2017 |
| WO | WO 93025636 | 12/1993 |
| WO | WO 2004022796 | 3/2004 |
| WO | WO 2005037883 | 4/2005 |
| WO | WO 2009111008 | 9/2009 |
| WO | WO 2010102653 | 9/2010 |
| WO | WO 2010133315 | 11/2010 |
| WO | WO 2011069192 | 6/2011 |
| WO | WO 2015074739 | 5/2015 |
| WO | WO 2016069722 | 5/2016 |
| WO | WO 2016102568 | 6/2016 |
| WO | WO 2017008748 | 1/2017 |
| WO | WO 2017020919 | 2/2017 |
| WO | WO 2017220655 | 12/2017 |

(56) References Cited

FOREIGN PATENT DOCUMENTS

| | | |
|---|---|---|
| WO | WO 2018022756 | 2/2018 |
| WO | WO 2018097718 | 5/2018 |
| WO | WO 2018129228 | 7/2018 |
| WO | WO 2018165512 | 9/2018 |
| WO | WO 2018169903 | 9/2018 |
| WO | WO 2018236644 | 12/2018 |
| WO | WO 2013068320 | 5/2019 |
| WO | WO 2019171409 | 9/2019 |
| WO | WO 2020225060 | 11/2020 |
| WO | WO 2020225061 | 11/2020 |
| WO | WO 2020225062 | 11/2020 |
| WO | WO 2020225063 | 11/2020 |
| WO | WO 2021113572 | 6/2021 |

OTHER PUBLICATIONS

International Search Report and Written Opinion in International Appln. No. PCT/US2023/032746, mailed on Feb. 8, 2024, 13 pages.
Nehb et al., "Sulfur," Ullman's Encyclopedia of Industrial Chemistry, Dec. 15, 2006, 35:5-71, 67 pages.
U.S. Appl. No. 16/704,973, filed Dec. 15, 2019, Villete et al.
U.S. Appl. No. 16/741,853, filed Jan. 24, 2020, Raynel et al.
U.S. Appl. No. 17/009,573, filed Sep. 1, 2020, Villete et al.
U.S. Appl. No. 17/009,579, filed Sep. 1, 2020, Villete et al.
U.S. Appl. No. 17/103,685, filed Nov. 24, 2020, Villete et al.
U.S. Appl. No. 17/946,145, filed Sep. 16, 2022, Raynel.
Abiev et al., "Non-thermal plasma for process and energy intensification in dry reforming of methane," Catalysts, Nov. 2020, 10:1358.
Abrams et al., "Use of seawater in flue gas desulfurization," JAPCA, 1988, 38(7):969-974, 7 pages.
AlQahtani et al., "One-Step Low-Temperature Reduction of Sulfur Dioxide to Elemental Sulfur by Plasma-Enhanced Catalysis," ACS Catal., 2020, 10: 5272-5277, 6 pages.
AlQahtani et al., "Plasma-assisted catalytic reduction of SO2 to elemental sulfur: Influence of nonthermal plasma and temperature on iron sulfide catalyst," Journal of Catalysis, Nov. 2020, 391: 260-272, 13 pages.
Amo et al., "Low-Quality Natural Gas Sulfur Removal/Recovery," Membrane Technology and Research, DOE Report DE-AC21-92MC28133-01, Jan. 29, 1998, 107 pages.
An et al., "Synthesis and SO2 Absorption/Desorption Properties of Poly(1,1,3,3-tetramethylguanidine acrylate)," Macromolecules, Apr. 2007, 40(9):3388-3393.
Andreasen et al., "Use of Seawater Scrubbing for SO2 Removal from Marine Engine Exhaust Gas", Energy & Fuels, 2007, 21:3274-3279, 6 pages.
Aschoundong et al., "Silane Modification of Cellulose Acetate Dense Films as Materials for Acid Gas Removal Macromolecules," American Chemical Society (ASC) Publications, Macromolecules 46:14 (5584-5594), Jul. 9, 2013, 11 pages.
ASTM "D 3921-85: Standard test method for oil and grease and petroleum hydrocarbons in water," 1985 (reapproved 1990), ASTM International, 5 pages.
ASTM "D 7066-04, Standard test method for dimer/trimer of chlorotrifluoroethylene (S-316) recoverable oil and grease and nonpolar by Infrared determination," 2007, 9 pages.
ASTM International, "D 4281-95: Standard test method for oil and grease (fluorocarbon extractable substances) by gravimetric determination," An American Standard, 1995, reapproved 2005, 6 pages.
Belov et al., "Gas transport and free volume in hexafluoropropylene polymers," Journal of Membrane Science, vol. 383, Nov. 2011, 8 pages.
Ben-Shebil, "Effect of heat of adsorption on the adsorptive drying of solvents at equilibrium in a packed bed of zeolite," Chemical Engineering Journal, 74:3 (197-204), Jul. 1999, 8 pages.
Bernardo et al., "Gas transport properties of Pebax/room temperature ionic liquid gel membranes" Separation and Purification Technology 97: 73-82, Sep. 2012, 13 pages.
Bhide et al., "Hybrid processes for the removal of acid gases from natural gas," Journal of Membrane Science 140:1 (27-49), Mar. 4, 1998, 2 pages, Abstract Only.
Bogaerts et al., "CO2 conversion by plasma technology: Insights from modeling the plasma chemistry and plasma reactor design," Plasma Sources Science and Technology, May 2017, 26(6):063001.
Bogaerts et al., "Plasma-based conversion of CO2: Current status and future challenges," Faraday Discussions, 2015, 183:217-232.
Bothamley, "Quantifying Oil/water Separation Performance in Three-Phase Separators—Part 1," Mar. 22, 2017, Mark Bothamley Consulting LLC., 14 pages.
Chatterjee et al., "Poly(ether urethane) and poly(ether urethane urea) membranes with high $H_2S/CH_4$ selectivity," Journal of Membrane Science 135:99 (99-106), Nov. 1997, 8 pages.
Chen et al,: "High CO2 permeability of ceramic-carbonate dual-phase hollow fiber membrane at medium-high temperature", Journal of Membrane Science, Mar. 2020, 597:117770.
Christopoulos, "Reliable computations of knee point for a curve and introduction of a unit invariant estimation," National and Kapodistrian University of Athens, Dec. 2014, 9 pages.
Cirne et al., "Methods for Determination of Oil and Grease Contents in Wastewater from the Petroleum Industry," Chemistry and Chemical Technology 10:4, 2016, 8 pages.
Cui et al., "Ultrahigh and Selective SO2 Uptake in Inorganic Anion-Pillared Hybrid Porous Materials," Advanced Materials, May 2017, 29(28):1606929.
Curcio, Efrenn, et al. "Hybrid nanofiltration-membrane crystallization system for the treatment of sulfate wastes." Journal of Membrane Science 360.1-2 (2010): 493-498. (Year: 2010).
Dang et al., "Research on decomposition of hydrogen sulfide using non-thermal plasma with metal oxide catalysis," Energy Procedia, 2012, 16:856-862.
De Bie et al., "Fluid modeling of the conversion of methane into higher hydrocarbons in an atmospheric pressure dielectric barrier discharge," Plasma Processes and Polymers, 2011, 8(11):1033-1058.
Delfino, J. R. et al, "A simple and fast method to determine water content in biodiesel by electrochemical impedance spectroscopy," Talanta 2018, 179, 753-759, 26 pages.
Diomede et al., "Insight into CO dissociation in plasmas from numerical solution of a vibrational diffusion equation," J. Phys. Chem. C, Aug. 2017, 121(36)19568-19576.
Elinoff et al., "Thermal diode can control direction of heat flow," Electronic Products Magazine, Apr. 2017, 2 pages.
EPA "Oil and Grease (Spectrophotometric, Infrared)," Method # 413.2, Storet No. 00560, Issued in 1974, Editorial revision 1978, Standard test method for Oil and grease analysis using Freon extraction and IR absorbance without the Freon extract being treated by silica gel, 3 pages.
EPA, "Method 1664, Revision A: N- Hexane Extractable Material (HEM; Oil and Grease) and Silica Gel Treated N-Hexane Extractable Material (SGT-HEM; Non-polar material) By Extraction and Gravimetry," United States Environmental Protection Agency, Office of Water, Washington D.C., EPA-821-R-98-002, PB99-121949, Feb. 1999, 28 pages.
EPA, "Method 1664, Revision B: n-Hexane Extractable Material (HEM; Oil and Grease) and Silica Gel Treated n-Hexane Extractable Material (SGT-HEM; Non-polar Material) by Extraction and Gravimetry," United States Environmental Protection, Office of Water Agency, Feb. 2010, 35 pages.
EPA, "Oil and Grease (Gravimetric, Separatory Funnel Extraction)," Method # 413.1, Storet No. 00556, Issued in 1974, Editorial revision 1978, Standard test method for oil and grease using gravimetric determination, approved for NPDES, 3 pages.
EPA, "Petroleum Hydrocarbons (Spectrophotometric, Infrared)," Method # 418.1, Storet No. 45501, Issued in 1978, Petroleum Hydrocarbons, 3 pages.
Fortuny, Measuring Salinity in crude oils: Evaluation of methods and an improved performance, 2008, Fuel, 1241-1248 (Year: 2008).
Froschauer et al., "No Matter of Course: Ionic Liquids as SO2-Selective Gas Absorbers," Lenzinger Berichte, Jan. 2013, 91:30-43.

(56) References Cited

OTHER PUBLICATIONS

Gabrus et al., “Experimental studies on 3A and 4A zeolite molecular sieves regeneration in TSA process: Aliphatic alcohols dewatering-water desorption,” Chemical Engineering Journal 259: 232-242, Jan. 2015, 11 pages.
Glasoe et al, “Solubility of water and deuterium oxide in carbon tetrachloride, toluene, and cyclohexane at various temperatures,” Journal of Chemical & Engineering Data, 17(1): 66-68, 1972, 3 pages.
Hasenberg, “Sulfur Dioxide,” in G. Kreysa and M. Schutze, Corrosion Handbook, vol. 10: Sulfur Dioxide, sodium sulfate, p. 5-37. Weinheim: Wiley, May 2008.
Hatcher et al., “Sour water stripping Part 2: phenolic water,” Digital Refining, Aug. 2014, 5 pages.
Heijkers et al., “Plasma-based CH4 conversion into higher hydrocarbons and H2: Modeling to reveal the reaction mechanisms of different plasma sources,” Journal of Physical Chemistry, May 2020, 124:7016-7030.
Hibbard and Schalla, “NACA Research Memorandum: Solubility of Water in Hydrocarbons, ” National Advisory Committee for Aeronautics, Washington, Jul. 10, 1952, 27 pages.
Huang et al., “Facilitated separation of CO2 and SO2 through supported liquid membranes using carboxylate-based ionic liquids,” Journal of Membrane Science, Dec. 2014, 471:227-236.
International Standard, “ISO 5667-3: Water quality—sampling—part 3: guidance on the preservation and handling of water samples,” 3rd edn, Dec. 15, 2003, 38 pages.
International Standard, “ISO 9377-2: Water quality—determination of hydrocarbon oil index—Part 2: Method using solvent extraction and gas chromatography,” First edition, Oct. 15, 2000, 24 pages.
IP, “Determination of the oil content of effluent water—extraction and infra-red spectrometric method,” IP 429/98, Oil in Water, 2012, 5 pages.
Jansen et al., “On the unusual solvent and the effect on the gas transport in perfluorinated Hyflon AD Membranes,” Journal of Membrane Science 287:1 (132-137), Jan. 2007, 6 pages.
Johnson et al, “The Molecular Complexity of Water in Organic Solvents Part II,” J. Chem. Soc. A, Inorganic Phys. Theoretical 77-78, 1966, 2 pages.
Kado et al., “Diagnosis of atmospheric pressure low temperature plasma and application to high efficient methane conversion”, Catal. Today, Feb. 2004, 89:47-55.
Kanna et al., “Estimating the Amount of Moisture Content in Crude Oil Samples, ” International Refereed Journal of Engineering and Science (IRJES), Feb. 2017, 6(2): 59-62, 4 pages.
Khalifeh et al., “Decomposition of methane to hydrogen using nanosecond pulsed plasma reactor with different active vols. voltages and frequencies”, Appl. Energy, May 2016, 169:585-596.
Kikkinides et al., “Gas Separation and Purification by Polymeric Adsorbents: Flue Gas Desulfurization and S02 Recovery with Styrenic Polymer,” Ind. Eng. Chem. Res., Oct. 1993, 32(10):2365-2372.
Kim et al., “Effect of Demulsifier Partitioning on the Destabilization of Water-in-Oil Emulsions,” Ind. Eng. Chem. Res., 1996, 35: 1141-1149, 9 pages.
Kim et al., “Separation performance of PEBAX/PEI hollow fiber composite membrane for SO2/CO2/N2 mixed gas,” Chemical Engineering Journal, Nov. 2013, 233:242-250.
Kirchnerová et al, “The Solubility of Water in Low-Dielectric Solvents,” Can. J. Chem 54(24): 3909-3916, Aug. 26, 1976, 8 pages.
Klaehn et al., “Humidified Gas stream Separation at High Temperatures Using Matrimid 5218,” Separation Science and Technology, Nov. 2012, 47(14-15):2186-2191.
Knauss et al, “The solubility of p-xylene in water as a function of temperature and pressure and calculated thermodynamic quantities,” Geochimica et Cosmochimica Acta vol. 59(12): 2443-2448, Jun. 1995, Mar. 1995, 6 pages.
Ko et al., “Analysis of purge gas temperature in cyclic TSA process,” Pergmon, Chemical Engineering Science 57(1): 179-195, Jan. 2002, 17 pages.
Kraftschik et al., “Dense film polyimide membranes for aggressive sour gas feed separations,” Journal of Membrane Science 428: 608-619, Feb. 1, 2013, 12 pages.
Kriebel, “Absorption, 2. Design of Systems and Equipment,” Ullmann's Encyclopedia of Industrial Chemistry, 2012, 18 pages.
Lallemand et al., “Extending the treatment of highly sour gases: cryogenic distillation,” Digital-Refining: Processing, Operations & Maintenance, Jan. 2014, 8 pages.
Lallemand et al., “Highly sour gas processing: Bulk removal with SPREX Process,” IPTC-10581-MS, International Petroleum Technology Conference, Nov. 2005, 18 pages.
Lallemand et al., “Solutions for the treatment of highly sour gases,” Digital Refinding: Processing, Operations & Maintenance, Gas, Apr. 2012, 14 pages.
Lancia, et al., “Uncatalyzed heterogenous oxidation of calcium bisulfite,” Chemical Engineering Science, Aug. 1996, 51(16), 3889-3896.
Lee et al., “Diamine-Anchored Polystyrene Resins for Reversible SO2 Adsorption,” ACS Sustainable Chem. Eng., Feb. 2016, 4(4):2012-2019.
Lockhart, “Sour oil and gas management: 3.3,” New Upstream Technologies, vol. III/New Developments: Energy, Transport, Sustainability Encyclopedia of Hydrocarbons, 2007, 34 pages.
Lokhandwala et al., “Membrane separation of nitrogen from natural gas: A case study from membrane synthesis to commercial deployment,” Journal of Membrane Science 346: 270-279, Jan. 2010, 10 pages.
Lopez et al., “Evaluation of NF membranes as treatment technology of acid mine drainage: metals and sulfate removal,” Desalination, 2018, 440: 122-134.
Lu et al., “Conversion of natural gas to C2 hydrocarbons via cold plasma technology,” Journal of Natural Gas Chemistry, Jul. 2010, 19(4):375-379.
Maitre et al., “Plasma-enhanced catalysis for the upgrading of methane: A review of modelling and simulation methods,” Reaction Chemistry & Engineering, Mar. 2020, 5:814-837.
Mandal et. al., “M.A.L.D.I.-T.O.F. mass spectrometry characterization of 4-alkyl substituted phenol-formaldehyde novalac type resins,” Polymer, 1997, 38(26):6267-6271, 5 pages.
Martínez-Salazar et al., “Hydrogen production by methane reforming with H2S using Mo. Cr/ZrO2—SBA15 and Mo, Cr/ZrO2—La2O3 catalyst,” Int. J. Hydrogen Energy, Dec. 2015, 48:17272-17283.
masterbond.com [online], “Epoxies with Low Coefficient of Thermal Expansion,” available on or before May 12, 2015, via Internet Archive: Wayback Machine URL: <https://web.archive.org/web/20150512012852/https://www.masterbond.com/properties/epoxies-low-coefficient-thermal-expansion>, retrieved on Sep. 15, 2020, URL: <https://www.masterbond.com/properties/epoxies-low-coefficient-thermal-expansion>, 2 pages.
Merkel and Toy, “Comparison of Hydrogen Sulfide Transport Properties in Fluorinated and Nonfluorinated Polymers,” Macromolecules 39:22 (7591-7600), Sep. 2006, 10 pages.
Michell Instruments (online), “Impedance,” Impedance Products, URL: <http://www.michell.com/uk/technology/impedence.htm> retrieved Sep. 9, 2019, available on or before Jun. 2019, 2 pages.
Mogildeea et al., “The assessment of carbon dioxide dissociation using a single-mode microwave plasma generator,” Molecules, Mar. 2020, 25:1558.
Neisi, “Effect of Mixing Efficiency in Dilution Water Consumption in a Crude Oil Desalting Plant, 2011,” 3rd International Conference on Chemical, Biological and Environmental Engineering, 2011, 20, 109-113, 5 pages.
Odberg et al, “Studies of water in organic solvents using NMR and partition techniques-II Di-isopropyl ether, dibutyl phthalate and chloroform,” Journal of Inorganic and Nuclear Chemistry 34:8 (2605-2616), Aug. 1972, Mar. 18, 1971, 12 pages.
Oikawa et al., “Seawater Flue Gas Deslfurization: Its Technical Implications and Performance Results,” Environmental Progress, Apr. 2003, 22(1):67-73, 7 pages.
Paidar et al., “Membrane electrolysis—History, current status and perspective,” Electrochimica Acta., 2016, 209: 737-756.

(56) References Cited

OTHER PUBLICATIONS

Palma et al., "A review about the recent advances in selected nonthermal plasma assisted solid-gas phase chemical processes," Nanomaterials, 2020, 10:1596.
PCT Application No. PCT/IB2019/061417, Lithoxoos et al., Regeneration Schemes for a Two Stage Adsorption Process for Claus Tail Gas Treatment, filed Dec. 28, 2019, 75 pages.
Ramakers et al., "Gliding arc plasmatron: Providing an alternative method for carbon dioxide conversion," ChemSusCHem, 2017, 10(12):2642-2652.
Ramasubramanian, "CO2 (H2S)-selective membranes for fuel cell hydrogen purification and flue gas carbon capture: an experimental and process modeling study", Dissertation for the degree of Doctor of Philosophy, Ohio state University, 2013, 270 pages.
Raynel et al., "A new method to select demulsifiers and optimize dosage at wet crude oil separation facilities," Oil & Gas Science and Technology—Rev. IFP Energies Nouvelles, 2021, 76(19), 11 pages.
Reddy et al., "Kinetics of hydrogen sulfide decomposition in a DBD plasma reactor operated at high temperature," Journal of Energy Chemistry, 2013, 22:382-386.
Ren et al., "Ionic liquids: Functionalization and absorption of SO2," Green Energy & Environment, Jul. 2018, 3(3):179-190.
Ricci et al., "Assessment of nanofiltration and reverse osmosis potentialities to recover metals, sulfuric acid, and recycled water from acid gold mining effluent," Water Science & Technology, Apr. 2016, 74(2):367-374.
Robeson, "The upper bound revisited," Journal of Membrane Science 320 (390-400), Jul. 15, 2008, 11 pages.
Roy et al., "Aspen-HYSYS Simulation of Natural Gas Processing Plant," Journal of Chemical Engineering, IEB, Dec. 2011, 26:1, 4 pages.
Rufford et al., "The removal of CO2 and N2 from natural gas: A review of conventional and emerging process technologies," Journal of Petroleum Science and Engineering 94-95: 123-154, Sep. 2012, 32 pages.
Schei et al., "Transient simulations of gas-oil-water separation plants," Modeling, Identification and Control, 1991, 12: 1 (27-46), 20 pages.
Sensorland.com (online), "Impedance Moisture Sensor Technology," How Sensors work—Moisture Sensors, retrieved from URL: <http://www.sensorland.com/HowPage029.html>, retrieved Sep. 9, 2019, 2 pages.
Shell Global Solutions International BV, "Cansolv Technologies Inc. SO2 Scrubbing System" fact sheet, 2010.
Simo et al., "Adsorption/Desorption of Water and Ethanol on 3A Zeolite in Near-Adiabatic Fixed Bed," Ind. Eng. Chem. Res. 48, 20, Sep. 2009, 14 pages.
Sivalls et al., "Oil and Gas Separation Design Manual," Section: 300, Technical Bulletin, Feb. 10, 2009, 142:7, 63 pages.
Sun et al., "Application of seawater to enhance SO2 removal from simulated flue gas through hollow fiber membrane contactor," Journal of Membrane Science, 2008, 312:6-14, 9 pages.
Tailor et al., "Supported Polytertiary Amines: Highly Efficient and Selective SO2 Adsorbents," Environ. Sci. Technol., Jan. 2014, 48(3):2025-2034.
Tanninen et al., "Long-term acid resistance and selectivity of NF membranes in very acidic conditions," Journal of Membrane Science, 2004, 240: 11-18.
Vaisala (online), "Vaisala HUMICAP Sensor for Measuring Moisture in Oil," Technology Description, retrieved from URL: <https://www.vaisala.com/sites/default/files/documents/HUMICAP-for-Moisture-in-oil-B211231EN-A.pdf> 2012, 2 pages.
Vasudevan, "Membranes and Diaphragms for Electrochemical Processes (Part—I)," Res. J. Chem. Sci., Feb. 2013, 3(2): 1-3.
Waterston et al. "Electrochemical oxidation of sulfide ion ata boron-doped diamond anode." Journal of applied electrochemistry 37.3 (2007): 367-373, 7 pages.
webbook.nist.gov [online], "National Institute of Standards and Technology (NIST): P.J. Linstrom and W.G. Mallard, Eds., NIST Chemistry WebBook, NIST Standard Reference Database No. 69," National Institute of Standards and Technology, Gaithersburg MD, 20899, retrieved from URL <https://doi.org/10.18434/T4D303>, retrieved on Feb. 24, 2023.
Weiland et al, "Distribution of HCN in sour water systems," Digital Refining, Apr. 2014, 5 pages.
Whitehead, "Plasma-catalysis: The known knowns, the known unknowns and the unknown unknowns," Journal of Physics, May 2016, 49:243001.
Wikipedia.com [online] "Thermal Diode," last revised Feb. 2019, retrieved on Oct. 7, 2019, retrieved from URL <https://en.wikipedia.org/wiki/Thermal_diode>, 2 pages.
Wikipedia.com [online], "Dielectric barrier discharge," Retrieved Oct. 29, 2021 from URL <https://en.wikipedia.org/wiki/Dielectric_barrier discharge>, 7 pages.
Wu et al., "Effect of Demulsifier Properties on Destabilization of Water-in-Oil Emulsion," May 2003, Energy & Fuels, 2003, 17: 1554-1559, 6 pages.
Wu et al., "Preparation and SO2 Absorption /Desorption Properties of Crosslinked Poly(1,1,3,3-Tetramethylguanidine Acrylate) Porous Particles," Macromolecular Rapid Communications, Nov. 2006, 27(22):1949-1954.
Www.digitalrefining.com [online], "Labsorb: A regenerable wet scrubbing process for controlling SO2 emissions," Jan. 2001, retrieved on Jan. 11, 2022, retrieved from URL<https://www.digitalrefining.com/article/1000818/labsorb-a-regenerable-wet-scrubbing-process-for-controlling-so2-emissions#. Yd3Ha9HMKUk>, 2 pages.
Xia et al., "Efficient, Selective, and Reversible SO2 Capture with Highly Crosslinked Ionic Microgels via a Selective Swelling Mechanism," Advanced Functional Materials, Jan. 2018, 28(13):1704292.
Xu et al., "Non-thermal plasma catalysis for CO2 conversion and catalyst design for the process," J. Phys. D: Appl. Phys. Mar. 2021, 54:233001.
Xuan et al., "Plasma oxidation of H2S over non-stoichiometric LaxMnO3 perovskite catalysts in a dielectric barrier discharge reactor," Catalysts, Aug. 2018, 8:317.
Yang, "Chapter 2: Measurement of Oil in Produced Water," in Lee et al., Produced water, 57-88, Springer Science+Business Media, 2011, 32 pages.
Zaman et al., "Production of hydrogen and sulfur from hydrogen sulfide," Fuel Processing Technology, Jan. 1995, 41(2):159-198.
Zhao et al. , "Decomposition of hydrogen sulfide in non-thermal plasma aided by supported CdS and ZnS semiconductors", Green Chemistry, Apr. 2013, 15:1509-1513.
Zhao et al., "SO2 Absorption by Carboxylate Anion-Based Task-Specific Ionic Liquids: Effect of Solvents and Mechanism," Ind. Eng. Chem. Res., Dec. 2016, 55(50):12919-12928.
Zou et al., "CO2—Selective polymeric membranes containing amines in crosslinked poly (vinyl alcohol)," Journal of Membrane Science, Dec. 2006, 286:310-321.

* cited by examiner

| | | |
|---|---|---|
| Rx 10 | $4\ H_2O + S_2$ | $4\ H_2 + 2\ SO_2$ |
| Rx 15 | $2\ H_2O + H_2S$ | $3\ H_2 + SO_2$ |
| Rx 16 | $H_2O + H_2S$ | $2\ H_2 + SO$ |
| Rx 19 | $2\ H_2O + S_2$ | $2\ H_2 + 2\ SO$ |
| Rx 1 | $2\ H_2O + S_{Vap}$ | $2\ H_2 + SO_2$ |
| Rx 3 | $2\ H_2O + 3\ S_{Vap}$ | $2\ H_2S + SO_2$ |
| Rx 7 | $H_2S + S_{Vap}$ | $H_2 + S_2$ |
| Rx 12 | $2\ H_2O + 2\ S_{Vap}$ | $H_2 + SO_2 + H_2S$ |
| Rx 17 | $H_2O + S_{Vap}$ | $H_2 + SO$ |
| Rx 20 | $H_2O + SO$ | $H_2 + SO_2$ |

FIG. 4

$$2\,H_2O + S_{Vap} \rightleftharpoons 2\,H_2 + SO_2$$

$$2\,H_2S + SO_2 \rightleftharpoons 2\,H_2O + 3\,S_{Liq}$$

---

$$2\,H_2S \rightleftharpoons 2\,H_2 + 2\,S_{Liq}$$

FIG. 5

$$2\,H_2O + S_{Vap} \rightleftharpoons 2\,H_2 + SO_2$$

FIG. 6

HYDROGEN PRODUCTION BY SULFUR STEAM REFORMING

TECHNICAL FIELD

This disclosure relates to producing hydrogen from sulfur vapor and water.

BACKGROUND

Hydrogen sulfide can be a byproduct of processing natural gas and refining sulfur-containing crude oils. Other industrial sources of hydrogen sulfide may include pulp and paper manufacturing, chemical production, waste disposal, and so forth. In certain instances, hydrogen sulfide can be considered a precursor to elemental sulfur.

Sulfur recovery may refer to conversion of hydrogen sulfide ($H_2S$) to elemental sulfur, such as in a sulfur recovery unit (SRU), e.g., Claus system. The most prevalent technique of sulfur recovery is the Claus system, which may be labeled as the Claus process, Claus plant, Claus unit, and the like. The Claus system includes a thermal reactor (e.g., a furnace) and multiple catalytic reactors to convert $H_2S$ into elemental sulfur that is removed (recovered).

Hydrogen is commercially produced, such as from fossil fuels. Hydrogen may be produced, for example, through reforming of hydrocarbons or electrolysis of water. Hydrogen is produced by coal gasification, biomass gasification, water electrolysis, or the reforming or partial oxidation of natural gas or other hydrocarbons.

The reforming of natural gas is the most prevalent source of hydrogen production. Bulk hydrogen is typically produced by the steam reforming of natural gas (methane). Conventional steam reforming includes heating the natural gas (e.g., to between 700° C. to 1100° C.) in the presence of steam and a nickel catalyst. This endothermic reaction generates carbon monoxide and hydrogen. The carbon monoxide gas can be subjected to a water-gas shift reaction to obtain additional hydrogen.

The produced hydrogen can be a feedstock to chemical processes, such as ammonia production, aromatization, hydrodesulfurization, and the hydrogenation or hydrocracking of hydrocarbons. The produced hydrogen can be a feedstock to electrochemical processes, such as fuel cells.

SUMMARY

An aspect relates a method of producing hydrogen, including steam reforming elemental sulfur from a sulfur pit, thereby generating hydrogen gas and sulfur dioxide, to give a mixture including hydrogen gas, sulfur dioxide, elemental sulfur gas, and water vapor. The method includes condensing elemental sulfur gas in the mixture in a condenser (heat exchanger) into liquid elemental sulfur and discharging liquid elemental sulfur from the condenser to the sulfur pit. The method includes discharging a process gas from the condenser, wherein the process gas includes hydrogen gas and sulfur dioxide generated in the steam reforming.

Another aspect relates to a hydrogen production system including a vessel configured to receive elemental sulfur from a sulfur pit and steam reform the elemental sulfur into hydrogen gas and sulfur dioxide, and discharge a mixture having hydrogen gas, sulfur dioxide, elemental sulfur gas, and water vapor. The hydrogen production system includes a condenser heat exchanger to receive the mixture and condense elemental sulfur gas in the mixture into liquid elemental sulfur, and discharge liquid elemental sulfur to the sulfur pit and discharge a process gas having hydrogen gas and sulfur dioxide generated via steam reforming in the vessel.

The details of one or more implementations are set forth in the accompanying drawings and the description below. Other features and advantages will be apparent from the description and drawings, and from the claims.

BRIEF DESCRIPTION OF DRAWINGS

FIG. 4 is a diagram of valid reactions.

FIG. 5 is a diagram of reactions in the reductive environment (excess hydrogen sulfide) and in which sulfur dioxide is consumed at temperatures less than 445° C.

FIG. 6 is a diagram of an overall reaction in the oxidative environment (excess sulfur dioxide), and is a sulfur steam reforming reaction.

DETAILED DESCRIPTION

Figure 1:
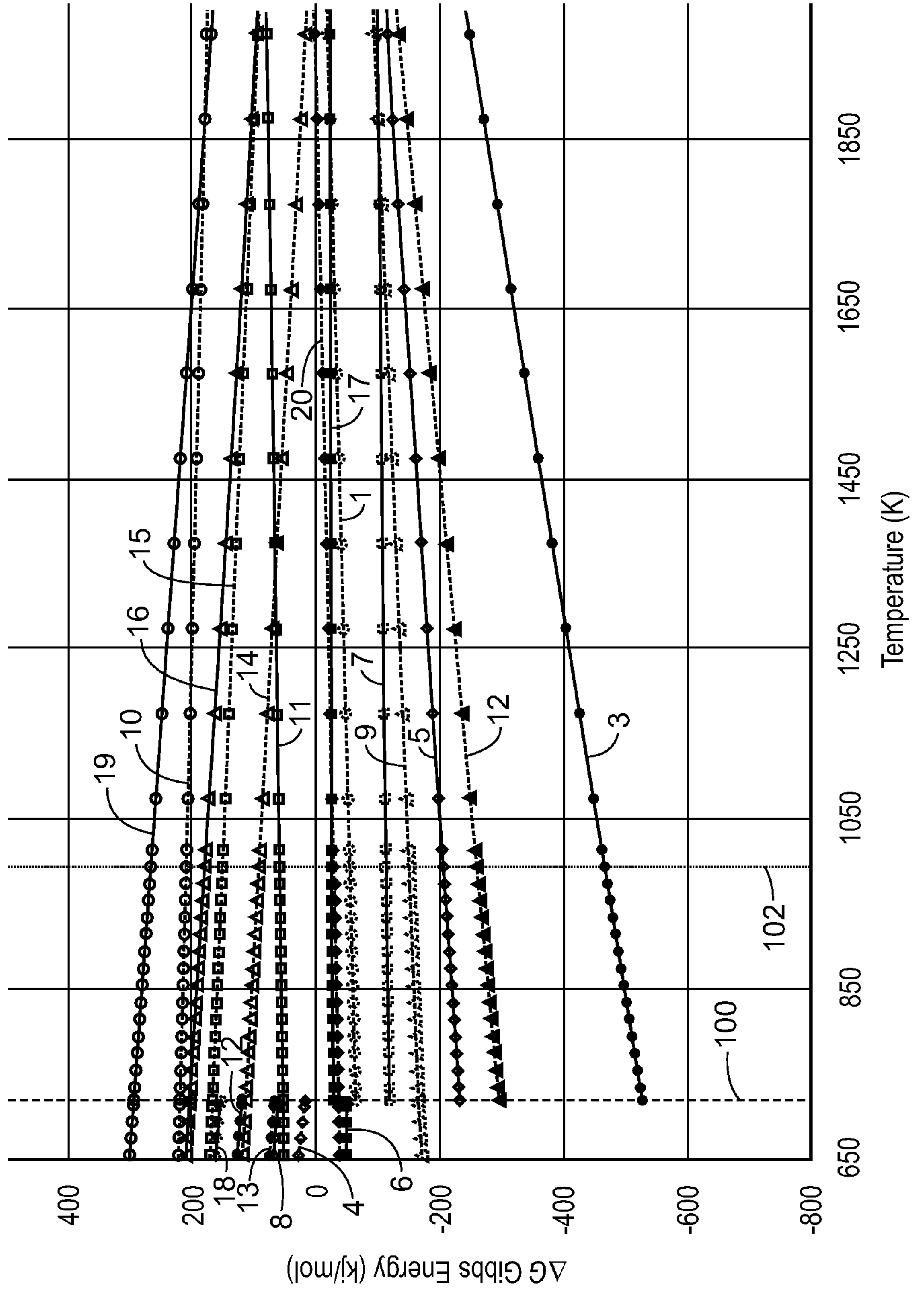
FIG. 1 is a plot of change in Gibbs free energy as a function of temperature.

Produced hydrogen gas ($H_2$) can be utilized in the transportation and energy sectors, as well as a feedstock to chemical processes, and the like. Embodiments herein can provide $H_2$ for these uses (and other uses) by the conversion of elemental S (and water) into $H_2$ in a sulfur recovery plant or sulfur recovery unit (SRU).

Aspects of the present disclosure are directed to producing hydrogen ($H_2$) from elemental sulfur (S) and water ($H_2O$) to generate $H_2$. In particular, S and $H_2O$ may be contacted at temperature above the boiling point (445° C.) of S to produce $H_2$ and sulfur dioxide ($SO_2$). The reaction can be characterized as sulfur steam reforming. The reaction may be or include $2H_2O+S \rightarrow 2H_2+SO_2$.

Again, this may be characterized as steam reforming of S. The steam reforming of S may be performed in a Claus furnace (or Claus-type furnace), or in a sulfur steam reformer vessel. The generated $H_2$ in the discharge gas from the Claus furnace or from the sulfur steam reformer can be recovered as product.

For a Claus furnace (reaction furnace), such steam reforming of the S may be performed in an intermediate zone of the Claus furnace. In this case, the intermediate (e.g., $2^{nd}$) zone of the Claus furnace may be labeled as a sulfur steam reformer. The Claus reaction $2H_2S+SO_2 \rightarrow 3S+2H_2O$ may also occur in the Claus furnace in the boiler section as the temperature decreases.

The sulfur steam reforming (whether in the Claus furnace intermediate zone or in a sulfur steam reformer) may be performed in a reductive environment (excess $H_2S$) or in an oxidative environment (excess $SO_2$).

As used herein in this context, the reductive environment is evident with an excess $H_2S$ (not an excess $SO_2$) in the exhaust gas stream, such as with respect to the Claus reaction and any oxidation reactions (e.g., $2H_2S+3O_2 \rightarrow 2SO_2+2H_2O$) that may occur. The $SO_2$ (including $SO_2$ generated in the sulfur steam reforming) may be converted into elemental sulfur with an excess of $H_2S$. The oxidative environment is evident with an excess $SO_2$ (not an excess $H_2S$) with respect to the Claus reaction. Excess $SO_2$ may be promoted by the sulfur steam reforming.

The range of temperature for the sulfur steam reforming to operate may be, for example, between 445° C. (sulfur boiling point) and 720° C. (sulfur disproportionation into disulfur). The Claus reaction may occur below 445° C. The Claus reaction (Rx 4 below) can be avoided (removed) by maintaining the temperature above 445° C. Thus, the Claus reaction generally does not occur in the sulfur steam reformer operating at a temperature in the range of 500° C. to 600° C. Sulfur steam reforming will generally occur above 445° C. The formation of disulfur at 720° C. may be an unwanted side reaction. Therefore, a beneficial range of operating temperature for the sulfur steam reforming may be between 445° C. and 720° C., such as an operating temperature range of 500° C. to 600° C.

The Claus reaction may occur in a Claus furnace (e.g., and in which the Claus furnace has an intermediate zone performing sulfur steam reforming), and in a stand-alone sulfur steam reformer (not a Claus furnace) in a reductive environment If excess hydrogen sulfide ($H_2S$) is fed to the first zone (combustion) of the Claus furnace, excess $H_2S$ may be present in the intermediate zone giving a reductive environment in the intermediate zone. In this case, the furnace exhaust gas may be passed over catalytic converters, such as in a Claus system. Again, $H_2$ gas generated in sulfur steam reforming in the furnace can be recovered.

For the intermediate zone (reaction zone) and discharge zone (e.g., heat exchanger as boiler) of the Claus furnace having excess $H_2S$ giving the reductive environment, S may be condensed and removed from the furnace exhaust gas, and the remaining furnace exhaust gas (having $H_2$, $H_2S$, and $SO_2$) passed over catalytic converters to give S (condensed and removed via associated condensers) and a $H_2$-rich gas.

In the catalytic converters, the $H_2S$ and the $SO_2$ react in the Claus reaction to give S and $H_2O$ vapor. As indicated, any S vapor is condensed and removed as liquid S via condensers associated with the catalytic converters. The remaining gas mixture including $H_2O$ vapor, $H_2$, carbon dioxide ($CO_2$), any nitrogen ($N_2$), and residual $H_2S$ discharged from the final catalytic converter (after condensation and removal of S in the final condenser) may be characterized as Claus tail gas but having a significant amount of $H_2$. This Claus tail gas is forwarded for further processing, e.g., water quenching to remove the $H_2O$ vapor and gas sweetening (such as selective amine treatment) to remove $H_2S$, and thus a $H_2$-rich gas having the $H_2$ product is recovered.

If $H_2S$ is sub-stoichiometric (an oxidative environment) in the Claus furnace intermediate zone, an excess of $SO_2$ may be generated. In this case, downstream catalytic converters are not employed. A $H_2$-rich gas may be separated from the furnace exhaust gas by quenching the exhaust gas with chilled acidic water, which can absorb a relatively large quantity of $SO_2$ to remove $SO_2$; and therefore, to give the resulting $H_2$-rich gas. For the intermediate zone and discharge zone of the Claus-type furnace as sub-stoichiometric $H_2S$ (an oxidative environment) with excess $SO_2$, the $H_2$-rich gas may be separated from the furnace exhaust (discharge) gas by quenching the exhaust gas with chilled acidic water to absorb $SO_2$ from the furnace exhaust gas into the chilled water, leaving a $H_2$-rich gas. Catalytic converters are not employed. The formed sulfurous acid (water having absorbed $SO_2$) may be oxidized in an oxidation tower utilizing oxygen from air to give sulfuric acid. The water exiting this oxidation tower may be routed to a water treatment unit(s), such as reverse osmosis (RO) or electrodialysis, distillation, to recover and concentrate the sulfuric acid. Clean water may be reused. Concentrated sulfuric acid can be monetized or injected into the furnace to enrich the furnace combustion in oxygen.

For implementations of acid gas (having $H_2S$ as an acid gas) (whether the $H_2S$ is excess or sub-stoichiometric) fed to a furnace (e.g., Claus furnace), an oxidation reaction in the furnace (e.g., reaction furnace or thermal reactor in thermal stage of Claus system) is $2H_2S+3O_2 \rightarrow 2SO_2+2H_2O$, which is the oxidation of the entering $H_2S$ from the fed acid gas with fed oxygen ($O_2$) gas to give $SO_2$ and $H_2O$ vapor. The reaction furnace as a thermal reactor may also perform the Claus reaction $2H_2S+SO_2 \rightarrow 3S+2H_2O$, in which $H_2S$ gas and $SO_2$ react to give elemental S gas and $H_2O$ vapor. An overall reaction involving these two reactions (oxidation reaction and Claus reaction) may be characterized as $2H_2S+O_2 \rightarrow 2S+2H_2O$. In addition, in accordance with embodiments herein of the present techniques, liquid elemental S and water may be fed (externally injected) into an intermediate zone (e.g., second zone) of the furnace (see, e.g., FIGS. 7A and 8), and in which the intermediate zone acts as a steam reformer of elemental S. As mentioned, a reaction in the steam reforming of S may be, for example, $2H_2O+S \rightarrow 2H_2+SO_2$. The generated $H_2$ may be recovered downstream as product, and thus the system labeled as a hydrogen production system. Lastly, the Claus reaction $2H_2S+SO_2 \rightarrow 3S+2H_2O$ may also be performed (as a catalytic reaction) in Claus catalytic converters (catalytic reactors) if employed to receive the discharged furnace gas.

Reactions for the production of hydrogen in a conventional Claus reaction furnace that have been explored include the following:

Partial methane combustion followed by water-gas shift reaction of carbon monoxide:

$$3O_2+2CH_4 \rightleftharpoons 4H_2O+2CO$$

$$H_2O+CO \rightleftharpoons H_2+CO_2$$

Partial $H_2S$ combustion followed by water-gas shift reaction of sulfur monoxide:

$$O_2+H_2S \rightleftharpoons H_2O+SO$$

$$H_2O+SO \rightleftharpoons H_2+SO_2$$

Methane steam reforming:

$$2H_2O+CH_4 \rightleftharpoons 4H_2+CO_2$$

Although the $H_2S$ steam reforming is thermodynamically not allowed in the range of operation temperature of a Claus furnace (T<2000° K), the sulfur steam reforming may be thermodynamically allowed at a temperature above boiling point of sulfur (445° C. or 718.15° K), as depicted below:

$$2\,H_2O + S \xrightleftharpoons{T_1 < 2509^\circ\,K} 2\,H_2 + SO_2$$

$$H_2O + S \xrightleftharpoons{T_2 < 7442^\circ\,K} H_2 + SO$$

$$H_2O + SO \xrightleftharpoons{T_3 < 1882^\circ\,K} H_2 + SO_2$$

The temperatures, indicated on the reaction schemes above, relate to the temperature at which the reaction inverses. To appreciate the potential disruptive effect the other reactions including side-reactions, the Gibbs free energy of these reactions were calculated as a function of temperature using the enthalpy and entropy of formation given by NIST (National Institute of Standards and Technology). The results are represented on FIG. 1.

Figure 2:
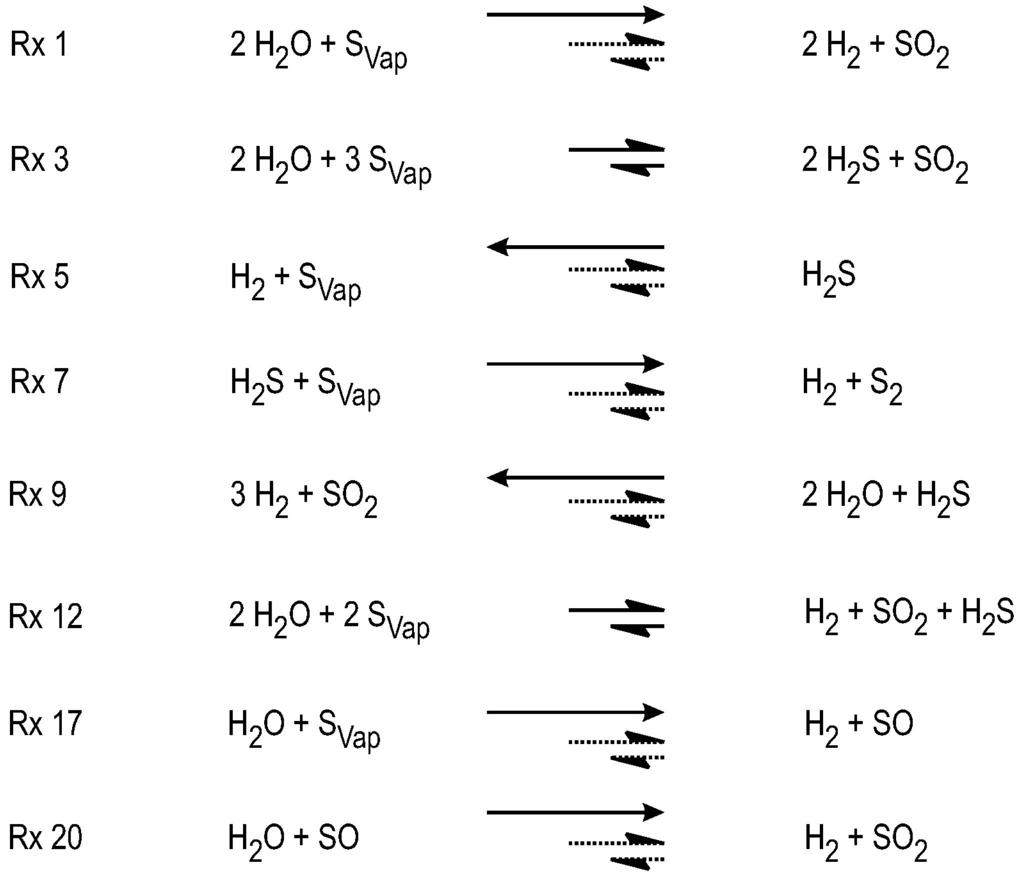
FIG. 2 is a diagram of forward reactions.
Figure 3:
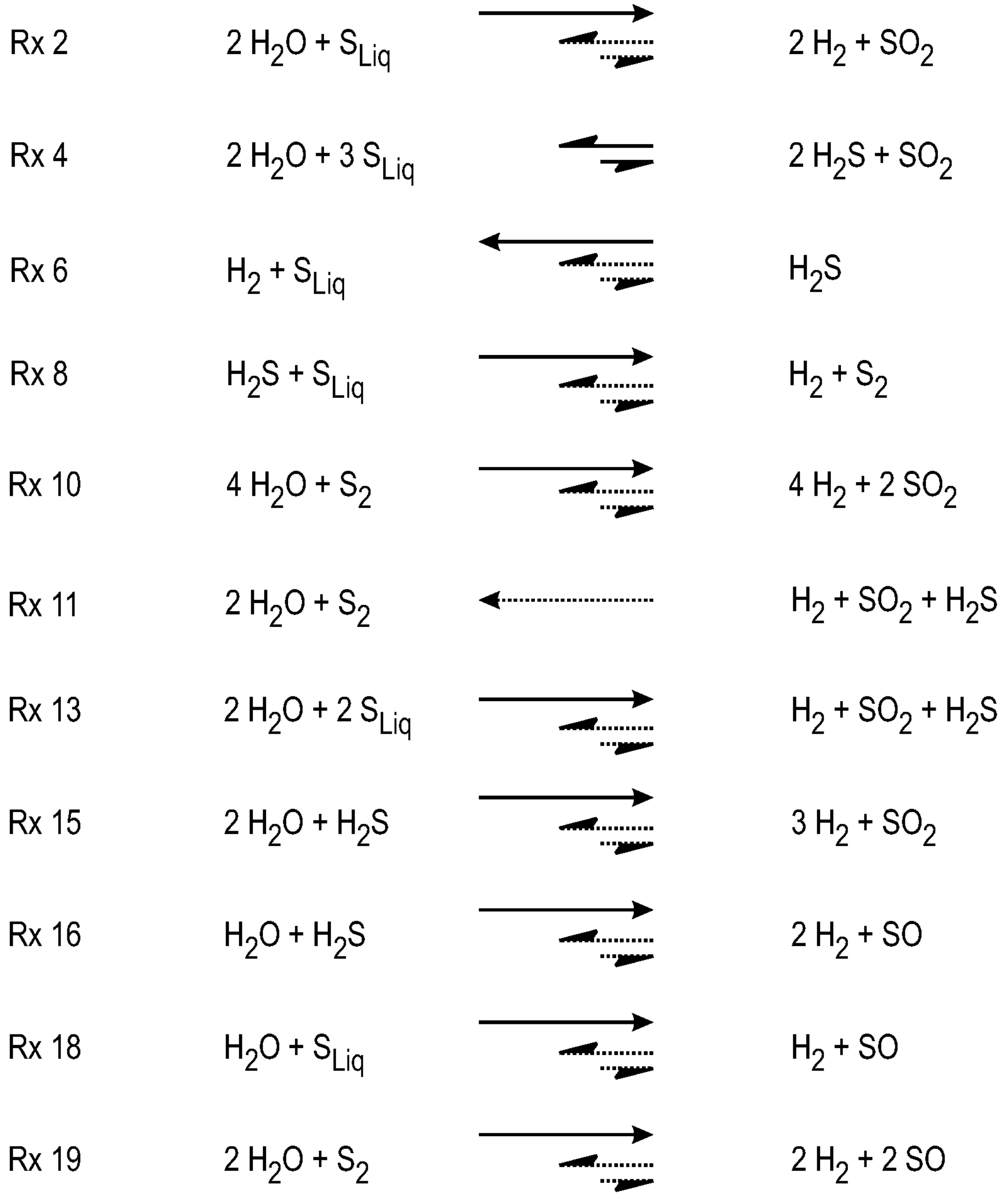
FIG. 3 is a diagram of backward reactions.

FIG. 1 is a plot of $\Delta G$ (the change in Gibbs free energy) in kilojoules per mole (kJ/mol) as a function of temperature in Kelvin (K). A line for each reaction (Rx 1-20) depicted in FIGS. 2-3 is plotted. The vertical dashed line 100 is the vaporization temperature (boiling point) for elemental sulfur. The vertical dashed line 102 is the temperature at which the vapor sulfur dissociates into disulfur $S_2$. This graph indicates if the reaction at a given temperature is an equilibrium or not an equilibrium ($0 \neq \Delta G\ \forall T$), and if going forward ($0 < \Delta G$ and $\rightleftharpoons$), or backward ($0 > \Delta G$ and $\leftrightharpoons$), where $\Delta G$ is the change in Gibbs free energy, T is temperature in Kelvin, and $\forall$ is the mathematical symbol for "For all . . . " FIG. 1 is the change in Gibbs energy (Gibbs free energy) of considered reactions as a function of temperature.

FIG. 2 depicts forward reactions considered. FIG. 3 depicts backward reactions considered.

Reactions considered are equilibrium except for reaction Rx 11, which is not an equilibrium. Another aspect is that the hydrogen molecule is generally unreactive in the temperature window (T<4412° K), except, for example, if a metallic catalyzer is introduced. In other words, hydrogen in the operational temperature typically is not a reactant, as the hydrogen generally will not be consumed during the reactions. Therefore, reaction Rx 11 will not occur (e.g., as long as there is not metallic catalyzers, such as platinum (Pt), nickel (Ni), etc.). Similarly, the reaction Rx 5 and Rx 9 generally will not occur without a metallic catalyzer.

The equilibriums can be further driven by adding an excess of one or more of the constituents. It was identified that an excess of $H_2O$ vapor and $H_2S$ displaces the reactions in a desired way (plain arrows), except for reaction Rx 4 (the Claus reaction). This reaction (Rx 4) can be avoided by maintaining the temperature above 445° C. (718° K). By keeping the temperature above 718° K, the following reactions are generally removed as possible reactions: Rx 2, Rx 4, Rx6, Rx 8, Rx13 and Rx 18.

FIG. 4 depicts valid reactions considered. In other words, depicted is a valid set of reactions (or a valid reaction set). In this context, "valid" means the reaction will occur, whereas "invalid" means the reaction will not occur.

The chemistry may drive the separation and heating strategies. Techniques (including systems and processes) are described below as a function of or correlative with the heating approach and the subsequent separation techniques. There are various heating configurations, as discussed below.

Furthermore, there are at least two environments in the Claus furnace (e.g., in a second zone of the furnace) or in the sulfur steam reformer, and in the discharge gas from the furnace or the sulfur steam reformer, that may drive the downstream configuration. As discussed, these two environments or chemical types may be a "reductive" environment or an "oxidative" environment.

A reductive environment for the Claus furnace (e.g., in intermediate zone, second zone, and discharge zone) has an excess of $H_2S$, such as excess $H_2S$ in the second zone of the Claus furnace or Claus-type furnace. Sulfur dioxide is consumed at low temperature (e.g., less than 445° C.). Again, a "reductive" environment can be excessive $H_2S$ in the second zone of the furnace. If an excess of $H_2S$ is fed to the furnace (giving the reductive environment), the exhaust gases having $H_2S$ may be passed over a downstream catalytic converter(s) to give molten sulfur and a $H_2$-rich gas. For the reductive environment, the exhaust gas has $H_2S$ (considered as excess $H_2S$). As mentioned, the furnace gas may be sent across catalytic converter(s) for the Claus reaction. With the reductive environment, the furnace gas discharged having $H_2S$ also has $SO_2$ (not considered excess $SO_2$). The sulfur steam reforming in the furnace generates $SO_2$ that converts in downstream catalytic converters to liquid sulfur with an excess of $H_2S$.

In an oxidative environment in the furnace or stand-alone sulfur steam reformer, the furnace intermediate zone (and discharge zone), or the sulfur steam reformer, has an excess of $SO_2$, with the sulfur steam reforming reaction contributing $SO_2$. The sulfur steam reforming reaction is performed in the stand-alone sulfur steam reformer and may be performed in the furnace intermediate zone. The furnace discharge gas has $H_2S$ in the excess of $SO_2$ in the furnace discharge gas. If $H_2S$ is sub-stoichiometric (not in excess) in the furnace, an excess of $SO_2$ (an oxidative environment) may be generated in the furnace (e.g., second zone) and for the exhaust gas. In this case, $H_2$-rich gas may be separated from the exhaust gas by quenching the exhaust gas with chilled acidic water, which can absorb a relatively large quantity of $SO_2$. The formed sulfurous acid (a hydrated formed of $SO_2$) may be oxidized in a subsequent oxidation tower utilizing oxygen from air to give sulfuric acid.

FIG. 5 gives reactions in the reductive environment (having excess of $H_2S$) and in which $SO_2$ is consumed at temperatures less than 445° C. The first reaction depicted in the sulfur steam reforming reaction. The second reaction depicted is a Claus reaction. The third reaction depicted under the line is the overall reaction in the reductive environment. This overall reaction is the sulfur steam reforming reaction and the Claus reaction, as combined, and appears as the splitting or dissociation of $H_2S$.

FIG. 6 is a sulfur steam reforming reaction. This reaction produces an oxidative environment due to the formation of $SO_2$ as a product of the reaction.

Heating of the elemental sulfur and the water for the sulfur steam reforming can be direct heating (e.g., FIGS. 7A-8) by direct contact of the elemental sulfur and water with combustion gas in a furnace, or indirect heating (e.g., FIGS. 9-14) by heating in a sulfur burner, electric heater, or boiler.

Immediately below is a summary of FIGS. 7A-14. A reductive environment (excess $H_2S$) or oxidative environment (excess $SO_2$) is listed. A reductive environment is defined in the context as presence of excess $H_2S$. An oxidative environment in defined in the context as presence of excess $SO_2$. Direct heating may be defined herein as the fluid being heated in direct contact with the heating medium (without conduction through an interface). A more detailed description of FIGS. 7A-14 is given further below.

Figure 7A:
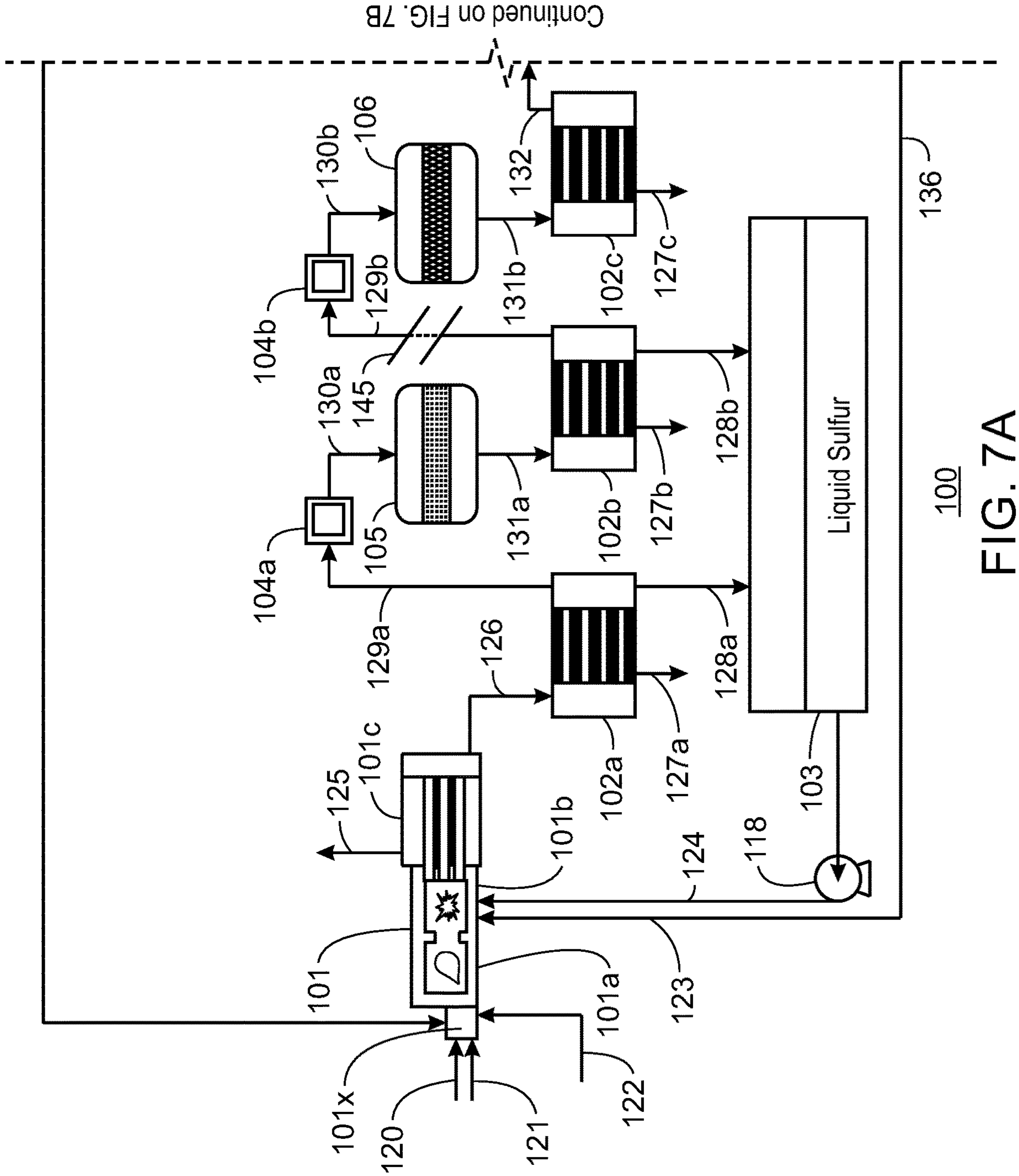
FIGS. 7A-14 are diagrams of hydrogen production systems.
Figure 7B:
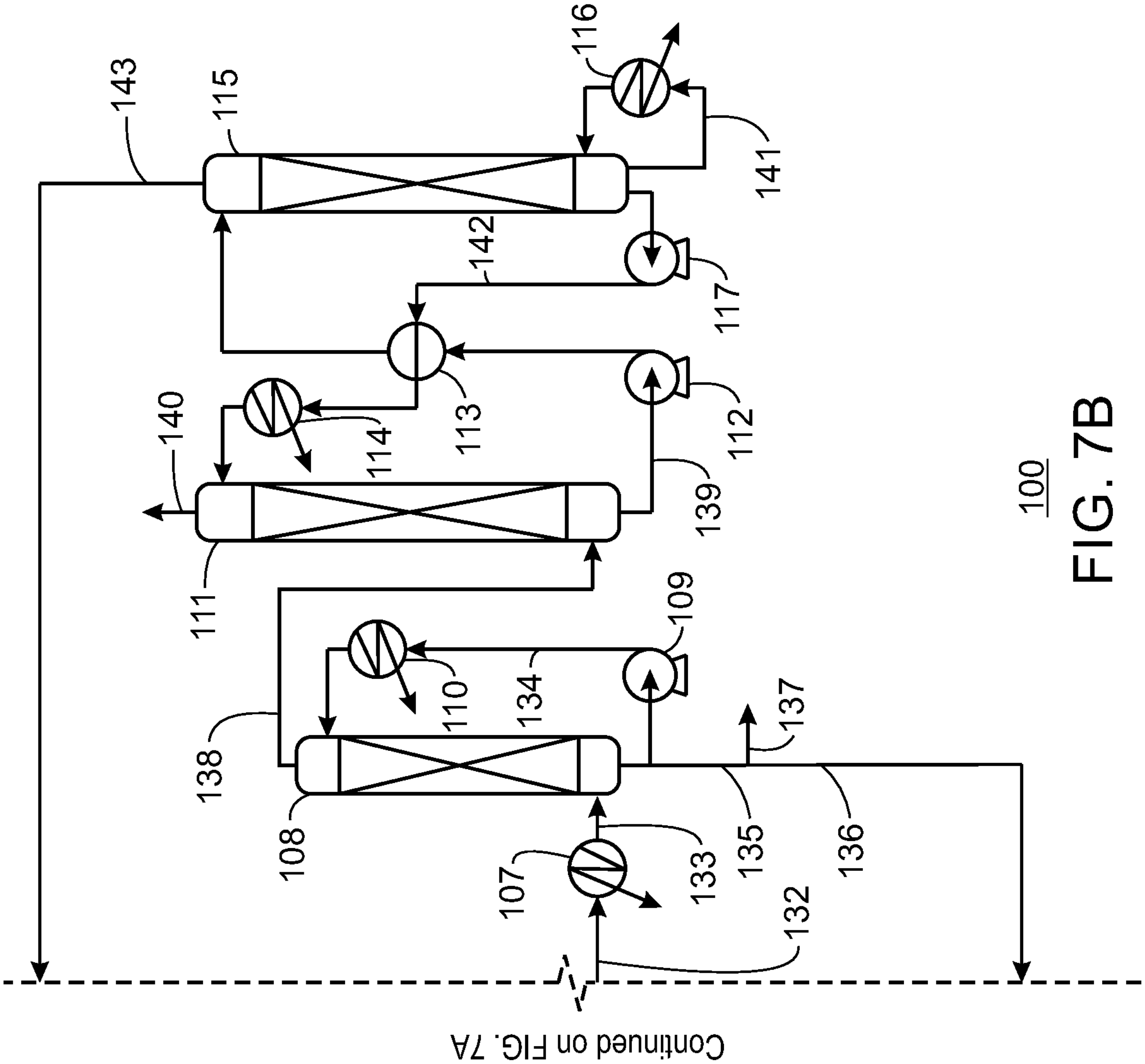

FIGS. 7A and 7B: Direct heating of S and water in reductive environment of Claus furnace $2^{nd}$ zone by direct contact with furnace gas from Claus furnace $1^{st}$ zone. The Claus furnace $2^{nd}$ zone acts as a sulfur steam reformer along with performing the Claus reaction in the heat recovery zone (e.g., boiler).

Figure 8:
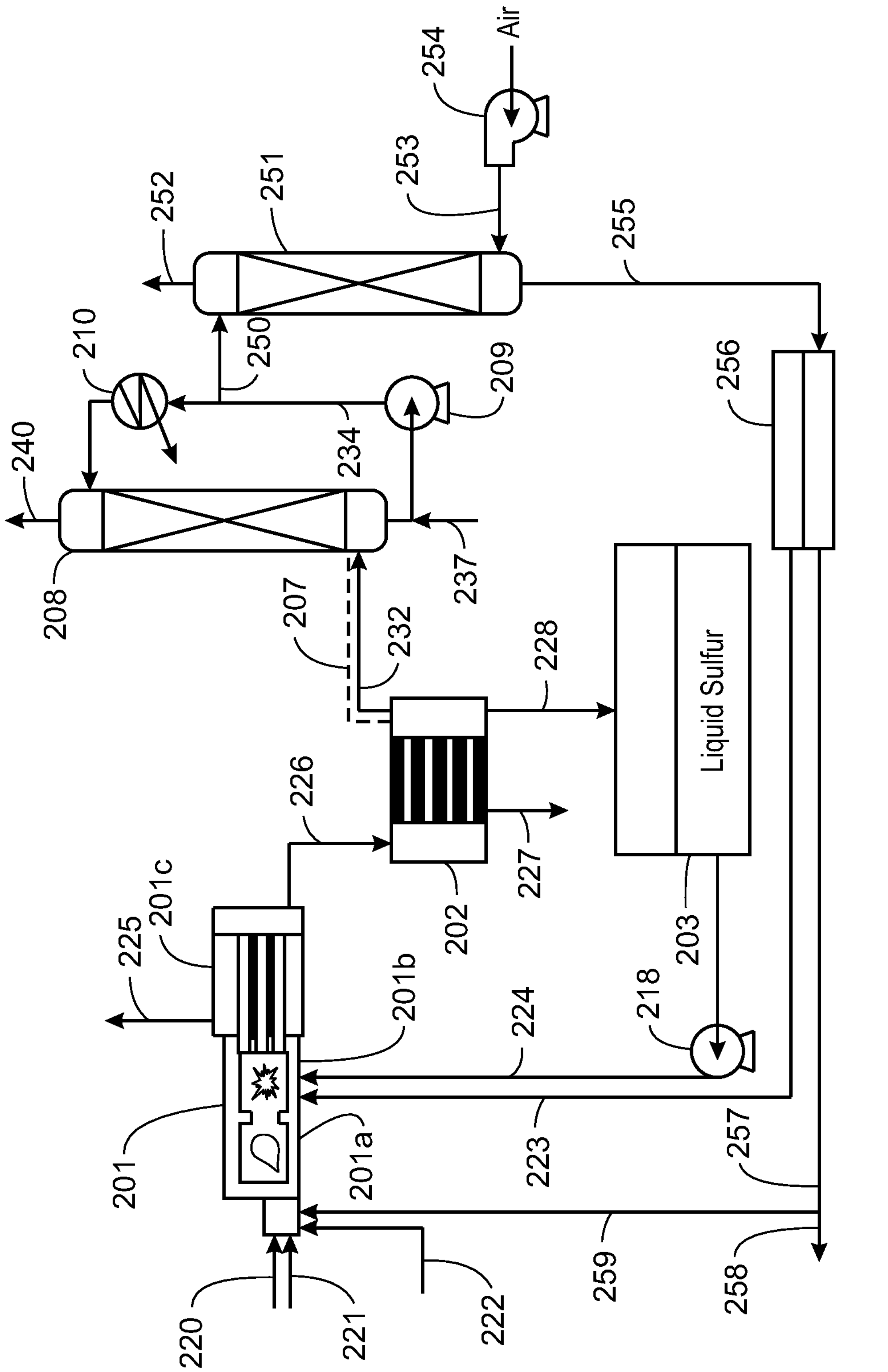

FIG. 8: Direct heating of S and water in oxidative environment of Claus furnace $2^{nd}$ zone by direct contact with furnace gas from Claus furnace $1^{st}$ zone. The Claus furnace $2^{nd}$ zone acts as a sulfur steam reformer along with performing the Claus reaction in the heat recovery zone (e.g., boiler).

Figure 9A:
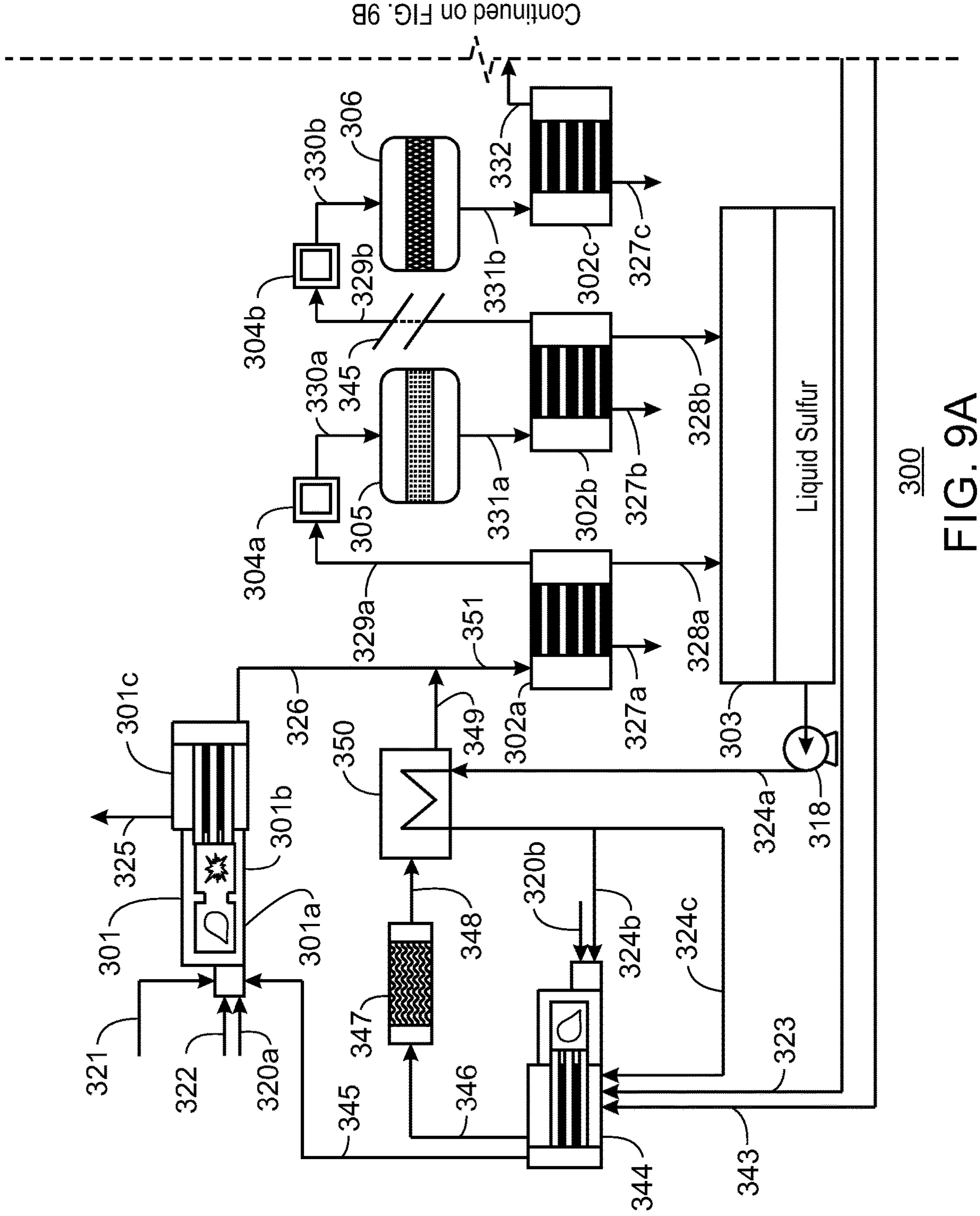
Figure 9B:
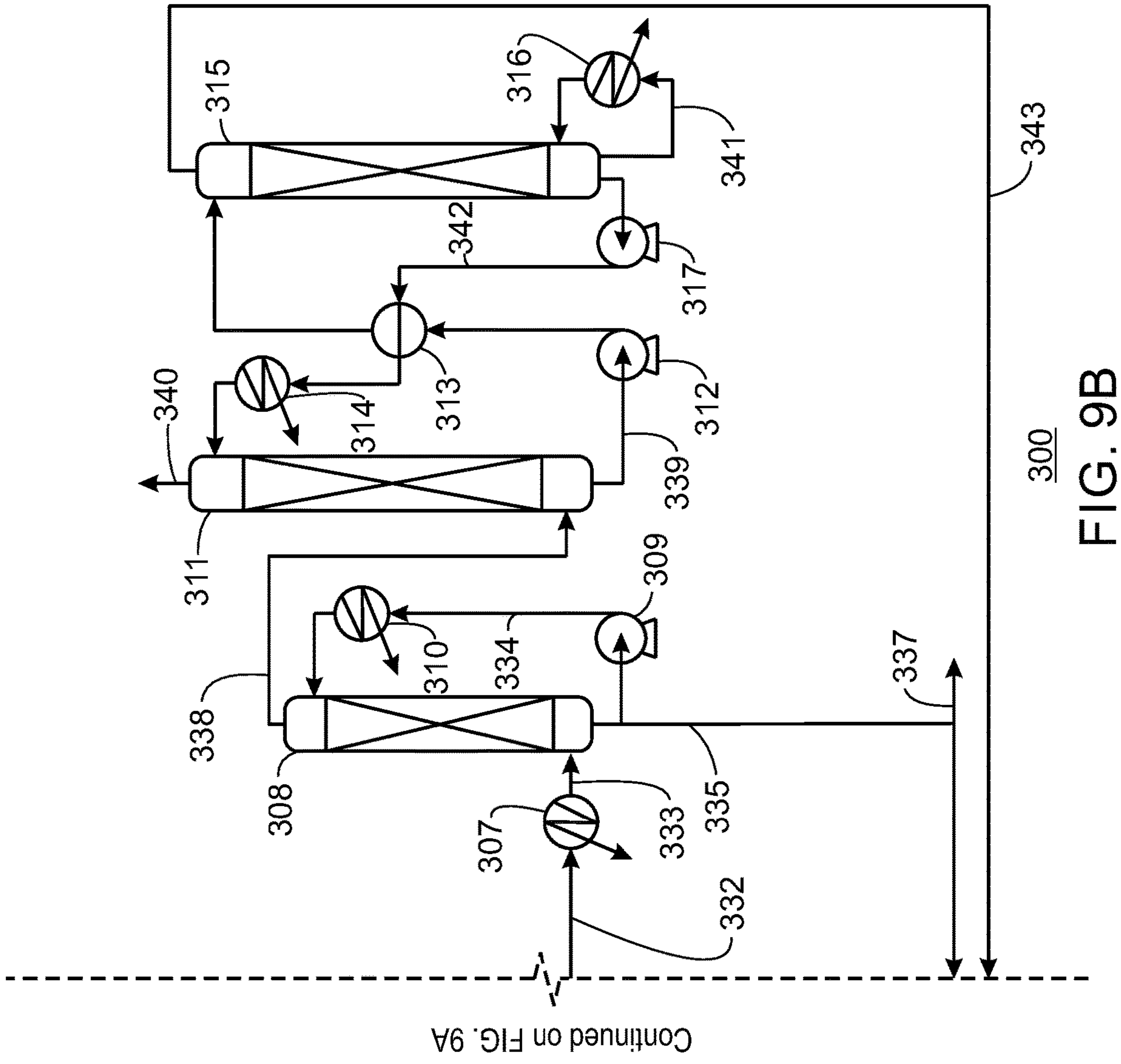

FIGS. 9A and 9B: Indirect heating of S and water (via heating with sulfur burner) for sulfur steam reforming in a sulfur steam reformer separate from the Claus furnace. The Claus furnace $2^{nd}$ zone has a reductive environment and performs the Claus reaction in the heat recovery zone (e.g., boiler).

Figure 10A:
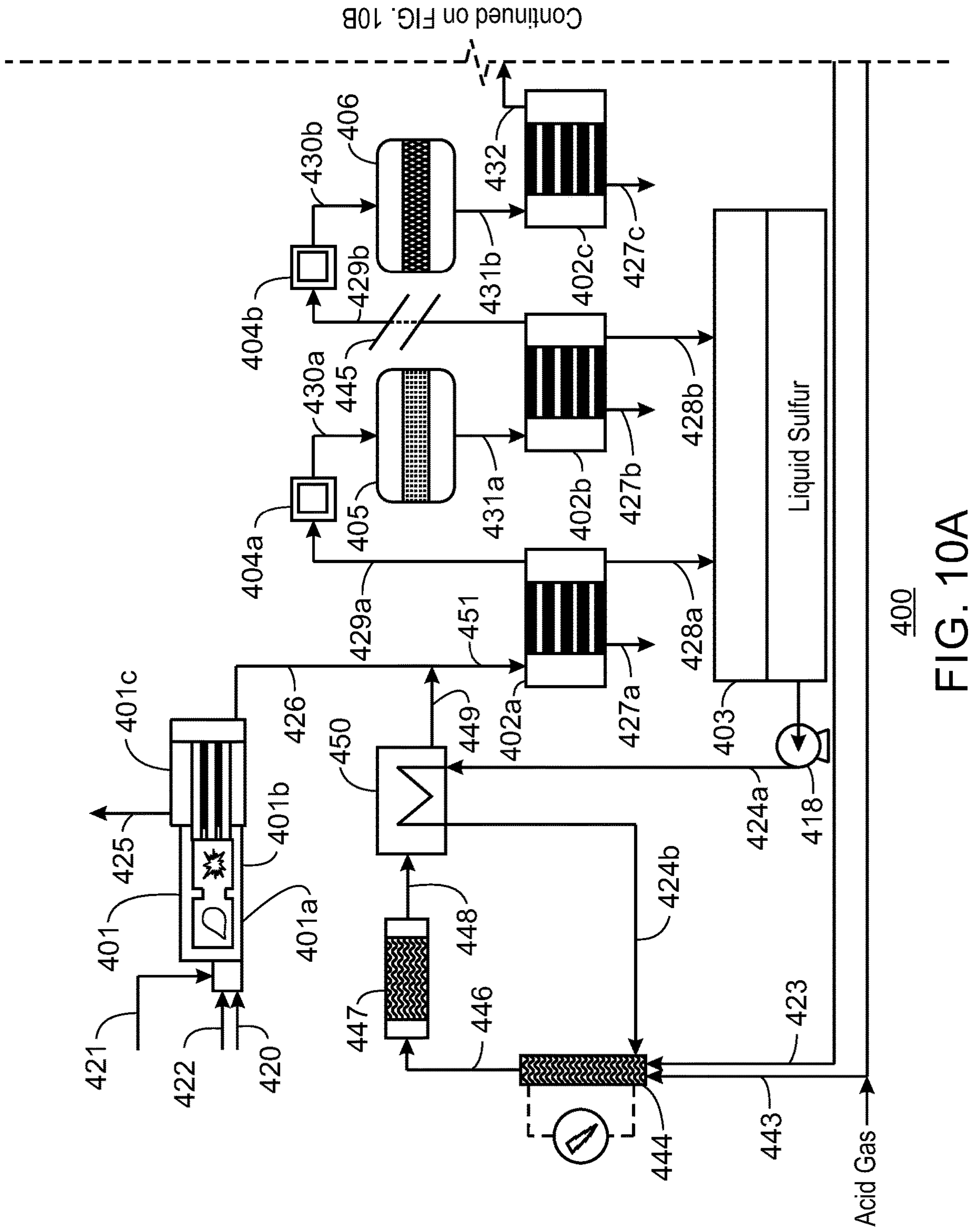
Figure 10B:
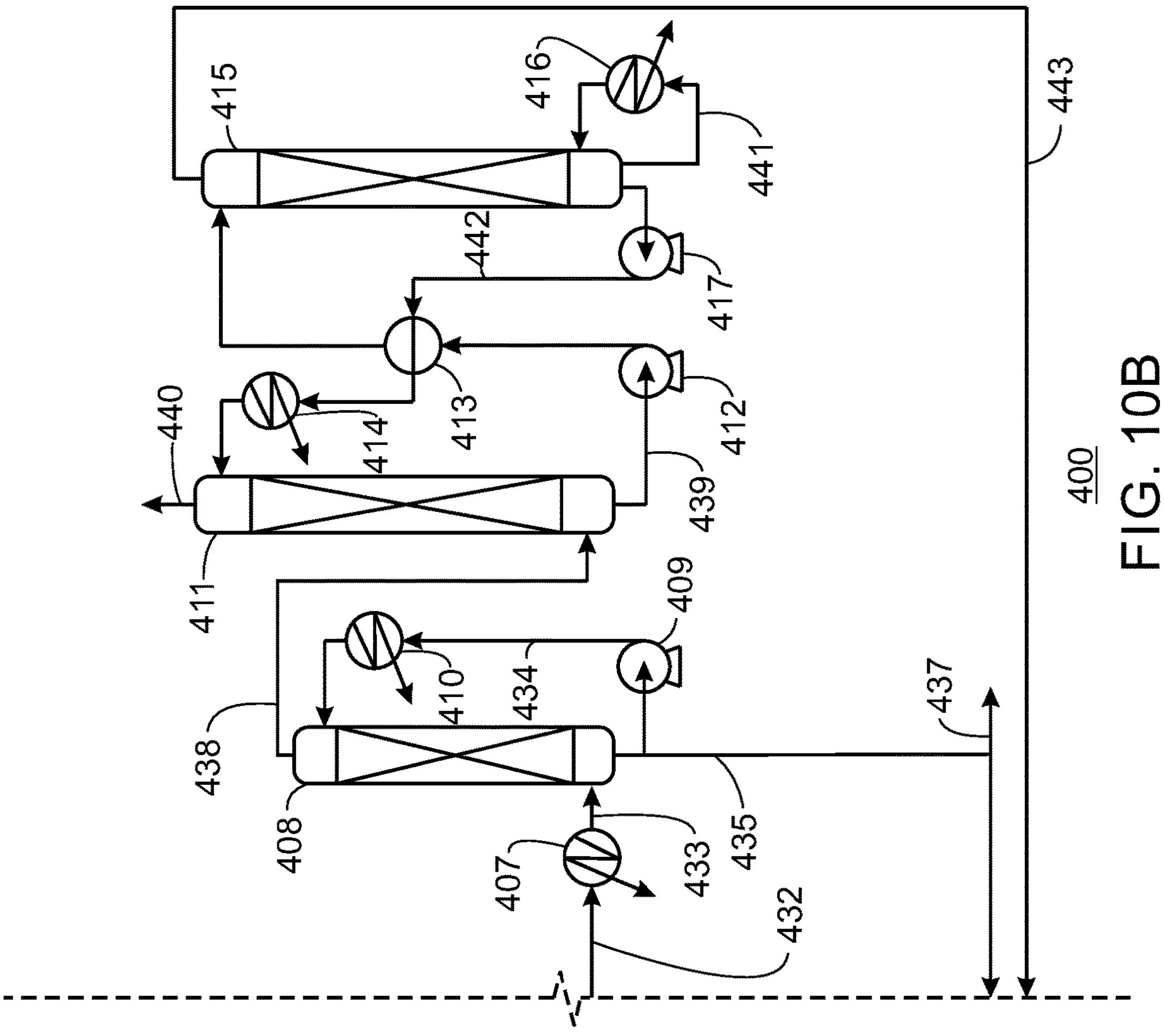

FIGS. 10A and 10B: Indirect heating of S and water (via heating with electric heater or boiler) for sulfur steam reforming in a sulfur steam reformer separate from the Claus furnace. The Claus furnace $2^{nd}$ zone has a reductive environment and performs the Claus reaction in the heat recovery zone (e.g., boiler).

Figure 11:
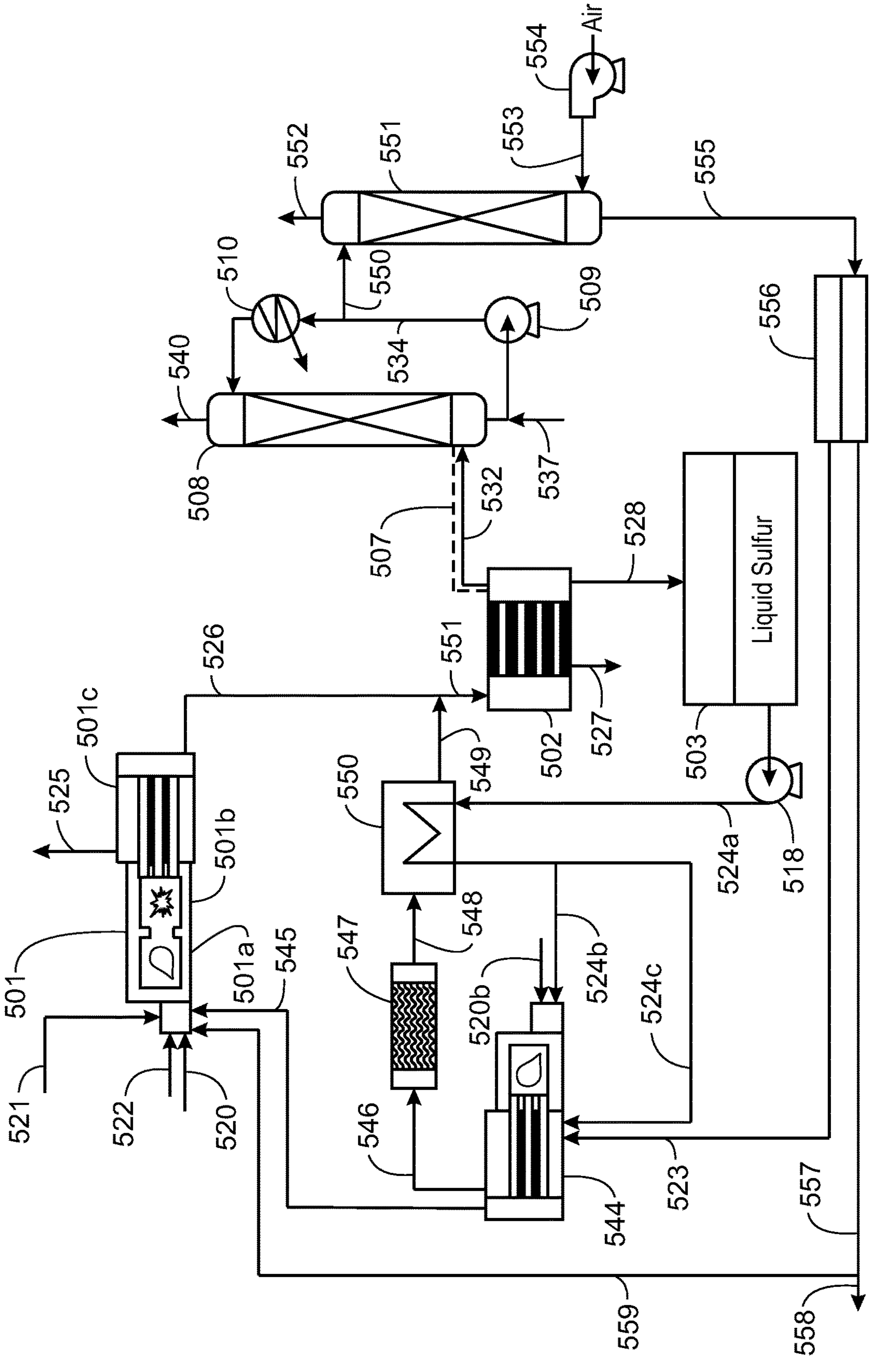

FIG. 11: Indirect heating of S and water (via heating with sulfur burner) for sulfur steam reforming in a sulfur steam reformer separate from the Claus furnace.

The Claus furnace $2^{nd}$ zone has an oxidative environment and performs the Claus reaction in the heat recovery zone (e.g., boiler).

Figure 12:
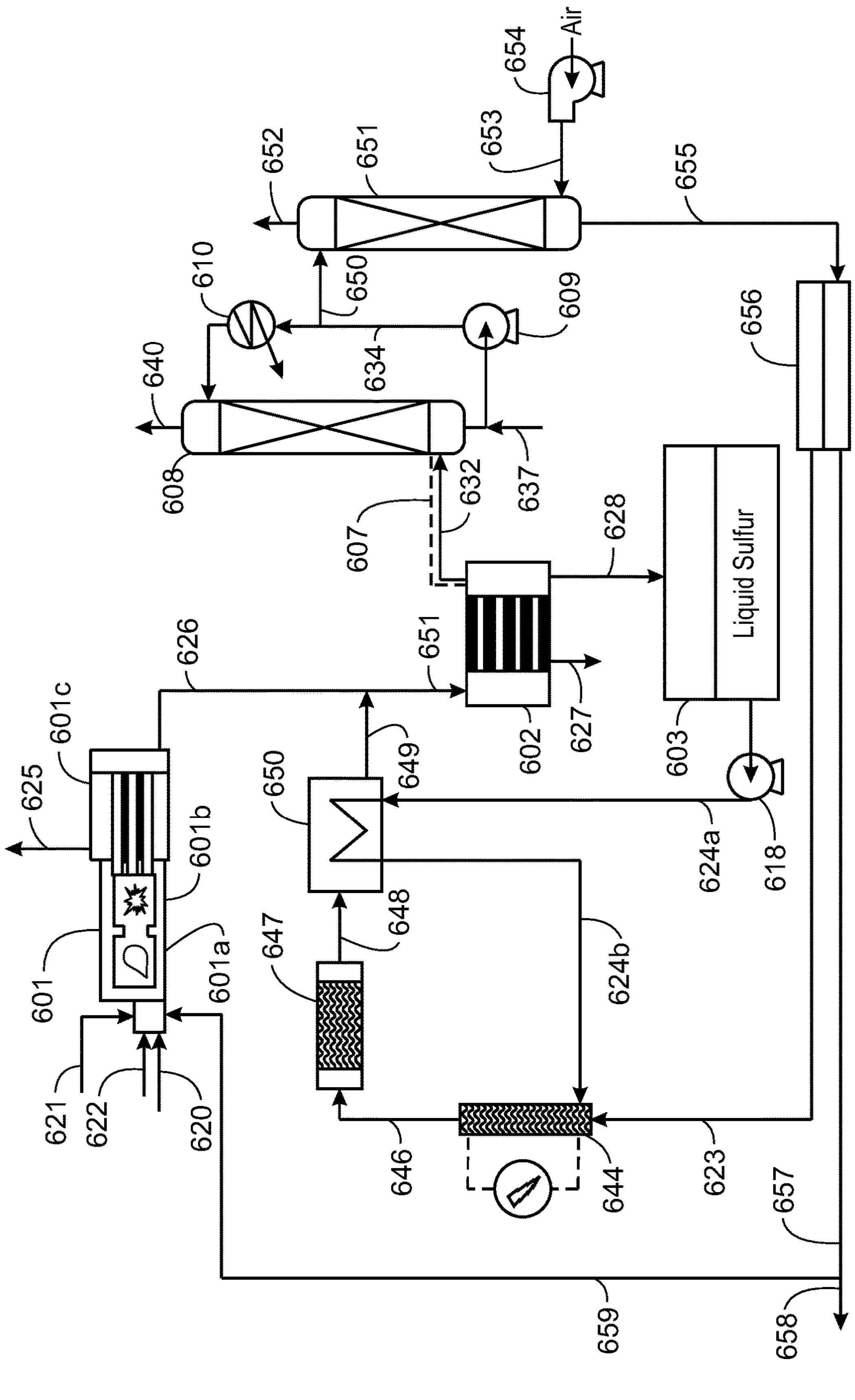

FIG. 12: Indirect heating of S and water (via heating with electric heater or boiler) for sulfur steam reforming in a sulfur steam reformer separate from the Claus furnace. The Claus furnace $2^{nd}$ zone has an oxidative environment and performs the Claus reaction in the heat recovery zone (e.g., boiler). The heating of the fluid in the electric heater is indirect heating.

Figure 13A:
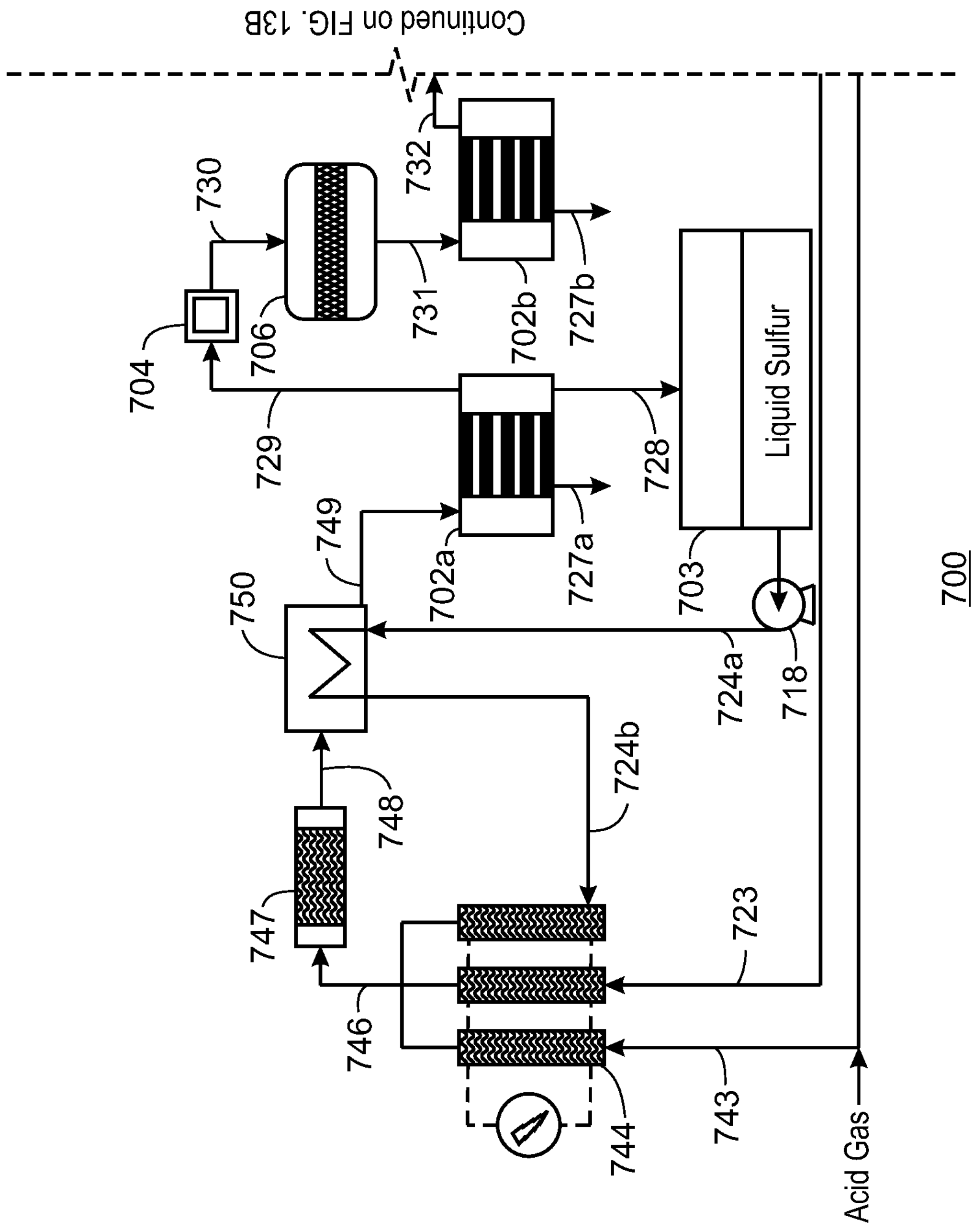
Figure 13B:
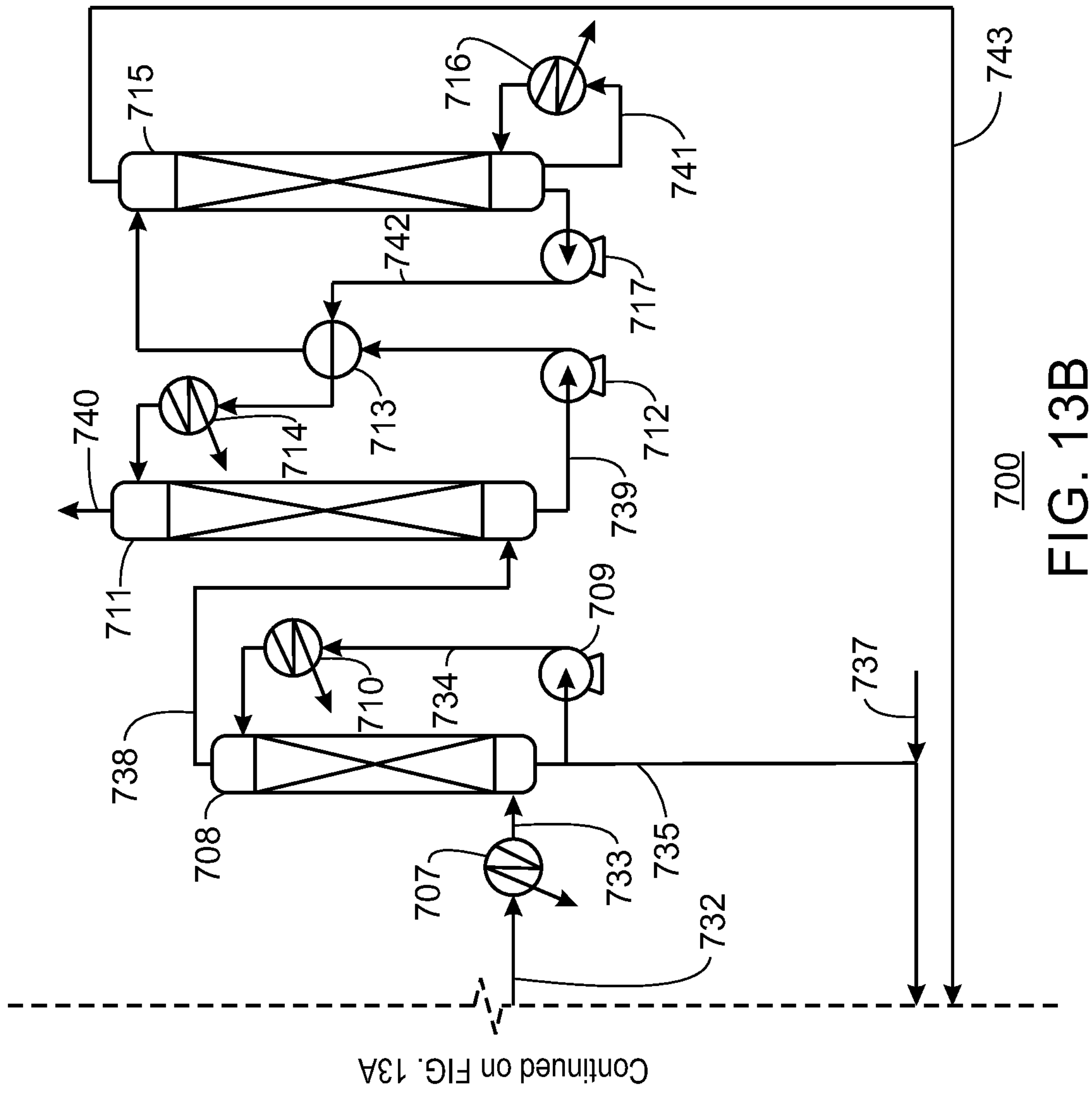

FIGS. 13A and 13B: Indirect heating of S and water (via indirect heating with electric heater or boiler) for sulfur steam reforming in a reductive environment of a sulfur steam reformer. There is no Claus furnace. There is no sulfur burner.

Figure 14:
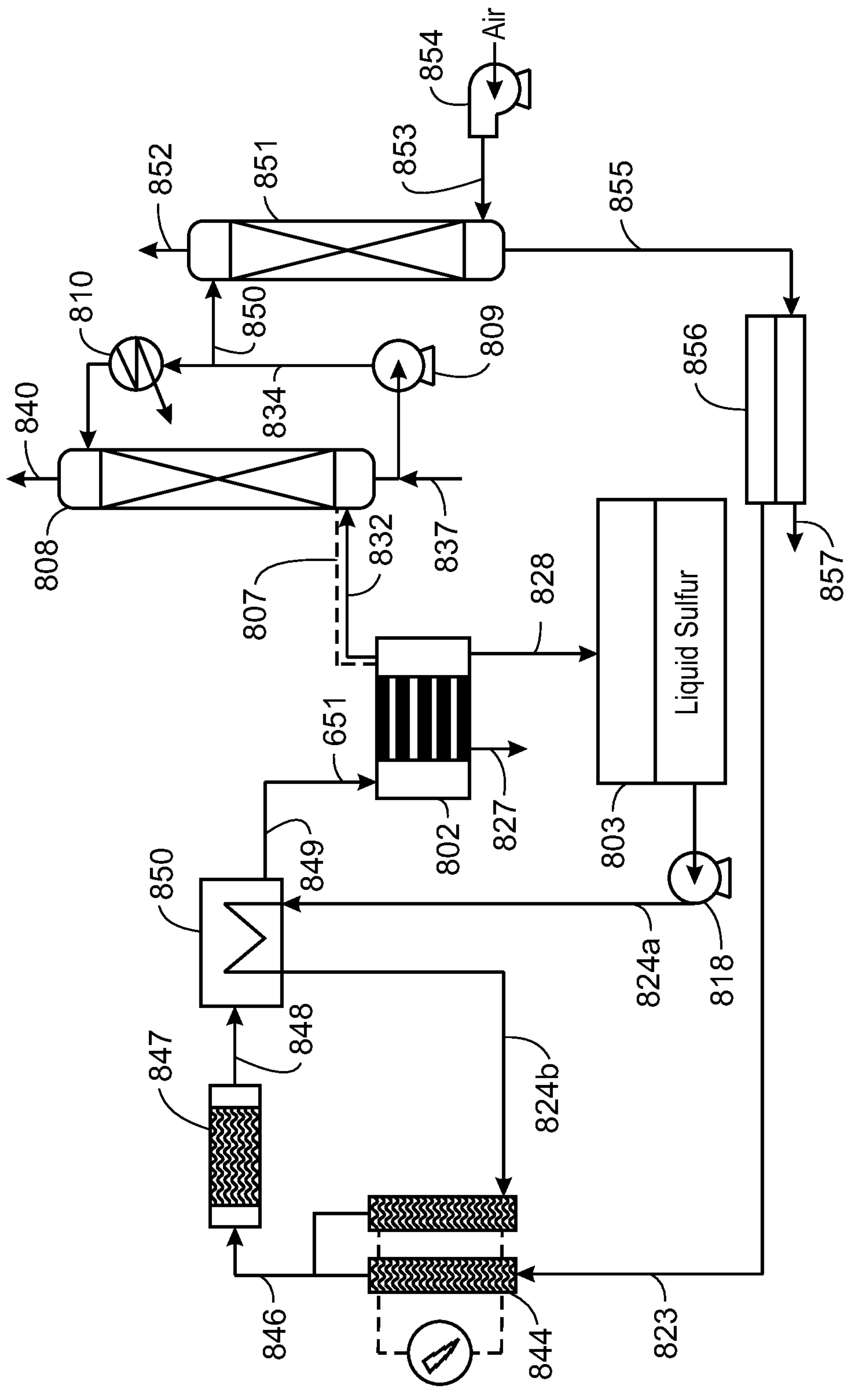

FIG. 14: Indirect heating of S and water (via indirect heating with electric heater or boiler) for sulfur steam reforming in an oxidative environment of a sulfur steam reformer. There is no Claus furnace. There is no sulfur burner.

In FIGS. 7A-8, S and water are externally injected into the Claus furnace $2^{nd}$ zone. In FIGS. 9-12, the system is not depicted as externally injecting S and water into the Claus furnace $2^{nd}$ zone. Nevertheless, a relatively small amount of sulfur steam reforming may occur in the furnace $2^{nd}$ zone without injection of S and $H_2O$ because S and $H_2O$ may be present. In FIGS. 13-14, there is no Claus furnace.

In FIGS. 7A, 9A, and 10A, the system includes Claus catalytic converters downstream of the Claus furnace.

In FIGS. 8, 11, and 12, the system as depicted does not include catalytic converters downstream of the Claus furnace. Therefore, the Claus furnace can be characterized as a Claus-type furnace not in a Claus system having catalytic stages.

In FIGS. 7B, 9B, 10B, and 13B, downstream in the system includes water quenching (to condense and remove water vapor) and selective amine treating to remove $H_2S$. In FIGS. 8, 11, 12, and 14, downstream in the system includes quenching with aqueous sulfurous acid to remove $SO_2$ and $H_2S$, and oxidation of excess aqueous sulfurous acid with oxygen gas in air to give sulfuric acid.

In FIGS. 13A and 14, liquid sulfur is fed to the system. There is no Claus furnace or Claus catalytic reactors. The system is not a Claus system.

FIGS. 7A and 7B are a hydrogen production system 100 that can be a sulfur recovery unit (SRU) (e.g., Claus system) modified for production of hydrogen. An SRU has a reaction furnace vessel (e.g., Claus furnace 101) that receives acid gas having $H_2S$ to combust the $H_2S$ in a $1^{st}$ zone of the furnace. For $H_2$ production, elemental S and water can be fed (including externally injected) to the $2^{nd}$ zone of the furnace to steam reform the S to generate hydrogen gas ($H_2$) that is recovered downstream as product.

The SRU converts the $H_2S$ into elemental S and recovers elemental S. The SRU includes the reaction furnace (e.g., 101) and catalytic converters (e.g., 105) (catalytic reactor vessels) downstream of the reaction furnace that convert $H_2S$ into elemental S. Condenser heat exchangers (e.g., 102*a*, 102*b*, 102*c*) may condense the elemental S gas/vapor into elemental S liquid for recovery (e.g., as molten sulfur to a sulfur pit). The condenser heat exchangers (e.g., shell-and-tube heat exchangers) may also generate steam by vaporizing the water cooling medium with heat from the elemental S gas/vapor.

The furnace that converts $H_2S$ into elemental S may be in the thermal section of the Claus main portion of the system 100. The catalytic converters that convert $H_2S$ into elemental S may be in the catalytic section of the Claus main portion of the system 100.

The system 100 includes the Claus furnace 101 vessel having a $1^{st}$ zone 101*a* and a $2^{nd}$ zone 101*b*. In implementations, an inlet part 101*x* of the furnace 101 mixes streams 121, 122, 143 (having combustible gases) in a nozzle and incorporates oxygen 120 (e.g., from air) to ignite the mixture into the furnace flame for combustion in the furnace combustion chamber. The combustion chamber of the furnace 101 includes the 1St zone 101*a* and the $2^{nd}$ zone 101*b*. The combustion chamber of the furnace 101 has an internal baffle separating the combustion chamber into the $1^{st}$ zone 101*a* (closest to the inlet part 101*x*) and the $2^{nd}$ zone 101*b* (closest to the boiler 101*c*). The $1^{st}$ zone 101*a* may operate at a temperature, for example, in the range of 1200° C. to 1600° C. The Claus furnace 101 includes (or is associated with) a heat exchanger 101*c* to cool the furnace gas and generate steam 125 by vaporizing the water cooling medium. The heat exchanger 101*c* can be part of the furnace 101 vessel. The heat exchanger 101*c* part can be labeled as a boiler or waste heat boiler (WHB) in implementations.

In operation, acid gas 121 is fed to the 1St zone 101*a* of the furnace 101, which may flow through the inlet part 101*x* and/or directly into the $1^{st}$ zone 101*a*. The acid gas 121 includes at least carbon dioxide ($CO_2$) and $H_2S$. The acid gas 121 may be labeled as sour acid gas because the acid gas includes $H_2S$ as an acid gas. The acid gas 121 and recycled $H_2S$ 143 may be partially burned with fed oxygen gas 120 in the $1^{st}$ zone 101*a* of the Claus furnace 101. The Claus furnace 101 (and associated condenser 102*a*) may be considered a thermal stage of the SRU. The oxygen 120 can be provided in fed air, or from an enriched or pure oxygen source. A fuel gas 122, such as methane, can be added to the furnace 101 to maintain the temperature of the furnace.

With the acid gas 121 fed for combustion in the $1^{st}$ zone 101*a* of the Claus furnace 101, an oxidation reaction in the thermal stage in the reaction furnace 101 (thermal reactor) is $2H_2S+3O_2 \rightarrow 2SO_2+2H_2O$, which is the oxidation of the entering $H_2S$ from the fed acid gas 121 with fed oxygen (02) gas 120 to give $SO_2$ and water ($H_2O$) vapor. The reaction furnace 101 as a thermal reactor may also perform the Claus reaction $2H_2S+SO_2 \rightarrow 3S+2H_2O$ in 101*c*, in which $H_2S$ gas and $SO_2$ react to give elemental sulfur (S) gas and water vapor. An overall reaction for the SRU (e.g., Claus system) involving these two reactions (oxidation reaction and Claus reaction) may be characterized as $2H_2S+O_2 \rightarrow 2S+2H_2O$.

The Claus reaction $2H_2S+SO_2 \rightarrow 3S+2H_2O$ may also be performed (as a catalytic reaction) in the catalytic converters 105 (catalytic reactors) that each have catalyst (a catalyst bed) for performing the Claus reaction. The catalyst is employed to convert (promote the conversion of) the $H_2S$ and $SO_2$ to sulfur. The catalyst (e.g., Claus catalyst) may include activated alumina catalyst. The catalyst may include activated aluminum(III) oxide and/or titanium(IV) oxide. Other Claus catalysts are applicable.

With the acid gas 121 fed for combustion in the 1st zone 101*a* of the Claus furnace 101, a mixture of water 123 and liquid sulfur 124 may be injected into the 2nd zone 101*b* of the Claus furnace 101. The reaction of sulfur steam reforming in the 2nd zone may occur at temperatures above 445° C. (718.15° K). In these implementations, the 2nd zone 101*b* can be labeled as a sulfur steam reformer. The mixture (as injected) of water 123 and liquid sulfur 124 in the 2nd zone 101*b* of the Claus furnace may be considered the "direct heating" of the water 123 and the sulfur 124. In other words, the injected mixture (123 and 124) is directly in contact with the hotter combustion gas from combustion of the acid gas 121. In other words, the furnace gas from the 1st zone 101*a*, which includes hot combustion gas, heats by direct contact the water 123 and sulfur 124 in the 2nd zone 101*b*.

The furnace gas from the 2nd zone 101*b* of the Claus furnace may be cooled in the heat exchanger 101*c* part (e.g., as WHB) of the Claus furnace 101. Steam 125, e.g., high-pressure steam in the range of 600 pounds per square inch gauge (psig) to 900 psig may be generated (e.g., from boiler feedwater, demineralized water, steam condensate, etc.) on the side of the heat exchanger 101*c* (e.g., a shell-and-tube heat exchanger) opposite the furnace gas.

The furnace exhaust gas 126 (furnace exhaust gases discharged from the heat exchanger 101*c* as cooled gases) (e.g., having temperature of less than or equal to 315° C.) exiting from the heat exchanger 101*c* enters a condenser 102*a* heat exchanger (e.g., a shell-and-tube heat exchanger). The furnace exhaust gas 126 may be characterized as a process stream in having the $H_2$ produced in the furnace 101 to be recovered. The condenser 102*a* discharges low-pressure steam 127*a*, liquid sulfur 128*a* going to the sulfur receiver 103, and process gas 129*a* going to a reheater 104*a*. The sulfur receiver 103 may be labeled as a sulfur pit, which can include a sulfur receptacle, container, or vessel, and so on. The sulfur receiver or sulfur pit may be a storage vessel in which sulfur that has been condensed is received, and accumulated and stored. A sulfur pit may temporarily accommodate elemental S extracted from an SRU or similar system and that may be conveyed for further processing or to transportation systems, and the like.

The gas 129*a* may be labeled as a process stream in having the $H_2$ produced in the furnace 101 to be recovered, and in having $H_2S$ and $SO_2$ to be converted into elemental S in the Claus reaction. The condenser 102*a* condenses (with water as cooling medium) the elemental S gas/vapor in the furnace exhaust gas 126 to give the liquid sulfur 128*a*. The heat removed from the furnace exhaust gas 126 vaporizes the water cooling medium to give the steam 127*a* (e.g., less than 150 psig). The furnace exhaust gas 126 not condensed discharges as process gas 129*a* to the reheater 104*a* heat exchanger. The process gas 129*a* includes $H_2$, $CO_2$, $H_2S$, $H_2O$, $SO_2$, and typically entrained residual S, and includes $N_2$ if air is fed for the oxygen gas 120 to the furnace 101.

Each Claus catalytic stage (of the $H_2$ production system 100 as an SRU or Claus system) may have a reheater (e.g., 104*a*), a Claus catalytic converter 105 (catalytic reactor vessel that is a vessel having a bed of catalyst, e.g., Claus catalyst), and a condenser (e.g., 102*b*). For clarity, only one Claus catalytic stage is depicted. The system 100 may include 2-4 such catalytic stages. Typical Claus systems may have 2-3 catalytic stages. While only one catalytic stage is depicted, additional Claus catalytic stages (e.g., one additional catalytic stage as the second catalytic state, or two additional catalytic stages as the second catalytic stage and third catalytic stage) are indicated by reference numeral 145.

The reheater 104*a* heat exchanger heats the process gas 129*a* to give reheated process gas 130*a* entering the catalytic converter 105 of that catalytic stage. The reheater may facilitate control of catalyst bed temperature in the catalytic converter 105. The reheater may be, for example, an indirect steam reheater (e.g., shell-and tube heat exchanger) in which the process stream (gas) is heated with steam as heating medium. The reheater may be, for example, a fired-reheater (e.g., direct-fired heater) (e.g., a burner) that burns fuel gas or acid gas to heat the process stream.

The reheated process gas 130*a* (a gas mixture) enters a first of a series of the catalytic converters 105 (each with an associated condenser 102*b* heat exchanger for that respective catalytic stage). Again, for clarity, only one catalytic converter 105 is depicted. Each catalytic converter 105 may perform the Claus reaction converting $H_2S$ and $SO_2$ in the process gas to elemental S and $H_2O$. The associated condenser 102*b* heat exchanger may condense elemental S gas/vapor from the process gas that discharges from the catalytic converter 105 the into liquid elemental sulfur 128*b* that is recovered. The condenser 102*b* (e.g., shell-and-tube heat exchanger) may also generate steam 127*b* (e.g., low pressure steam at less than 150 psig) by vaporizing the water cooling medium. The process gas minus the remove condensed sulfur 128*b* may be forwarded through the next reheater 104*a* to the next catalytic converter 105 of the next catalytic stage.

The process gas flows through the series of converters 105. After the second or third catalytic converter 105 (not shown) with its respective condenser heat exchanger 102*b* (not shown), the gas mixture 129*b* (as the process gas) is heated in a reheater 104*b* to give the process gas 130*b* (as heated) as the process stream that goes through a hydrogenation reactor 106 vessel.

The hydrogenation reactor 106 may be part of a typical or conventional Claus system. The hydrogen gas in the process gas 130*b* may be utilized for the hydrogenation in the reactor 106. The reactor 106 may have catalyst to promote the hydrogenation. For example, the reactor 106 may have a catalyst bed of cobalt-nickel catalyst or cobalt-molybdenum catalyst. In implementations, the reactor 106 may be similar to the hydrogenation reactor in the Shell Claus off-gas treating (SCOT) process/system. Compounds hydrogenated in the reactor 106 may include $SO_2$ (e.g., traces of $SO_2$ in the process gas 130*b*) into $H_2S$. A purpose of the hydrogenation may be to assure that little or no $SO_2$ goes to the absorber 111 because the $SO_2$ could react with the amine in the absorber 111 to form stable salts, and therefore decreasing the performance of the absorber to capture $H_2S$. In other words, $SO_2$ could transform amine into an unreactive species towards $H_2S$.

The hydrogenated gas 131*b* (process gas having the $H_2$ product) discharged from the hydrogenation reactor 106 is cooled in the cooler 102*c* utilizing water as the cooling medium. The cooler 102*c* may be, for example, a shell-and-tube heat exchanger. The condenser 102*c* may generate low pressure steam (e.g., less than 150 psig) by vaporizing the water cooling medium with heat from the hydrogenated gas 131*b*. The cooler 102*c* discharges process gas 132 (gas mixture) that is the hydrogenated gas 131*b* lower in temperature as cooled by the cooler 102*c*. The process gas 132 may include $H_2$, $CO_2$, $H_2O$, $N_2$ (if air is fed for the oxygen gas 120), and residual $H_2S$ (e.g., a relatively small amount of $H_2S$ less than 3 or 4 volume percent [vol %]).

The process gas 132 may be further processed to recover $H_2$ from the process gas 132. In implementations, the process gas 132 may be labeled as Claus tail gas but having a significant amount of $H_2$ (generated via the S steam reforming in the furnace 101). As discussed below, the further processing of the process gas 132 may include removing water from the process gas 132 in a quench tower 108, and treatment in an amine system (including absorber 111 and regeneration column 115) to remove $H_2S$, to give the product $H_2$ along with $CO_2$ and any $N_2$.

The process gas 132 (gas mixture) discharged from the condenser 102*c* may be further cooled with heat exchanger 107 (e.g., a shell-and-tube heat exchanger) that generates steam (e.g., low-low pressure [LLP] steam less than 60 psig) from the water cooling medium in the heat exchanger 107.

The cooled process gas 133 (a gas mixture as the process stream) discharged from the condenser 102*c* may enter a quench tower 108 (e.g., a vertical vessel), where the gas is cooled (e.g., to 60° C. or less) by passing the gas in countercurrent flow with water 134 having a lower temperature than the gas. The quench tower 108 vessel may have, for example, packing in the vessel to provide for increased contact of the gas mixture 138 (flowing upward with the tower 108) with the water 134 (flowing downward through the tower 108). The water 134 can be labeled as quench water. The water vapor in the gas is condensed in the quench tower 108. This condensed water as excess water is removed from the quench tower 108 as water 135 discharged from a bottom part of the quench tower 108.

A portion of the water 135 is sent as water 137 to sour water treatment. Another portion of the water 135 is sent to the furnace 101. Yet another portion 134 of the water 135 is routed through an air cooler 110 heat exchanger via a pump 109 (e.g., a centrifugal pump) as recycle to an upper part of the tower 108. The water 134 may discharge from the air cooler 110, for example, at 60° C. or less.

The overhead gas 138 discharging overhead from the quench tower 108 is generally the process gas 133 entering the tower 108 minus the water vapor condensed and removed from the process gas 133. The overhead gas 133 may be sent to gas sweetening unit (an amine treating system) to separate the $H_2S$ from the $H_2$ in the overhead gas 133. The amine treating system includes the absorber 111 and the regeneration distillation column 115 (also called a desorber), e.g., as described in U.S. Pat. No. 10,525,404 B2, U.S. Pat. No. 11,241,652 B2, and U.S. Pat. No. 11,130,094 B2, all three of which are incorporated herein by reference in their entirety.

The overhead gas 138 from the quench tower 108 may enter the absorber 111, such as of a selective amine treatment system, to separate $H_2S$ from the $H_2$ gas. In particular, the overhead gas 138 from the quench tower 108 enters at a bottom portion of the absorber 111 column vessel (e.g., having packing) and flows upward in a countercurrent flow direction with respect to liquid aqueous amine flowing downward through the absorber 111. The amine absorbs $H_2S$ from the gas 138 to give an intermediate product gas 140 discharged overhead from the absorber 111.

In implementations, the amine does not readily absorb $CO_2$, so that the $CO_2$ does not discharge with $H_2S$ 143. Selective amine process may work on the principle that the chemical structure of selective amine, e.g., methyldiethanolamine (MDEA), is not suited to form a carbamate with $CO_2$, as the MDEA does not have a proton on the nitrogen, and can only sequester dissolved $CO_2$ (or carbonic acid) via deprotonation. Similarly, the amine will capture $H_2S$ via deprotonation. However, the rate of gas dissolution in amine solution ($H_2S$ being faster than $CO_2$) is large enough that, using the residence time and absorber temperature, the selective amine process can separate with high selectivity $H_2S$ from $CO_2$. It is possible that there are traces of $CO_2$ in $H_2S$ 143 stream. If so, the amount is very small.

The intermediate product gas 140 (a gas stream) has the $H_2$ product. The intermediate product gas 140 is labeled as intermediate because the gas 140 includes $CO_2$ in addition to the $H_2$. The intermediate product gas 140 includes $H_2$ and $CO_2$, and may further include $N_2$ gas if air is used as a source of oxygen gas 120. Again, the intermediate product gas 140 discharged overhead from the absorber 111 has $H_2$ gas as a product along with $CO_2$ (and $N_2$ gas if air is utilized as the oxygen 120 source). The intermediate product gas 140 may be further processed to isolate the product $H_2$ gas, for example, by membrane separation, pressure swing adsorption (PSA), etc.

The bottoms stream 139 including liquid amine having $H_2S$ separated from the hydrogen gas discharges from a bottom portion of the absorber 111 vessel and is sent via the pump 112 through a heat exchanger 113 as feed to the regeneration distillation column 115 (also known as a desorber vessel). The bottom stream 139 is rich in $H_2S$. In the regeneration column 115, $H_2S$ is removed (desorbed) from the amine. An $H_2S$-enriched gas 143 discharges overhead from the regeneration distillation column 115 and is recycled as feed to the furnace 101. A complementary gas in this $H_2S$-enriched gas 143 that is recycled to the furnace 101 may be carbon dioxide.

The regeneration (desorber) column 115 has an associated reboiler 116 heat exchanger (e.g., with steam as the heating medium). Bottoms liquid 141 from a bottom portion the regeneration column 115 is vaporized in the reboiler 116 (e.g., steam reboiler) for flow as vapor upward through the column 115.

Bottoms liquid 142 (liquid amine lean in $H_2S$) from the bottom portion of the regeneration distillation column 115 is sent via pump 117 through the heat exchanger 113 (e.g., shell and tube heat exchanger) and the heat exchanger 114 to an upper portion of the absorber column 111. Both heat exchangers 113, 114 cool the bottoms liquid 142.

The regeneration column 115 may be characterized as a regeneration column because the regeneration column 115 receives the bottoms stream 139 (relatively rich in $H_2S$) (labeled as rich amine because amine rich in $H_2S$) from the absorber column 111 and returns the stream 142 lean in $H_2S$ (labeled as lean amine because amine lean in $H_2S$) to the absorber column 111. Again, the intermediate product gas 140 discharged from the absorber 111 (e.g., discharged overhead from the absorber 111) includes $H_2$ (as product) and may include $CO_2$, and may further include $N_2$ if air is used as a source for feed $O_2$ 120.

As mentioned, the first application category of direct heating of the water vapor and sulfur vapor may be performed in the oxidative environment, as indicated in the example of FIG. 8. An excess of $SO_2$ exists in the furnace. The excess of $SO_2$ may be due to the sulfur steam reforming reaction in the furnace. Catalytic converters are not employed because there is little or no $H_2S$, or sub-stoichiometric $H_2S$ with respect to $SO_2$, in the furnace discharge gas.

FIG. 8 is a hydrogen production system 200 employing a Claus-type furnace 201. Sour acid gas 221 and recycled sulfuric acid 259 are partially burned with oxygen 220 (e.g., from fed air) in the $1^{st}$ zone 201*a* of the Claus furnace 201. The oxygen gas 220 fed for the $1^{st}$ zone 201*a* can come from air that is fed or from an enriched/pure oxygen source. The Claus furnace 201 operating temperature in the $1^{st}$ zone 101*a* may be, for example, in the range of 1200° C. to 1600° C. A fuel gas 222, such as natural gas or methane, can be added to give combustion to maintain the temperature of the furnace 201. The fed acid gas 221 can be replaced by liquid elemental S (in that liquid S is fed instead of acid gas 221). In that case, the combustion may be labeled as occurring in a sulfur burner instead of a Claus furnace. The liquid sulfur (if fed in lieu of acid gas 221) may be fed to both the $1^{st}$ zone and the $2^{nd}$ zone? The liquid sulfur fed to the $1^{st}$ zone may facilitate to bring the reaction to temperature (via combustion of S) the liquid sulfur fed to the $2^{nd}$ zone may be for the performance of the sulfur steam reforming reaction.

For the acid gas 221 as feed, a mixture of water 223 and liquid sulfur 224 is injected into the $2^{nd}$ zone 201*b* of the Claus furnace 201. This may be characterized as direct heating of the water 223 and the liquid sulfur 224. The reaction of the sulfur steam reforming (the steam reforming of the sulfur) in the $2^{nd}$ zone 201*b* occurs at a temperature above 445° C. (718.15° K). The sulfur steam reforming (reaction of elemental S with $H_2O$) generates $H_2$ that is recovered downstream as product, and therefore the system 200 may be labeled as an $H_2$ production system.

The furnace gas (having the $H_2$) from the $2^{nd}$ zone of the Claus furnace is cooled in the heat exchanger part 201*c* of the Claus furnace 201. This cooling in the heat exchanger 201*c* (e.g., WHB) of the furnace 201 produces steam 225 on the other side of the heat exchanger 201*c*. In other words, the furnace gases are cooled on one side of the heat exchanger 201*c* (e.g., shell-and-tube heat exchanger), and the water cooling medium is vaporized into steam on the other side of the heat exchanger 201*c* that discharges as steam 225 (e.g., high pressure steam in the range of 600 psig to 1500 psig).

The furnace exhaust gas 226 is the furnace exhaust gases discharged from the heat exchanger 201*c*. The furnace exhaust gas 226 as exiting gases from the furnace 201 (discharged from furnace part 201*c*) may have a temperature, for example, of less than or equal to 315° C. The temperature (e.g., 300° C. to 315° C.) may be significant as it may correspond to a minimum of molten sulfur viscosity. The furnace exhaust gas 226 enters a condenser 202 (e.g., shell-and-tube heat exchanger) that produces low-pressure steam 227 (e.g., <150 psig), liquid sulfur 228 going to the sulfur pit 203, and process gas 232 (cooler gases) maintained at temperature as discharged with heat tracing 207 to avoid sulfur deposition. The process gas 232 discharged from the condenser 202 may be labeled as a process stream because the process gas 232 includes $H_2$ (generated in the sulfur steam reforming in the $2^{nd}$ zone 201*b* of the furnace 201) to be recovered as product.

The cooling medium for the condenser 202 may be water (e.g., boiler feedwater, demineralized water, steam condensate, etc.) that is vaporized on one side of the condenser 202 heat exchanger with heat from the furnace exhaust gas 226 on the other side of the condenser 202 heat exchanger to give the steam 227. The condenser 202 condenses (with the water cooling medium) the elemental S vapor in the furnace exhaust gas 226 to give the liquid elemental sulfur 228 discharged to the sulfur pit 203. The furnace exhaust gas 226 minus the condensed elemental sulfur 228 discharges as process gas 232 (e.g., cooler gases in having a lower temperature than the furnace exhaust gas 226) to the quench tower 208. The process gas 232 includes $H_2$ (generated in the sulfur steam reforming in the $2^{nd}$ zone 201*b*), $H_2S$, $SO_2$, $CO_2$, and relatively small amount of S vapor. The heat tracing 207 may be disposed along the conduit conveying the process gas 232 to the quench tower 208 to prevent or reduce sulfur deposition (from elemental S vapor) in the process gas 232. The heat tracing 207 may be, for example, electrical tracing or steam tracing, as would be appreciated by one of ordinary skill in the art. The heat tracing 207 may be a component of a heat tracing system.

The process gas 232 enters the quench tower 208, where the gas mixture is cooled (e.g., to 60° C.) by passing the gas in countercurrent flow with aqueous sulfurous acid 234. The residual elemental S entrained in the gas stream 232 is transformed into soluble polythionic acid in presence of excess of sulfurous acid. Therefore, no (or little) solid—or slurry—is accumulated in the quench tower 208. The quench tower 208 may remove $SO_2$ by absorption of $SO_2$ into the aqueous sulfurous acid 234. The dissolved $SO_2$ may hydrate into sulfurous acid $SO_2+H_2O=>H_2SO_3$. The $H_2S$ may react readily with sulfurous acid to form sulfur colloid and subsequently polythionic acid. The gas 240 (gas stream) that discharges overhead from the quench tower 208 includes the product $H_2$ gas, along with $CO_2$ if liquid sulfur is not fed in lieu of acid gas 221 to the furnace 201. The gas 240 may additionally include $N_2$ gas if air is the oxygen 220 source. The gas 240 can be utilized as product or can be processed to isolate the $H_2$ gas as product.

A makeup of the water (makeup water 237) may be added to the bottoms stream 209 of water (aqueous sulfurous acid) that discharges from the bottom portion of the tower 208 to give water 234. The water 234 (aqueous sulfurous acid) is sent via a pump 209 through an air cooler 210 heat exchanger to an upper part of the tower 208. The acid(s) in the water 234 may be sulfurous acid and some traces of polythionic acid. The water 234 may more accurately be labeled as aqueous sulfurous acid or aqueous sulfurous acid solution. The air cooler 210 may cool (with air as cooling medium) the water 234, for example, to a temperature less than 60° C.

A portion 250 of the water 234 (aqueous sulfurous acid) (e.g., upstream of the cooler 210) is sent to an oxidation tower 251 vessel. The portion 250 of the water 234 may enter at an upper part of the oxidation tower 251 and flow downward in the tower 251 in a countercurrent flow direction with respect to the air 253 flowing upward through the tower 251. The air 253 may be injected into a bottom part of the tower 251 via a blower 254 (e.g., centrifugal fan) (e.g., that receives ambient air or plant utility air). The oxygen gas in the air 253 may oxidize the aqueous sulfurous acid ($H_2SO_3$) into sulfuric acid ($H_2SO_4$) in the oxidation tower 251. The overhead gas 252 (e.g., air substantially depleted in oxygen) exiting overhead from the oxidation column 251 includes the air 253 minus the $O_2$ gas from the air 253 utilized in the oxidation. Thus, the overhead gas 252 is $N_2$ gas with some $O_2$ gas (e.g., 2-4 vol % of $O_2$).

Aqueous sulfuric acid 255 discharges (e.g., as a bottoms stream) from a bottom portion of the tower 251 and is sent through a membrane 256. The membrane 256 may be a nanofiltration (NF) membrane, reverse osmosis (RO) membrane, etc., and associated membrane system. The membrane treatment of acidic aqueous waste is well known in the mining industry. Polymeric membranes are applicable for the recovery of sulfuric acid. An example of applicable polymer membrane is TFC-HR (thin film composite polyamide membrane) of Koch Membrane Systems available from Koch Industries, Inc. having headquarters in Wichita, Kansas USA. Another example of an applicable polymer membrane is HYDRACoRe70pHT (sulfonated polyethersulfone membrane) from Hydranautics of Nitto Denko Corporation having headquarters in Osaka, Japan. Yet another example is Desal KH (piperazine-based polyamide membrane) available from Suez Waters USA Inc. having headquarters in Revose, Pennsylvania USA.

The membrane 256 discharges sulfuric acid 257 (e.g., more concentrated than the entering sulfuric acid 255) as retentate, and relatively pure or clean water 223 as permeate. A portion 258 of the sulfuric acid 257 (e.g., concentrated) is removed as product to be valorized. Another portion 259 of the concentrated sulfuric acid 257 is provided (e.g., conveyed via a conduit) to the furnace 201 to enrich the Claus furnace 201 in oxygen, in which aspects may be described in the U.S. Pat. No. 4,826,670, US Published Patent Application No. 2022/0177306A1, and US Published Patent Application No. 2022/0199908A1, all three of which are incorporated by reference herein in their entirety.

In embodiments, for the aforementioned indirect heating, the elemental S vapor and water for the sulfur steam reforming may be heated, for example, via [1] a sulfur burner or via [2] an electric heater or boiler. This heating of the S vapor and water may be labeled as indirect heating for the sulfur steam reformer. For instance, such may be characterized as indirect heating in that the S vapor and water is not directly heated in the Claus furnace $2^{nd}$ section labeled as a sulfur steam reformer. Such may also be characterized as indirect heating because the heating in the sulfur, electric heater, or boiler may be indirect (not direct contact with the heating medium). For instance, the heating in sulfur burner may be characterized as indirect because the heat transfer is by conduction through the tube wall.

The S vapor with water as heated via the sulfur burner or electric heater (or boiler) may be subjected to steam reforming in a sulfur steam-reformer vessel to generate $H_2$. The reformed mixture having $H_2$ discharged from the sulfur steam reformer may be combined with the furnace exhaust gas discharged from the Claus furnace (if present). Furthermore, as indicated, the indirect heating may be implemented associated with the reductive environment in the Claus furnace $2^{nd}$ zone or with the oxidative environment in the Claus furnace $2^{nd}$ zone, or in the sulfur steam reformer if a Claus furnace is not utilized in the system.

Described below for indirect heating for sulfur steam reforming in a sulfur steam reformer separate from the Claus furnace or Claus-type furnace include: [a] a system (e.g., FIGS. 9A and 9B) having a reductive environment in the furnace $2^{nd}$ zone and indirect heating via a sulfur burner (flame heater) for the sulfur steam reformer separate from Claus furnace; [b] a system (e.g., FIGS. 10A and 10B) having a reductive environment in the furnace $2^{nd}$ zone and indirect heating via an electric heater or boiler for the separate sulfur steam reformer; [c] a system (e.g., FIG. 11) having an oxidative environment in the furnace $2^{nd}$ zone and indirect heating via a sulfur burner (or flame heater) for the separate sulfur steam reformer; and [d] a system (e.g., FIG. 12) having an oxidative environment in the furnace $2^{nd}$ zone and indirect heating via an electric heater or boiler for the separate sulfur steam reformer. The heating in the sulfur burner may be considered "indirect" heating because sulfur and water are not in direct contact with the combustion gases, but instead heat is transferred by conduction through the tube wall.

The term "indirect" heating may mean that the heat transfer in the sulfur burner, electric heater, and boiler is not by direct contact with the heating medium but instead by indirect contact. In implementations, if a heating element of the electric heater is immersed in the fluid being heated, that is generally not considered direct heating in the present context.

FIGS. 9A and 9B are a hydrogen production system 300 that can be a sulfur recovery unit (SRU) (e.g., Claus system) incorporating production of hydrogen. An SRU has a reaction furnace (e.g., Claus furnace 301) that receives acid gas (e.g., 321) having $H_2S$ to combust the $H_2S$ in a $1^{st}$ zone of the furnace. For hydrogen production, elemental sulfur and water are heated in a sulfur burner 344 and the sulfur is steam reformed in a sulfur steam reformer 347 (that receives the heated mixture of sulfur and water) to generate $H_2$ gas for recovery downstream. In implementations, the sulfur burner 344 and sulfur steam reformer 347 may be characterized as operationally in parallel with the Claus furnace 301.

The SRU converts the $H_2S$ into elemental sulfur and recovers elemental sulfur. The SRU includes the Claus reaction furnace 301 that converts $H_2S$ into elemental S gas (vapor), and catalytic converters 305 (catalytic reactor vessels) downstream of the reaction furnace 301 that convert $H_2S$ into elemental S gas (vapor). Condenser heat exchangers (e.g., 302*a*, 302*b*, 302*c*) may condense the generated elemental S gas into elemental S liquid (e.g., 328*a*, 328*b*) for recovery (e.g., as molten sulfur to a sulfur pit 303).

In FIG. 9A, a sulfur burner 344 has a combustion chamber for combusting sulfur and a tube side to receive the combustion gases to heat gas components on the shell side. In operation, the sulfur burner 344 is fed liquid water 323, liquid elemental sulfur 324*c*, and $H_2S$ gas 343 to the shell side of the burner 344. The sulfur burner 344 heats the liquid water 323, the liquid elemental sulfur 324*c*, and the $H_2S$ gas 343 on the shell side (outside of the heat exchanger tubes) to a temperature of at least 445° C. (718.15° K).

The sulfur burner 344 discharges from the shell side a mixture 346 (as heated to at least 445° C.) of $H_2O$ vapor, $H_2S$ and S vapor to the sulfur steam reformer 347. IN implementations, the sulfur steam reformer 347 may be, for example, a relatively large pipe with a static mixer in the pipe to increase gas-gas contact. The internal in the steam reformer 347 may be the static mixer. Thus, the sulfur steam, reformer can be consider a wide spot in the line with an in-line static mixer.

In implementations, heat is not added to the reformer 347, other than the heat in the entering mixture 346. In other implementations, a heating element can be included on the exterior of reformer. However, the temperature of stream 346 (e.g., about 600° C.) may be considered adequate and without significant effect of heat losses from the pipe. The sulfur steam reforming in the sulfur steam reformer 347 involves reacting the S vapor with $H_2O$ to generate $H_2$. The $H_2S$ present may convert the $SO_2$ produced by the S steam reforming into liquid sulfur during the cooling stage. As for heat management, the stream 343 may generally not need to be heated and could be added to the stream 348.

The sulfur steam reformer 347 discharges a reformed mixture 348 (products of the sulfur steam reformer 347 including $H_2$) to an economizer 350. The economizer 350 cools the reformed mixture 348 to discharge the cooled reformed mixture 349 having the $H_2$. The economizer 350 may be a shell-and-tube heat exchanger. An economizer may be a heat exchanger in which the respective hot and cold sources (streams) that are cross-exchanged are from the system/process (process streams). In other words, an economizer may recover heat from the system (process).

The economizer 350 recovers heat from the reformed mixture 348 and transfers the heat to the liquid sulfur 324*a* to heat (pre-heat) the sulfur 324*a* to increase the temperature of the liquid sulfur 324*a*. The liquid sulfur 324*a* as heated in the economizer 350 is fed as [1] heated liquid sulfur 324*b* for combustion in the sulfur burner 344 and as [2] heated liquid sulfur 324*c* on the shell side (outside the tubes) of the sulfur burner 344.

The heat in the sulfur burner 344 is provided via combustion (e.g., total combustion) of the liquid sulfur 324*b* with oxygen 320*b* in the combustion chamber and inside heat exchanger tubes (e.g., on the tube side) of the sulfur burner 344. In implementations, air can be fed to provide the oxygen 320*b*. The products of the combustion on the tube side in the sulfur burner 344 include $SO_2$ (and $N_2$ gas if air is the oxygen 320*b* source) and a slight excess of $O_2$ gas (e.g., <2 vol %). These combustion gases 345 may be routed (e.g., via a conduit) as discharged from the tube side of the sulfur burner 344 to the $1^{st}$ zone 301*a* of the Claus furnace 301.

In the Claus furnace 301, the sour acid gas 321 (having $H_2S$ as an acid gas) is burned (e.g., partially burned) with oxygen 320*a* (e.g., from fed air) and with oxygen gas of the combustion gases 345 in the $1^{st}$ zone 301*a* of the Claus furnace 301. A fuel gas 322, such as methane, can be added to the $1^{st}$ zone 301*a* to maintain the temperature of the furnace 301. The gases in the furnace 301 react in the $2^{nd}$ zone 301*b* of the Claus furnace 301 (a reaction furnace). As is typical in a Claus reaction furnace, reactions may include oxidation reactions (e.g., $2H_2S+3O_2\rightarrow 2SO_2+2H_2O$) and the Claus reaction in which the Claus reaction furnace 301 converts $H_2S$ into elemental S (e.g., in the boiler 301*c*).

The furnace 301 gases are cooled (via water as cooling medium) in the heat exchanger part 301*c* of the Claus furnace 301. The heat exchanger part 301*c* may be labeled as a boiler or waste heat boiler (WHB) of (or associated with) the Claus furnace 301. The heat exchanger part 301*c* may generate (produce) steam 325 (e.g., high-pressure steam in range of 600 psig to 1500 psig) from the water cooling medium on the side of the heat exchanger 301*c* opposite the furnace gases.

The furnace exhaust gas 326 (exiting gases discharged from the furnace 301) and the cooled reformed mixture 349 having $H_2$ are routed (e.g., as combined into a gas stream 351) to the condenser 302*a* (e.g., shell-and-tube heat exchanger). The condenser 302*a* generates (produces) steam 327*a* (e.g., low pressure steam <150 psig) by vaporizing the water cooling medium with heat from the stream 351. In the condenser 302*a*, elemental S vapor in the gas stream 351 is condensed (via the water cooling medium) and discharges as liquid sulfur 328*a*, for example, to a sulfur pit 303. The entering gas stream 351 minus the condensed liquid sulfur 328 discharges from the condenser 302*a* as process gas 329*a* (cooler gases). The process gas 329*a* is labeled as process gas in having $H_2$ to be recovered.

The process gas 329*a* is sent through (and heated in) the reheater 304*a* heat exchanger, and discharges from the reheater 304*a* as reheated process gas 330*a*. The reheated process gas 330*a* is routed through a series of catalytic converters 305 (each having an associated condenser 302*b*). After the second or third catalytic converter 302 (not shown as indicated by reference numeral 345) with its respective condenser 302 (not shown as noted by reference numeral 345), the gas 329*b* (process stream having $H_2$) goes through a reheater 304*b* heat exchanger to be heated to give process gas 330*b* (as heated) routed to a hydrogenation reactor 306. The hydrogenation reactor 306 may be analogous to the hydrogenation reactor 106 of FIG. 7A AND 7B. Only a relatively small fraction of the $H_2$ in the heated gas 330*b* is utilized in the hydrogenation (e.g., of $SO_2$ to $H_2S$) in the reactor 306.

The hydrogenated gas 331*b* (having $H_2$) discharged from the hydrogenation reactor 306 is cooled in the cooler 302*c* heat exchanger, which generates steam 327*c* (e.g., low pressure steam <150 psig). The cooler 302*c* discharges the cooled hydrogenated gas 331*b* as process gas 332 (gas mixture) that is the hydrogenated gas 331*b* lower in temperature as cooled by the cooler 302*c*. The process gas 332 may include $H_2$, $CO_2$, $H_2O$, $N_2$ (if air is fed for the oxygen gas 320*a* or 320*b*), and residual $H_2S$ (e.g., a relatively small amount of $H_2S$ less than 3 or 4 vol %).

The process gas 332 may be further processed to recover $H_2$ from the process gas 332. In implementations, the process gas 332 may be labeled as Claus tail gas but having a significant amount of $H_2$ (generated via the S steam reforming in the sulfur steam reformer 347). As discussed below, the further processing of the process gas 332 may include removing water from the process gas 332 in a quench tower 308, and treatment in an amine system (including absorber 311 and regeneration column 315) to remove $H_2S$, to give the product $H_2$ along with $CO_2$ and any $N_2$.

The process gas 332 (gas mixture) discharged from the condenser 302*c* may be further cooled with heat exchanger 307 (e.g., a shell-and-tube heat exchanger) that generates steam (e.g., low-low pressure [LLP] steam less than 60 psig) from the water cooling medium in the heat exchanger 307.

As discussed with respect to FIGS. 7A and 7B, the cooled process gas 333 (a gas mixture as the process stream) discharged from the condenser 302*c* may enter the quench tower 308 (e.g., a vertical vessel), where the gas is cooled (e.g., to 60° C. or less) by passing the gas in countercurrent flow with water 334 having a lower temperature than the gas. The quench tower 308 vessel may have, for example, packing in the vessel to provide for increased contact of the gas mixture (flowing upward with the tower 308) with the water 334 (flowing downward through the tower 308). The water vapor in the gas is condensed in the quench tower 108. Liquid water 335 including this condensed water discharges (e.g., as a bottoms stream) from a bottom part of the tower 308. The discharged water 335 may be split into three water streams 334, 337, and 323. The water 337 may be sent to sour water treatment. The water 323 may be sent to the shell side of the sulfur burner 344 (a furnace with heat exchanger tubes, as discussed). The water 334 may be recycled via a pump 309 through a cooler 310 heat exchanger to an upper part of the tower 308. The cooler 310 may reduce the temperature of the water 334 to less than 60° C. The cooling medium in the cooler 310 may be cooling water or air.

The overhead gas 338 discharged from a top portion of the quench tower 308 includes $H_2$, $H_2S$, and $CO_2$. The overhead gas 338 is sent to a gas sweetening unit (a selective amine process) that includes the absorber column 311 vessel that absorbs $H_2S$ into liquid amine and the regeneration distillation column 315 vessel that removes $H_2S$ from the liquid amine, and associated equipment. Examples of such systems to separate $H_2S$ from the overhead gas 338, which is a mixture of $H_2$, $H_2S$, and $CO_2$ (and $N_2$ if air is used as a source of oxygen 320*a* to the furnace 301 or of oxygen 320*b* to the sulfur burner 347), are described in U.S. Pat. No. 10,525,404 B2, U.S. Pat. No. 11,241,652 B2, and U.S. Pat. No. 11,130,094 B2.

As discussed with respect to FIG. 7B, the overhead gas 338 from the quench tower 308 may enter the absorber 311, such as of a selective amine treatment system to separate $H_2S$ from the $H_2$ gas. In particular, the overhead gas 338 from the quench tower 308 enters at a bottom portion the absorber 311 column vessel (e.g., having packing) and flows upward in a countercurrent flow direction with respect to liquid aqueous amine flowing downward through the absorber 311. The amine absorbs $H_2S$ from the gas 338 to give an intermediate product gas 340 discharged overhead from the absorber 311. The intermediate product gas 340 has the $H_2$ product. The intermediate product gas 340 is labeled as intermediate because the gas 340 includes $CO_2$ in addition to the $H_2$. The intermediate product gas 340 includes $H_2$ and $CO_2$, and may further include $N_2$ gas if air is used as a source of oxygen gas 320*a*. Again, the intermediate product gas 340 discharged overhead as a gas stream from the absorber 311 has $H_2$ gas as a product along with $CO_2$ (and $N_2$ gas if air is utilized as the source of the oxygen 320*a* or 320*b*).

The absorber 311 and the regeneration distillation column 315, and associated equipment, may be considered an amine treatment system (a selective amine process).

The bottoms stream 339 including liquid amine having $H_2S$ separated from the $H_2$ gas discharges from a bottom portion of the absorber 311 vessel and is sent via the pump 312 through a heat exchanger 313 as feed to the regeneration distillation column 315 (also known as a desorber vessel). The bottom stream 339 is rich in $H_2S$. In the regeneration column 315, $H_2S$ is removed (desorbed) from the amine. A gas 343 enriched in $H_2S$ (e.g., at least 50 vol % $H_2S$) discharges overhead from the regeneration distillation column 315. This gas 343 may be introduced to the shell side of the sulfur burner 344. This gas 343 sent to the sulfur burner 344 may include carbon dioxide.

The regeneration (desorber) column 315 has an associated reboiler 316 heat exchanger (e.g., with steam as the heating medium). Bottoms liquid 341 from a bottom portion the regeneration column 315 is vaporized in the reboiler 316 (e.g., steam reboiler) for flow as vapor upward through the column 315.

Bottoms liquid 342 (liquid amine lean in $H_2S$) from the bottom portion of the regeneration distillation column 315 is sent via pump 317 through the heat exchanger 313 (e.g., shell and tube heat exchanger) and the heat exchanger 314 (e.g., shell and tube heat exchanger) to an upper portion of the absorber column 311. Both heat exchangers 313, 314 cool the bottoms liquid 342. The heat exchanger 313 may be a cross-exchanger in which the bottoms liquid 342 is cooled by the bottoms stream 339 from the absorber 311, and in which the bottom stream 339 is heated by the bottoms liquid 342 from the regeneration column 315.

The regeneration column 315 may be characterized as a regeneration column because the regeneration column 315 receives the bottoms stream 339 (relatively rich in $H_2S$) (labeled as rich amine because amine rich in $H_2S$) as feed from the absorber column 311 and returns the stream 342 lean in $H_2S$ (labeled as lean amine because amine lean in $H_2S$) to the absorber column 311. Again, the intermediate product gas 340 discharged from the absorber 311 (e.g., discharged overhead from the absorber 311) includes $H_2$ (as product) and may include $CO_2$, and may further include $N_2$ if air is used as a source for feed $O_2$ 320*a* or 320*b*.

FIGS. 10A and 10B are a hydrogen production system 400 that can be an SRU (e.g., Claus system) incorporating production of hydrogen, and is similar to the hydrogen production system 300 of FIG. 9A, except that an electric heater 444 or boiler is employed instead of a sulfur burner (e.g., 344 in FIG. 9A) to heat the S vapor and $H_2O$ fed to the steam reformer 447 (e.g., 347 in FIG. 9A). The boiler, if employed, may be, for example, a steam heat exchanger. The boiler (if employed) here may have a flame that heats the water and transform the water into steam, which is further heated to give super-heated steam. This steam may be the calorie carrier, which will heat the mixture of S, $H_2O$, and $H_2S$. This boiler may be a steam superheater or superheated steam boiler.

Liquid water 423, liquid sulfur 424*b*, and hydrogen sulfide gas 443 are heated by the electric heater 444 (or boiler). In implementations, the electric heater may have electrical heating elements inside a vessel. The mixture is heated by heating elements, for instance, in a baffled U-shaped vessel. After being heated to a temperature above 445° C. (e.g., to at least 500° C., or in the range of 450° C. to 550° C.), the mixture 446 of water vapor, hydrogen sulfide, and sulfur vapor that discharges from the electric heater 444 is sent to a sulfur steam reformer 447. In the steam reforming of sulfur in the sulfur steam reformer 447, sulfur vapor reacts with $H_2O$ vapor to generate $H_2$ gas that may be recovered downstream in the system 400. The reformed mixture 448 (products of the sulfur steam reformer 447) is sent to an economizer 450. The temperature of the reformed mixture 448 as discharged from the reformer 447 may be, for example, at least 600° C., or in the range of 550° C. to 650° C. The economizer 450 cools the reformed mixture 448 and recovers heat from the reformed mixture 448, and transfers the heat to the liquid sulfur 424*a* to increase the sulfur 424*a* temperature (e.g., to at least 300° C., such as in the range of 300° C. to 315° C.). The temperature of the cooled reformed mixture 449 that discharges from the economizer 450 may be, for example, less than 300° C.

In the Claus furnace 401 (a reaction furnace), the sour acid gas 421 (including $H_2S$ and $CO_2$) is partially burned (combusted) with oxygen 420 (e.g., from fed air) in the $1^{st}$ zone 401*a* of the Claus furnace 401. The oxygen gas 420 can come from fed air or from an enriched or pure oxygen source. Fuel gas 422, such as methane or natural gas, can be added to facilitate maintaining the temperature of the furnace 401 at a desired temperature. An oxidation reaction in the furnace 401 an include, for example, $2H_2S+3O_2 \rightarrow 2SO_2+2H_2O$, which is the oxidation of the entering $H_2S$ from the fed acid gas 421 with fed oxygen (02) gas 420 to give $SO_2$ and $H_2O$ vapor. Furnace gases react in the $2^{nd}$ zone 401*b* of the Claus furnace 401. The reactions may include the Claus reaction $2H_2S+SO_2 \rightarrow 3S+2H_2O$, in which $H_2S$ gas and $SO_2$ react to give elemental S gas and $H_2O$ vapor. An overall reaction involving the oxidation reaction and the Claus reaction may be characterized as $2H_2S+O_2 \rightarrow 2S+2H_2O$.

The furnace gases from the $2^{nd}$ zone 401*b* are cooled in the heat exchanger part 401*c* of the Claus furnace 401. The heat exchanger part 401*c* utilizes water as a cooling medium. High-pressure steam 425 (e.g., in the range of 600 psig to 900 psig) may be generated by vaporizing the water cooling medium on the side of the heat exchanger part 401*c* opposite the furnace gases with heat from the furnace gases.

The furnace exhaust gas 426 (exiting furnace gases, e.g., having temperature less than 315° C., discharged from the heat exchanger part 401*c*) and the cooled reformed mixture 449 (having $H_2$) from the economizer 450 may be collected together as gas 451. The gas 451 enters a condenser 402*a* heat exchanger (with water as cooling medium) that produces steam 427*a* (e.g., low pressure steam less than 150 psig), liquid sulfur 428*a* sent to the sulfur pit 403, and process gas 429*a* (cooler gases) (having $H_2$) sent to a reheater 404*a*. The process gas 429*a* is labeled as process gas in having $H_2$ to be recovered. In addition to $H_2$, the process gas 429*a* may have $H_2S$, $SO_2$, $CO_2$, and uncondensed or entrained S, and $N_2$ (if air is fed for the $O_2$ gas 420). The process gas 429*a* is sent through (and heated in) the reheater 404*a* heat exchanger, and discharges from the reheater 404*a* as reheated process gas 430*a*.

The reheated process gas 430*a* is sent to a first catalytic converter of a series of catalytic converters 405 (each having an associated condenser 402*b*). The series of catalytic converters 405 is indicated by reference numeral 445. For instance, there may be a total of two or three catalytic converters 405, and a total of two or three condensers 402*b*. After the second or third catalytic converter 405 (not shown) with its respective condenser 402*b* (not shown), as noted by reference numeral 445, the gas 429*b* (process stream having $H_2$) from the final condenser 402*b* (not shown) goes through a reheater 404*b* heat exchanger to be heated to give process gas 430*b* (as heated) routed to a hydrogenation reactor 406.

The hydrogenation reactor 406 may be analogous to the hydrogenation reactor 106 of FIG. 7A and the hydrogenation reactor 306 of FIG. 9A. A relatively small amount of the $H_2$ in the heated gas 430*b* is utilized in the hydrogenation (e.g., to hydrogenate $SO_2$ into $H_2S$) in the reactor 406.

The hydrogenated gas 431*b* (having $H_2$) discharged from the reactor 406 is cooled in the cooler 402*c* heat exchanger, which generates low pressure steam 427*c* (e.g., less than 150 psig) by vaporizing the liquid water utilized as the cooling medium. The exiting gas mixture from the cooler is 402*c* is process gas 432 and is further cooled in the heat exchanger 407 to give cooled process gas 433 (a cooler gas than the process gas 432) and generate low-low pressure steam (e.g., less than 60 psig). The cooled process gas 433 includes $H_2$ and may include $CO_2$, $H_2O$, $N_2$ (if air is fed for the oxygen gas 420), and $H_2S$ (e.g., at less than 3 or 4 vol %).

The cooled process gas 433 enters a quench tower 408, where the gas is cooled to 60° C. by passing the gas in countercurrent flow with cooler water 434. Water vapor in the cooled process gas 433 is condensed in the quench tower 408. Liquid water 435 including this condensed water discharges (e.g., as a bottoms stream) from a bottom part of the tower 408. A portion of the water 435 is sent as water 437 for disposal or for further processing, such as to sour water treatment. Another portion of the water 435 may be sent as water 423 through the electric heater 444 (or boiler) to the sulfur steam reformer 447. Yet another portion 434 of the water 435 is routed via the pump 409 (e.g., a centrifugal pump) through an air cooler 410 heat exchanger as recycle to an upper part of the tower 408. The water 434 may discharge from the air cooler 410, for example, at less than 60° C. As indicated, the water 434 may flow downward through the tower 408 in a countercurrent flow direction with the respect to the cooled process gas 438 flowing upward through the quench tower 408. The water 434 can be considered a quench medium, and that condenses or absorbs water from the cooled process gas 433.

The overhead gas 438 discharging overhead from the quench tower 408 is generally the cooled process gas 433 entering the tower 408 minus the water vapor condensed and removed from the process gas 433. The overhead gas 438 discharged from a top portion of the quench tower 408 includes $H_2$, $H_2S$, and $CO_2$ (and $N_2$ if air is the source of oxygen 420 fed to the furnace 401).

The overhead gas 433 may be sent to a gas sweetening unit (an amine treating system) to separate the $H_2S$ from the $H_2$ in the overhead gas 433, as generally discussed with respect to the amine treatment system of FIGS. 7B and 9B. The amine treating system includes the absorber 411 and the regeneration distillation column 415 (also called a desorber). In implementations, an applicable example amine treatment system (a selective amine process) that may be analogous in depicted in FIG. 16.

A gas 443 enriched in $H_2S$ (e.g., at least 50 vol % $H_2S$) discharges overhead from the regeneration distillation column 415. This gas 443 may include $CO_2$ and may be conveyed (e.g., via conduits) through the electric heater 444 (or boiler) to the sulfur steam reformer 447. Intermediate product gas 440 stream having $H_2$ product and $CO_2$ (and $N_2$ gas if air is used as a source of oxygen gas 420) discharges overhead from the absorber 411 column vessel. The intermediate product gas 440 may be utilized by a user (e.g., in a chemical process), or may be further processed to isolate the $H_2$ product. Hydrogen gas may be extracted and purified from this gas 440 (a mixture of $H_2$ and at least $CO_2$) that discharges overhead from the absorber 411.

The amine treating system (a selective amine process) includes pumps 412, 417 and heat exchangers 413, 414, 416, as discussed with respect to FIGS. 7B and 9B.

FIG. 11 is a hydrogen production system 500 that is similar to the system 300 of FIGS. 9A and 9B in the sense of employing indirect heating via a sulfur burner 544 to heat S and $H_2O$ upstream of the sulfur steam reformer 547. Indirect heating for the sulfur steam reformer 547 is performed by heating the S gas and $H_2O$ vapor in the upstream sulfur burner 544. The system 500 incorporates indirect heating of S and water (via heating with the sulfur burner 544) for sulfur steam reforming in the sulfur steam reformer 547 separate from the Claus furnace 501.

However, unlike system 300 of FIGS. 9A and 9B, the system 500 has an oxidative environment in the furnace $2^{nd}$ zone 501*b* and therefore no Claus catalytic converters (Claus catalytic reactors). The Claus furnace $2^{nd}$ zone 501*b* has an oxidative environment and performs the Claus reaction.

As with the system 200 of FIG. 8, downstream in the system 500 includes quenching with aqueous sulfurous acid to remove $SO_2$ and $H_2S$, and oxidation of excess aqueous sulfurous acid with oxygen gas in air to give sulfuric acid.

The Claus furnace 501 (a Claus-type reaction furnace) receives acid gas 521 having $H_2S$ to combust the $H_2S$ in a $1^{st}$ zone 501*a* of the furnace 501. The Claus furnace 501 converts $H_2S$ into elemental S gas (vapor).

For $H_2$ production, elemental S and $H_2O$ are heated in the sulfur burner 544, and the S is steam reformed in the sulfur steam reformer 547 (that receives the heated mixture of S and $H_2O$) to generate $H_2$ gas for recovery downstream. In implementations, the sulfur burner 544 and sulfur steam reformer 547 may be characterized as operationally in parallel with the Claus furnace 501.

For the systems of FIGS. 9 and 11, the stream 346, 546 exiting the sulfur burner (around 600° C.) may have a higher temperature (e.g., about 600° C.) and with more fluctuation. This is generally acceptable as long as the temperature of stream 346, 546 is above 445° C. and below 720° C.

As with sulfur burners previously discussed, the sulfur burner 544 has a combustion chamber for combusting sulfur, and a tube side to receive the combustion gases to heat gas components on the shell side. In operation, the sulfur burner 544 is fed and heats liquid water 523 and liquid elemental sulfur 524*c* on the shell side (outside of the heat exchanger tubes) of the sulfur burner 544 to a temperature of at least 445° C. The sulfur burner 544 discharges from the shell side a mixture 546 (as heated to at least 445° C.) of $H_2O$ vapor and S gas to the sulfur steam reformer 547.

As with sulfur steam reformers discussed above, the sulfur steam reforming in the sulfur steam reformer 547 includes reacting the S gas with $H_2O$ to generate $H_2$. The sulfur steam reformer 547 discharges a reformed mixture 548 (products of the sulfur steam reformer 547 including $H_2$) to an economizer 550. The economizer 550 cools the reformed mixture 548 to discharge the cooled reformed mixture 549 having the $H_2$.

The economizer 550 recovers heat from the reformed mixture 548 and transfers the heat to the liquid sulfur 524*a* to heat (pre-heat) the sulfur 524*a* to increase the temperature of the liquid sulfur 524*a*. The liquid sulfur 524*a* is provided to the economizer 550 from the sulfur pit 503 via the pump 518 (e.g., centrifugal pump). The liquid sulfur 524*a* as heated in the economizer 550 is fed as [1] heated liquid sulfur 524*b* for combustion in the sulfur burner 544 and as [2] heated liquid sulfur 524*c* on the shell side (outside the tubes) of the sulfur burner 544.

The heat in the sulfur burner 544 is provided via combustion (e.g., total combustion) of the liquid sulfur 524*b* with oxygen 520*b* in the combustion chamber and inside heat exchanger tubes (e.g., on the tube side) of the sulfur burner 544. In implementations, air can be fed to provide the oxygen 520*b*. The products of the combustion on the tube side in the sulfur burner 544 include $SO_2$ (and $N_2$ gas if air is the oxygen 520*b* source) and a relatively small amount of $O_2$ gas (e.g., <2 vol %). These combustion gases 545 may be conveyed (e.g., via a conduit) as discharged from the tube side of the sulfur burner 544 to the $1^{st}$ zone 501*a* of the Claus furnace 501.

As indicated, in the Claus furnace 501, the sour acid gas 521 (having $H_2S$ as an acid gas) is burned (e.g., partially burned) with $O_2$ 520 (e.g., from fed air) and with $O_2$ gas of the combustion gases 545 in the $1^{st}$ zone 501*a* of the Claus furnace 501. A fuel gas 522, such as methane, can be added to the $1^{st}$ zone 501*a* to maintain the temperature of the furnace 501. The gases in the furnace 501 react in the $2^{nd}$ zone 501*b* of the Claus furnace 501 (a reaction furnace). As is typical in a Claus reaction furnace, reactions may include oxidation reactions (e.g., $2H_2S+3O_2 \rightarrow 2SO_2+2H_2O$) and the Claus reaction in which the Claus reaction furnace 501 converts $H_2S$ into elemental S gas (vapor).

The furnace 501 gases are cooled (via water as cooling medium) in the heat exchanger part 501*c* of the Claus furnace 501*c*. The heat exchanger part 501*c* may be labeled as a boiler or WHB of the Claus furnace 501 (or associated with the Claus furnace 501). The heat exchanger part 501*c* may generate (produce) steam 525 (e.g., high-pressure steam in range of 600 psig to 1500 psig) from the water cooling medium on the side of the heat exchanger 501*c* opposite the furnace gases.

The furnace exhaust gas 526 (gases discharged from the furnace 501) and the cooled reformed mixture 549 having $H_2$ may be combined to give gas 551 fed to the condenser 502 (e.g., shell-and-tube heat exchanger). The condenser 502 generates (produces) steam 527 (e.g., low pressure steam <150 psig) by vaporizing the water cooling medium with heat from the gas 551. In the condenser 502, elemental S gas in the gas 551 is condensed (via the water cooling medium) and discharges as liquid sulfur 528, for example, to a sulfur pit 503. The entering gas 551 minus the condensed liquid sulfur 528 discharges from the condenser 502 as process gas 532 (cooler gases) to the quench tower 508. The process gas 532 is labeled as process gas in having $H_2$ to be recovered.

In implementations, heat tracing 507 may be disposed along the conduit conveying the process gas 532 to the quench tower 508 to prevent or reduce sulfur deposition from elemental S vapor in the process gas 532. As mentioned, heat tracing 507 may be, for example, electrical tracing or steam tracing. The heat tracing 507 may be a component of a heat tracing system.

The process gas 532 enters the quench tower 508, where the gas is cooled (e.g., to 60° C.) by passing the gas in countercurrent flow with aqueous sulfurous acid 534. The residual elemental S entrained in the process gas 532 may be transformed into soluble polythionic acid in presence of excess of sulfurous acid. Therefore, no (or little) solid is accumulated in the quench tower 508. The gas 540 (gas stream) that discharges overhead from the quench tower 508 includes the product $H_2$ gas along with $CO_2$. The gas 540 may additionally include $N_2$ gas if air is the oxygen 520 source to the upstream furnace 501. The discharged overhead gas 540 can be utilized as product or can be processed to further isolate the $H_2$ gas.

Makeup water 537 (e.g., demineralized water, steam condensate, etc.) may be added to the bottoms stream 509 (which can be labeled as water or aqueous sulfurous acid) that discharges from the bottom portion of the tower 508 to give water 534 (which can be aqueous sulfurous acid). The water 534 is sent via a pump 509 through an air cooler 510 heat exchanger to an upper part of the tower 508. The air cooler 510 may cool (with air as cooling medium) the water 534, for example, to a temperature less than 60° C.

A portion 550 of the water 534 upstream of the cooler 510 is sent to an upper part of an oxidation tower 551 vessel for flow downward in the tower 551 in a countercurrent flow direction with respect to the air 553 flowing upward through the tower 551. The air 553 may be introduced into a bottom part of the tower 551 via a blower 554 (e.g., centrifugal fan) (e.g., that receives ambient air or plant utility air). The oxygen gas in the air 553 may oxidize the aqueous sulfurous acid ($H_2SO_3$) in the tower 551 into $H_2SO_4$. The overhead gas 552 may include the air 553 minus the $O_2$ gas from the air 553 utilized (consumed) in the oxidation. The gas 552 discharging overhead from the tower 551 may include $N_2$ gas with some $O_2$ gas (e.g., 2-4 vol % of $O_2$).

Aqueous sulfuric acid 555 discharges (e.g., as a bottoms stream) from a bottom portion of the tower 551 and is sent through a membrane 556. The membrane 556 may be membrane system having a polymeric membrane, NF membrane, RO membrane, etc., and associated membrane system equipment. The membrane 556 discharges sulfuric acid 557 (e.g., more concentrated than the entering sulfuric acid 555) as retentate, and relatively pure or clean water 523 as permeate. A portion 558 of the sulfuric acid 557 (e.g., concentrated) is removed as product to be monetized. Another portion 559 of the concentrated sulfuric acid 557 is provided (e.g., conveyed via a conduit) to the furnace 501 to enrich the Claus furnace 501 in oxygen, in which aspects may be described in the U.S. Pat. No. 4,826,670, US Published Patent Application No. 2022/0177306A1, and US Published Patent Application No. 2022/0199908A1.

FIG. 12 is a hydrogen production system 600 that operates with an oxidative environment in the Clause furnace $2^{nd}$ zone 601*b* (and therefore no Claus catalytic converters), and employs indirect heating via an electric heater 644 or boiler for the sulfur steam reformer 647. The system 600 similar to the system 500 of FIG. 11, except that the system 600 employs an electric heater 644 (or boiler) instead of a sulfur burner to heat the S vapor and $H_2O$ for the sulfur steam reformer 647. As in the system 500 of FIG. 11, the system 600 operates with an oxidative environment in the furnace $2^{nd}$ zone 601*b*, as mentioned.

The Claus furnace 601 (a Claus-type reaction furnace) receives acid gas 621 having $H_2S$ to combust the $H_2S$ in a $1^{st}$ zone 601*a* of the furnace 601. The Claus furnace 601 converts $H_2S$ into elemental S gas (vapor). In the Claus furnace $1^{st}$ zone 601*a*, the sour acid gas 621 (having $H_2S$ as an acid gas) is burned (e.g., partially burned) with $O_2$ 620 (e.g., from fed air). The sulfuric acid 659 may break down to provide $O_2$ for the combustion. In particular, the sulfuric acid 659 may first dehydrate to give $SO_3$, which decomposes to give $SO_2$ and $O_2$ in the Claus furnace. A fuel gas 622, such as methane, can be added to the $1^{st}$ zone 601*a* to maintain the temperature of the furnace $1^{st}$ zone 601*a* at a specified temperature value or within a specified temperature range. The gases in the furnace 601 react in the $2^{nd}$ zone 601*b* of the Claus furnace 601. The reactions may include the Claus reaction that converts $H_2S$ and $SO_2$ into elemental S and $H_2O$.

As discussed for Claus furnaces in previous figures, the furnace 601 gas (a mixture of gases) is cooled (via water as cooling medium) in the heat exchanger part 601*c* of the Claus furnace 601*c*. The heat exchanger part 601*c* may generate (produce) steam 625 (e.g., high-pressure steam in range of 600 psig to 1500 psig) by vaporizing the water cooling medium on the side of the heat exchanger 601*c* opposite the furnace gas with heat from the furnace gas. The furnace gas as cooled in the heat exchanger part 601*c* (e.g., to less than or equal to 315° C.) discharges from the furnace 601 as furnace exhaust gas 626. The furnace exhaust gas 626 may include, for example, $H_2S$, $SO_2$, S, $H_2O$, and $CO_2$ (and $N_2$ if air is fed as the source of the $O_2$ 620).

For $H_2$ production, elemental sulfur 624*b* and water 623 are heated in the electric heater 644 (or boiler), and the S is steam reformed in the downstream sulfur steam reformer 647 (that receives the heated mixture of S and $H_2O$) to generate $H_2$ gas for recovery further downstream. In implementations, electric heaters may be disposed on or in the sulfur steam reformer 647 instead of having the upstream electric heater 644. In implementations, the electric heater 644 and sulfur steam reformer 647 may be characterized as operationally in parallel with the Claus furnace 601. The liquid water 623 and elemental sulfur 624*b* are heated (e.g., as a mixture) to a temperature of at least 450° C. or at least 500° C., or in a range of 450° C. to 550° C., by the electric heater 644 (or boiler). The heated mixture 646 of the water 623 and sulfur 624*b* discharges from the electric heater 644 to the sulfur steam reformer 647. The sulfur steam reforming in the sulfur steam reformer 647 includes reacting the S gas with $H_2O$ vapor to generate $H_2$ gas. The sulfur steam reformer 647 discharges a reformed mixture 648 (products of the sulfur steam reformer 647 including $H_2$) to an economizer 650. The reformed mixture 648 may have a temperature, for example, of at least 600° C., or in a range of 550° C. to 700° C.

The three reactions immediately below may occur in the sulfur steam reformer. These three reactions immediately below may be considered steam reforming of sulfur. These three reactions immediately below may be exothermic to give the temperature increase (e.g., from inlet 500° C. to outlet 600° C.) through the sulfur steam reformer.

$$2\,H_2O + S \xrightleftharpoons{T_1 < 2509^\circ K} 2\,H_2 + SO_2$$

$$H_2O + S \xrightleftharpoons{T_2 < 7442^\circ K} H_2 + SO$$

$$H_2O + SO \xrightleftharpoons{T_3 < 1882^\circ K} H_2 + SO_2$$

The economizer 650 cools the reformed mixture 648 to discharge the cooled reformed mixture 649 having the $H_2$. Liquid sulfur 624*a* is received by the economizer 650 from the sulfur pit 603 via the pump 618. In cooling the reformed mixture 648, the economizer 650 transfers heat from the reformed mixture 648 to the liquid sulfur 624*a* to heat (pre-heat) the sulfur 624*a* to increase the temperature of the liquid sulfur 624*a*. The liquid sulfur 624*a* from the economizer 350 as heated is fed as liquid sulfur 624*b* to the electric heater 644 (or boiler) to be further heated for the steam reforming in the sulfur steam reformer 647.

The furnace exhaust gas 626 and the cooled reformed mixture 649 (having $H_2$) may be combined to give gas 651 fed to the condenser 602 (e.g., shell-and-tube heat exchanger). In the condenser 602, elemental S gas in the gas 651 is condensed (via a water cooling medium) and discharges as liquid sulfur 628, for example, to the sulfur pit 603. The condenser 602 generates (produces) steam 627 (e.g., low pressure steam <150 psig) by vaporizing the water cooling medium with heat from the gas 651.

The gas 651 entering the condenser 602 minus the condensed liquid sulfur 628 discharges from the condenser 602 as process gas 632 (cooler gases) to the quench tower 608. The process gas 632 is labeled as process gas in having $H_2$ to be recovered. Heat tracing 607 (e.g., electrical tracing or steam tracing) may be disposed along the conduit conveying the process gas 632 to the quench tower 608 to prevent or reduce condensation or deposition of elemental S in the process gas 632.

The configuration and operation of the quench tower 608 and oxidation tower 651 systems are generally similar to the configuration and operation of the quench tower 508 and oxidation tower 551 systems of system 500 of FIG. 11.

The process gas 632 enters the quench tower 608, where the gas is cooled (e.g., to 60° C.) by passing the gas in countercurrent flow with aqueous sulfurous acid 634. Elemental S in the process gas 632 may be transformed into soluble polythionic acid in presence of excess of sulfurous acid in the quench tower 608. The overhead gas 640 that discharges from the quench tower 608 as a gas stream includes the product $H_2$ gas along with $CO_2$, and $N_2$ gas if air is the oxygen 620 source. Makeup water 637 (e.g., steam condensate, treated water, demineralized water, etc.) may be added to the bottoms stream 609 (water or aqueous sulfurous acid) that discharges from the bottom portion of the tower 608 to give water 634 (aqueous sulfurous acid). The water 634 is sent via a pump 609 through the air cooler 610 heat exchanger to an upper part of the quench tower 608. The air cooler 610 may cool (with air as cooling medium) the water 634, for example, to a temperature less than 60° C.

A portion 650 of the water 634 is sent to an upper part of an oxidation tower 651 vessel for flow downward in the tower 651 in a countercurrent flow direction with respect to the air 653 flowing upward through the tower 651. The air 653 may be introduced into a bottom part of the tower 651 via a blower 654 (e.g., centrifugal fan). The oxygen gas in the air 653 may oxidize the aqueous sulfurous acid ($H_2SO_3$) in the oxidation tower 651 into $H_2SO_4$. The overhead gas 652 may include the air 653 minus the $O_2$ gas from the air 653 utilized (consumed) in the oxidation. The overhead gas 652 discharge stream may include $N_2$ gas with some $O_2$ gas (e.g., 2-4 vol % of $O_2$).

Sulfuric acid 655 discharges (e.g., as a bottoms stream) from a bottom portion of the tower 651 and is sent through a membrane 656 system. The membrane 656 system may be a NF system or RO system. The membrane may be a polymeric membrane. The membrane 656 discharges sulfuric acid 657 (e.g., more concentrated than the entering sulfuric acid 655) as retentate, and relatively pure or clean water 623 as permeate. A portion 658 of the sulfuric acid 657 (e.g., concentrated) is removed as product to be monetized. Another portion 659 of the concentrated sulfuric acid 657 is provided (e.g., conveyed via a conduit) to the furnace 601 to enrich the Claus furnace 601 in oxygen.

FIGS. 13A and 13B are a hydrogen production system 700 in which a Claus furnace is not employed. Elemental sulfur 724*b* and water 723 are heated in an electric heater 744 (or boiler) for sulfur steam reforming in a downstream sulfur steam reformer 747 to generate $H_2$. Hydrogen sulfide 743 gas is fed to the electric heater 744 such that there is a reductive environment (excess $H_2S$) in the electric heater 744 and in the sulfur steam reformer 747. Acid gas having $H_2S$ may be introduced to the hydrogen sulfide 743 stream to supplement the hydrogen sulfide 743 with additional $H_2S$.

The liquid water 723, liquid sulfur 724*b*, hydrogen sulfide 743 gas are heated separately by respective electric heaters 744 in parallel (or by boilers in parallel) to a temperature of at least 445° C., or in a range of 440° C. to 550° C. The water 723, sulfur 724*b*, and hydrogen sulfide 743, as heated and discharged from the heaters 744, combine to give a mixture 746 of water vapor, hydrogen sulfide, and sulfur vapor. The mixture 746 may have a temperature of at least 445° C., or in a range of 440° C. to 550° C. This mixture 746 is sent to the sulfur steam reformer 747 in which steam reforming of the elemental sulfur generates $H_2$.

The reformed mixture 748 (products of the sulfur steam reformer 747) discharged from the sulfur steam reformer 747 may be at a temperature, for example, of at least 600° C., or in a range of 550° C. to 700° C. The reformed mixture 748 may be sent to an economizer 750 that cools the reformed mixture 748 with liquid sulfur 724*a* as a cooling fluid to discharge the cooled reformed mixture 749 at a temperature less than 300° C., or in a range of 300° C. to 315° C. The Claus reaction may occur in the economizer 750, when the temperature drops below 445° C.

The liquid sulfur 724*a* may be provided to the economizer 750 via the pump 718 from the sulfur pit 703. The economizer 750 transfers heat from the reformed mixture 748 to the liquid sulfur 724*a* to heat (preheat) the liquid sulfur 724*a* to a temperature of at least 300° C., or in a range of 300° C. to 315° C., and give the liquid sulfur 724*b* as heated (preheated). As indicated, the liquid sulfur 724*b* is further heated in the electric heater 744 and sent in the mixture 746 to the sulfur steam reformer 747.

The cooled reformed mixture 749 discharged from the economizer 750 enters a condenser 702*a* (e.g., shell-and-tube heat exchanger). In the condenser 702*a*, elemental S gas in the cooled reformed mixture 749 is condensed (via a water cooling medium) and discharges as liquid sulfur 728, for example, to the sulfur pit 703. The condenser 702*a* generates (produces) steam 727*a* (e.g., low pressure steam <150 psig) by vaporizing the water cooling medium with heat from the cooled reformed mixture 749.

The cooled reformed mixture 749 that enters the condenser 702*a* minus the condensed liquid sulfur 728 discharges from the condenser 702 as process gas 729 (having the $H_2$ generated upstream in the sulfur steam reforming) at a temperature, for example, of less than 190° C., or in a range of 160° C. to 210° C. The gas 729 may have trace amounts of entrained elemental sulfur. The process gas 729 is sent through a reheater 704 heat exchanger to heat the process gas 729 to give the heated process gas 730 (which is the process gas 729 as heated). The reheater 704 heats the process gas 729 to give the process gas 730 at a temperature, for example, of at least 220° C., or in a range of 200° C. to 250° C., and that is fed to the hydrogenation reactor 706. The process gas 730 is sent to the hydrogenation reactor 706 from the reheater 704.

The hydrogenation reactor 706 may be analogous to the hydrogenation reactors 106, 306, and 406 of FIGS. 7A, 9A, and 10A, respectively. A portion of the $H_2$ in the heated process gas 730 is utilized to perform the hydrogenation in the reactor 706 (e.g., hydrogenation of $SO_2$ with $H_2$ to give $H_2S$).

The hydrogenated gas 731 (having $H_2$) discharged from the hydrogenation reactor 706 may have a temperature, for example, of at least 272° C., or in range of 240° C. to 320° C., and is cooled in the cooler 702*c* heat exchanger to a temperature less than 200° C. or less than 165° C. The gas 731 may generally not have S because of transformation of any S into $H_2S$ in the hydrogenation reactor 706. The cooler 702*b* generates low pressure steam 727*b* (e.g., less than 150 psig) by vaporizing the liquid water utilized as the cooling medium. The exiting gas mixture from the cooler is 702*b* is process gas 732 and is further cooled in the heat exchanger 707 to give cooled process gas 733 (a cooler gas than the process gas 732) and generate low-low pressure steam (e.g., less than 60 psig). The cooled process gas 733 includes $H_2$, $CO_2$, $H_2O$, and $H_2S$. The source of the $CO_2$ in gas 733 may be from the acid gas introduced into stream 743. The gas 733 generally does not include $N_2$ because air is typically not fed to the system 700.

The configuration and operation of the quench tower 708 and selective amine treatment (including absorber 711 and the regeneration column 715, and associated equipment) are generally similar to the configuration and operation of such equipment and processes discussed with respect to FIGS. 7B, 9B, and 10B.

The cooled process gas 733 enters the quench tower 708 and flows upward in a countercurrent flow direction with respect to water 734 flowing downward in the quench tower 708. The water 734 is cooler than the cooled process gas 733. Thus, water vapor in the process gas 733 is condensed in the quench tower 708.

Liquid water 735 including this condensed water discharges (e.g., as a bottoms stream) from a bottom part of the tower 708. Some of the water 735 is sent with any added water 737 as the water 723 through an electric heater 744 to the sulfur steam reformer 747. Some of the water 735 is routed as the water 734 via the pump 709 (e.g., a centrifugal pump) through an air cooler 710 heat exchanger as recycle to an upper part of the tower 708 for flow downward in the quench tower 708. The water 734 may be considered as quench water, and that condenses or absorbs water from the process gas 733 flowing upward through the quench tower 708.

The overhead gas 738 that discharges overhead from the quench tower 708 is generally the cooled process gas 733 entering the tower 708 minus the water vapor in the process gas 733 that is condensed in the tower 708. This overhead gas 738 discharged from a top portion of the quench tower 308 includes $H_2$, $H_2S$, and $CO_2$.

The overhead gas 738 may be sent to a gas sweetening unit (an amine treating system that is a selective amine process) to separate the $H_2S$ from the $H_2$ in the overhead gas 738, as generally discussed with respect to the amine treatment system of FIGS. 7B, 9B, and 10B. The amine treating system includes the absorber 711 and the regeneration distillation column 715 (also called a desorber). An applicable example amine-treatment system (a selective amine process) in depicted in FIG. 16.

A gas 743 enriched in $H_2S$ (e.g., at least 70 vol % $H_2S$) discharges overhead from the regeneration distillation column 715. This gas 743 may be primarily $H_2S$, and may include a relatively small amount $CO_2$ in addition to the $H_2S$. The gas 743 is sent through an electric heater 744 (or boiler) to the sulfur steam reformer 747. Intermediate product gas 740 having $H_2$ product and $CO_2$ discharges overhead as a gas stream from the absorber 711 column vessel. The $H_2$ gas can be extracted and purified. The amine treating system (a selective amine process) includes pumps 712, 717 and heat exchangers 713, 714, 716, as discussed with respect to FIGS. 7B, 9B, and 10B.

FIG. 14 is a hydrogen production system 800 in which a Claus furnace is not employed. Elemental sulfur 824*b* and water 823 are heated to at least 445° C. (or in a range of 440° C. to 550° C.) in separate electric heaters 844 (or boilers) in parallel for sulfur steam reforming in a downstream sulfur steam reformer 847 to generate $H_2$. A mixture of the sulfur 820 and water 823 may be the same electric heater. However, a reason for heating these two streams in different electric heaters, respectively, is the two streams do not have the same boiling points. Therefore, separate heating the sulfur 820 and water 823, respectively, may give better control of the heating process. Hydrogen sulfide is not fed to sulfur reformer 847 such that there is an oxidative environment (excess $SO_2$) in the sulfur steam reformer 847.

The water 823 and sulfur 824*b* discharged from the heaters 844 are combined to give a mixture 846 of $H_2O$ vapor and S vapor. The mixture 846 may have a temperature of at least 445° C. (or in a range of 440° C. to 550° C.). The mixture 846 is sent to the sulfur steam reformer 847 in which steam reforming of the elemental S generates $H_2$.

The reformed mixture 848 (products of the sulfur steam reformer 847) discharged from the sulfur steam reformer 847 may be at a temperature, for example, of at least 600° C., or in a range of 550° C. to 700° C. The reformed mixture 848 may include $H_2$ and $SO_2$ generated in the steam reforming of the sulfur, and include S and $H_2O$ not reacted in the steam reformer 847. The reformed mixture 848 may be sent to an economizer 850 that cools the reformed mixture 848 with liquid sulfur 824*a* as a cooling fluid to discharge the cooled reformed mixture 849 at a temperature less than 300° C., or in a range of 300° C. to 315° C.

As discussed for the liquid sulfur 724*a* in FIG. 13A, the liquid sulfur 824*a* may be provided to the economizer 850 via the pump 818 from the sulfur pit 803. The economizer 850 transfers heat from the reformed mixture 848 to the liquid sulfur 824*a* to heat (preheat) the liquid sulfur 824*a* to a temperature of at least 300° C., or in a range of 300° C. to 315° C., and give the liquid sulfur 824*b* as heated (preheated). As indicated, the liquid sulfur 824*b* is further heated in an electric heater 844 and sent in the mixture 846 to the sulfur steam reformer 847.

The cooled reformed mixture 849 discharged from the economizer 850 is conveyed via a conduit to the condenser 802 heat exchanger (e.g., shell-and-tube heat exchanger). In the condenser 802, elemental S gas in the cooled reformed mixture 849 is condensed (via a water cooling medium) and discharges as liquid sulfur 828, for example, to the sulfur pit 803. The condenser 802 generates (produces) steam 827 (e.g., low pressure steam <150 psig) by vaporizing the water cooling medium with heat from the cooled reformed mixture 849.

The cooled reformed mixture 849 that enters the condenser 802 minus the condensed liquid sulfur 828 discharges from the condenser 802 as process gas 832 (having the $H_2$ generated upstream in the sulfur steam reforming). The process gas 832 includes $H_2$, $H_2O$, $SO_2$, and traces of S vapor. The process gas 832 is sent to the quench tower 808. Heat tracing 807 may situated along the conduit conveying the process gas 832 to the quench tower 808 to prevent or reduce deposition of any elemental S entrained in the process gas 832.

The process gas 832 is introduced into a lower part of the quench tower 808 and flows upward in a counter current flow direction with respect to the water 834 (as quench water) flowing downward through the quench tower 808. The water 834 may be aqueous sulfurous acid. The $SO_2$ in the process gas 832 may be absorbed by the water 834 in the quench tower 808, giving the water 834 as sulfurous acid. Elemental S in the process gas 832 may be transformed into soluble polythionic acid in presence of excess of sulfurous acid in the quench tower 808.

The overhead gas 840 that discharges from the quench tower 808 may be primarily $H_2$ gas, such as at least 90 vol % $H_2$. The overhead gas 840 (discharged as a gas stream) may be considered a product stream. The overhead gas 840 may be processed to further in increase the $H_2$ purity.

Makeup water 837 may be added to the bottoms stream 809 (water or aqueous sulfurous acid) that discharges from the bottom portion of the tower 808 to give water 834 (aqueous sulfurous acid). The water 834 is sent via a pump 809 through the air cooler 810 heat exchanger to an upper part of the quench tower 808. The air cooler 810 may cool (with air as cooling medium) the water 834, for example, to a temperature less than 60° C.

A portion 850 of the water 834 (sulfurous acid) is sent to an upper part of an oxidation tower 851 vessel for flow downward in the oxidation tower 851 in a countercurrent flow direction with respect to the air 853 flowing upward through the tower 851. The air 853 may be introduced into a bottom part of the tower 851 via a blower 854 (e.g., centrifugal fan). The oxygen gas in the air 853 may oxidize the aqueous sulfurous acid ($H_2SO_3$) in the oxidation tower 851 into $H_2SO_4$. The overhead gas 852 may include the air 853 minus the $O_2$ gas from the air 853 utilized (consumed) in the oxidation in the tower 851. The overhead gas 852 discharge stream may include $N_2$ gas with some $O_2$ gas (e.g., 2-4 vol % of 02).

Sulfuric acid 855 discharges (e.g., as a bottoms stream) from a bottom portion of the oxidation tower 851 and is sent through a membrane 856 system, as previously discussed. The membrane 856 discharges sulfuric acid 857 (e.g., more concentrated than the entering sulfuric acid 855) as retentate, and relatively pure or clean water 823 as permeate. The sulfuric acid 857 (e.g., concentrated) may be removed as product to be monetized. As discussed, the liquid water 823 is sent through an electric heater 844 to be included in the mixture 846 sent to the sulfur steam reformer 847.

General comments regarding the foregoing figures are provided. A reductive environment means that $H_2S$ in excess is present at the outlet of the sulfur steam reformer. The $SO_2$ produced by the steam reforming of sulfur is reduced to sulfur by the excess of $H_2S$. The oxidative environment means that $SO_2$ in excess is present at the outlet of the sulfur steam reformer. The sulfur vapor is oxidized to $SO_2$ by water. The excess of $H_2S$ may be molar excess with respect to $SO_2$. The excess of $SO_2$ may be molar excess with respect to $H_2S$. The reductive environment in FIG. 13A is via stream 743 as acid gas containing $H_2S$ and with an excess of $H_2S$ is found in the stream 748, which makes this a reductive environment. The oxidative environment in FIG. 14 is stream 848 containing $SO_2$ (from the reaction), which makes this an oxidative environment. The Claus reaction may occur in the sulfur steam reformer in reductive environment of FIGS. 9A, 10A, and 13A, but not in oxidative environment of FIGS. 11, 12, and 14. The Claus reaction generally does not occur in the sulfur steam reformers 347, 447, 547, 647, 747, 847 because the temperature is above the boiling point of sulfur (445° C.).

Figure 15:
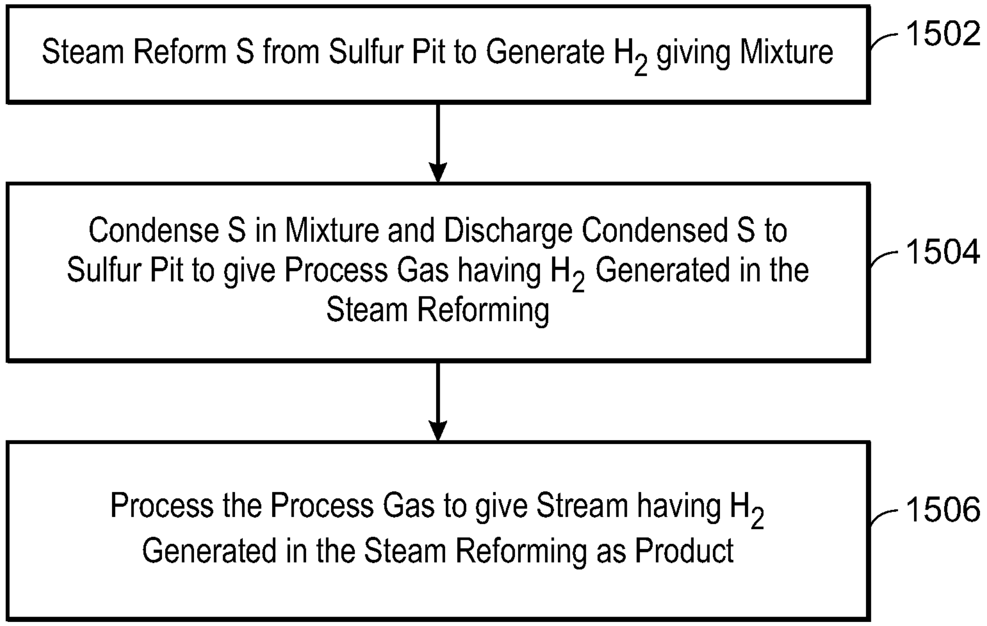
FIG. 15 is a block flow diagram of a method of producing hydrogen.

FIG. 15 is a method 1500 of producing hydrogen ($H_2$) gas. The method involves steam reforming elemental S to generate the $H_2$. The produced $H_2$ can be utilized in the transportation and energy sector. The produced $H_2$ can be feedstock for chemical processes, electrochemical processes, and the like. The elemental S reformed includes elemental S from a sulfur pit. As known by one of ordinary skill in the art, the sulfur pit in the present context is a sulfur receiver, which can include a receptacle, container, or vessel, and so on. The sulfur receiver or sulfur pit may be a storage vessel in which liquid sulfur is accumulated and stored. A sulfur pit may temporarily accommodate elemental S extracted from an SRU or similar system, and in which the elemental sulfur may then be conveyed from the sulfur pit for further processing or to transportation systems, and the like.

At block 1502, the method includes steam reforming elemental S, such as from a sulfur pit. A reaction in the steam reforming can include $2H_2O+S \rightarrow 2H_2+SO_2$. Therefore, $H_2$ gas and $SO_2$ are generated in the steam reforming. Additional reactions may occur. The steam reforming of the S may give a mixture including $H_2$ gas, $SO_2$, elemental S gas, and $H_2O$ vapor. The elemental S and $H_2O$ vapor in the mixture may be or include unreacted components from the steam reforming.

To perform (block 1502) (see, e.g., the systems in FIGS. 7A-8) the steam reforming, the method may include injecting the elemental sulfur from the sulfur pit into an intermediate zone (e.g., second zone) of a furnace (e.g., Claus furnace or Claus-type furnace), injecting water into the intermediate zone, performing the steam reforming in the intermediate zone, and discharging furnace exhaust gas from the furnace as the aforementioned mixture. The mixture may be discharged to a condenser. In implementations, the intermediate zone of the furnace can be characterized or labeled as a sulfur steam reformer (not stand-alone but integrated within the furnace). The method may include feeding oxygen gas and acid gas including hydrogen sulfide and carbon dioxide to the furnace for combustion in a first zone of the furnace. If so, the mixture discharged from the furnace may include carbon dioxide. Further, the method may include heating in the intermediate zone the elemental sulfur injected into the intermediate zone and the water injected into the intermediate zone by direct contact with combustion gas (furnace gas) from the first zone flowing into the intermediate zone. In implementations, the method 1500 of producing hydrogen can involve generally producing the hydrogen in a sulfur recovery unit (SRU) having the furnace.

To perform (block 1502) (see, e.g., the systems in FIGS. 9-14) the steam reforming, the method may include providing the elemental sulfur from the sulfur pit to a vessel that is a sulfur steam reformer, providing water to the vessel, performing the steam reforming of elemental sulfur in the vessel, and discharging from the vessel the mixture having $H_2$ gas, $SO_2$, elemental S gas, and $H_2O$ vapor. The mixture may be discharged to a condenser. The providing of the elemental sulfur may involve heating the elemental sulfur in an economizer (a heat exchanger) with heat from the mixture discharged from the vessel. If so, the method may include discharging the mixture from the vessel (sulfur steam reformer) through the economizer to the condenser (also a heat exchanger). The providing of the elemental sulfur (and the water) may involve heating the elemental sulfur (and the water) upstream of the vessel (sulfur steam reformer), wherein the heating includes heating the elemental sulfur (and the water) in an electric heater, a boiler, or a sulfur burner. The method (e.g., see the systems in FIGS. 9-12) may include providing oxygen gas and acid gas including hydrogen sulfide and carbon dioxide to a furnace, and discharging furnace exhaust gas (including $CO_2$) from the furnace to combine with the mixture flowing sulfur steam reformer to the condenser. In implementations, the method 1500 of producing hydrogen may be producing hydrogen in an SRU having the vessel (sulfur steam reformer) and the furnace (e.g., Claus furnace or Claus-type furnace).

At block 1504 (see, e.g., the systems in FIGS. 7A-14), the method includes condensing elemental sulfur gas in the mixture (from the steam reforming) in the condenser into liquid elemental sulfur, and discharging liquid elemental sulfur from the condenser, such as to the sulfur pit. The method includes discharging a process gas from the condenser, wherein the process gas includes $H_2$ gas and $SO_2$ generated in the steam reforming. The process gas generally does not include the liquid elemental sulfur discharged from the condenser to the sulfur pit.

At block 1506 (see, e.g., the systems in FIGS. 7A-14), the method includes processing the process gas to give a stream having the $H_2$ generated in the steam reforming as product. For instance (see, e.g., FIGS. 8, 11, 12, and 15), the method at block 1506 may include quenching the process gas in a quench tower with water to absorb $SO_2$ from the process gas into the water to discharge overhead from the quench tower a gas stream having hydrogen gas from the steam reforming as product. Such may be applied in conjunction with a reductive environment (excess $H_2S$) in the upstream steam reforming (block 1502) in certain implementations. In another embodiment (e.g., FIGS. 13A and 13B), the method at block 1506 may include hydrogenating the process gas to convert sulfur dioxide in the process gas into hydrogen sulfide to give a hydrogenated process gas (having $H_2$ generated in the upstream reforming), quenching the hydrogenated process gas with water to remove water vapor from the hydrogenated process gas, and absorbing hydrogen sulfide from the hydrogenated process gas into liquid amine to give a stream having $H_2$ generated in the steam reforming as product.

The method at block 1506 may include catalytic converting hydrogen sulfide and sulfur dioxide in the process gas into elemental S and removing elemental S to give a second process gas having $H_2$ generated in the steam reforming (block 1502). The method may include hydrogenating $SO_2$ in the second process gas into $H_2S$ to give a third process gas (hydrogenated process gas) having the $H_2S$ formed in the hydrogenating and $H_2$ generated in the steam reforming. The method may include quenching the third process gas with water to remove water vapor from the third process gas, and absorbing $H_2S$ from the third process gas into liquid amine to give a stream having $H_2$ generated in the steam reforming as product. In particular, the method may include: [1] quenching the third process gas with water in a quench tower to remove water vapor from the third process gas; [2] discharging an overhead gas from the quench tower to an absorber column, wherein the overhead gas includes the third process gas without the water vapor removed from the third process gas in the quench tower; [3] absorbing $H_2S$ from the overhead gas into liquid amine in the absorber column; and [4] discharging overhead from the absorber column a stream having $H_2S$ generated in the steam reforming (block 1502) as product. For block 1506, see, e.g., FIGS. 7A, 7B, 9A, 9B, 10A, and 10B FIG. 16 is an example of a system that implements amine treatment of sour gas, also known as amine scrubbing, gas sweetening (a gas sweetening unit), and $H_2S$ removal. The system may be a selective amine process that separates (removes) $H_2S$ from sour gas to give sweet gas. This amine treatment may be employed to treat SRU tail gas (Claus tail gas)

Figure 16:
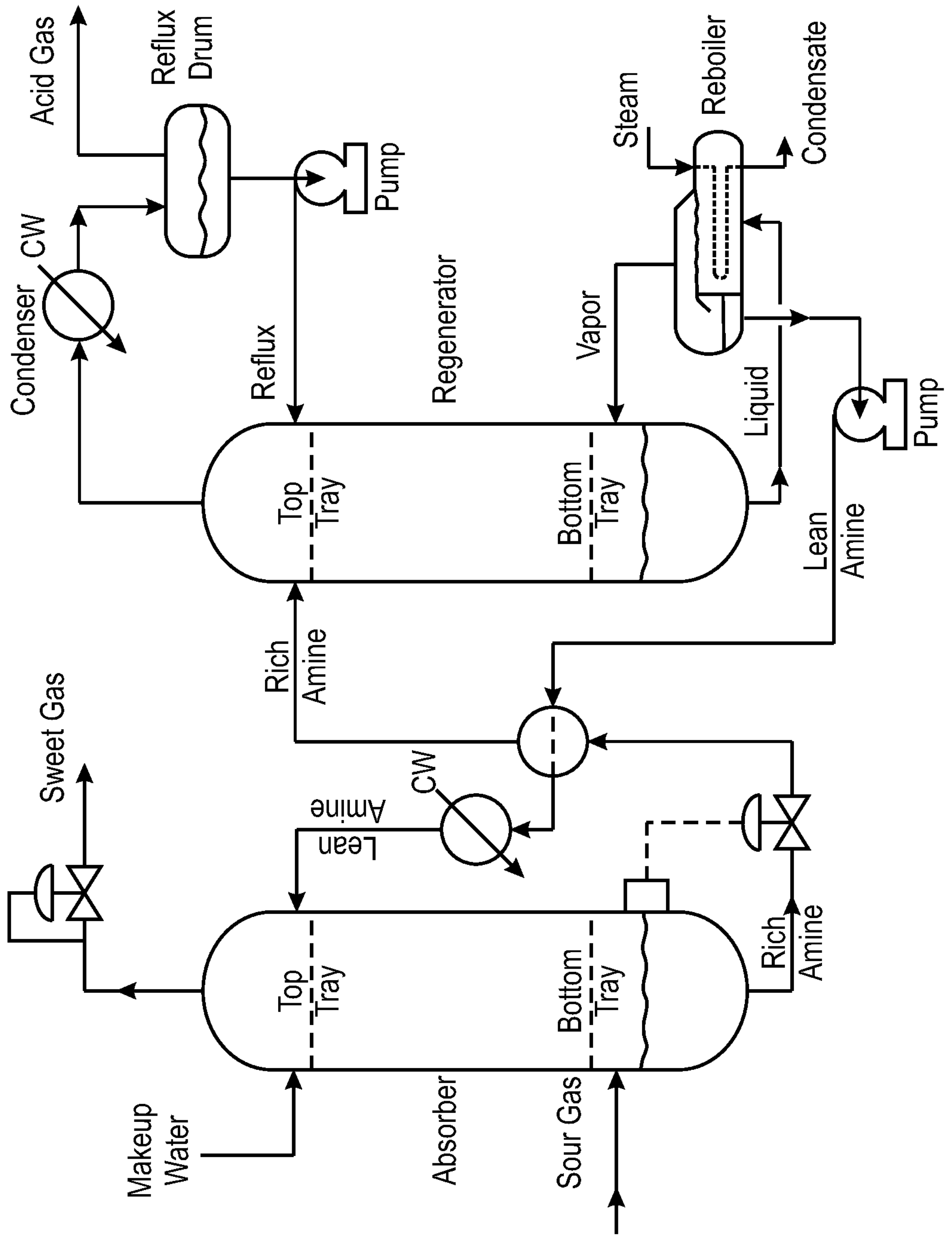
FIG. 16 is a diagram of a gas sweetening system that is a selective amine process.

FIG. 16 may be an example of a selective amine process that may be implemented in the hydrogen production systems of FIGS. 7B, 9B, 10B, and 13B. The absorber depicted in FIG. 16 may be analogous to the absorber 111, 311, 411, 711, and the regenerator depicted in FIG. 16 analogous to the regeneration column 115, 315, 415, 715.

The system depicted in FIG. 16 employs an aqueous solution of an alkylamine(s) (referred to as amine) to remove $H_2S$ from sour gas. A gas may be labeled as "sour" gas because of the presence of $H_2S$ in the gas. The depicted sour gas entering the system may be analogous to the overhead gas 138, 338, 438, 738 (a process gas having $H_2S$ and $H_2$) that discharges overhead from the quench tower 108, 338, 408, 708 in FIGS. 7B, 9B, 10B, and 13B.

Amines utilized in the gas sweetening unit (selective amine process) may include diethanolamine (DEA), monoethanolamine (MEA), methyldiethanolamine (MDEA), diisopropanolamine (DIPA), and aminoethoxyethanol (Diglycolamine) (DGA). Amines commonly employed are the alkanolamines DEA, MEA, and MDEA.

In the context of FIGS. 7B, 9B, 10B, and 13B, the gas (e.g., process gas) having $H_2$ and $H_2S$ (and $CO_2$) is treated in the sweetening unit of FIG. 16 to remove the $H_2S$. The resulting dissociated and ionized species being more soluble in solution are scrubbed by the amine solution and thus removed from the gas phase. At the outlet of the amine scrubber, the gas as sweetened is thus depleted in $H_2S$.

The chemistry in the amine treating may vary in particular with the amine. The absorption of $H_2S$ into liquid amine is well known, as well as widely used to remove selectively $H_2S$ in oil and gas industry before sending this $H_2S$ stream to SRU. As an example, for MDEA denoted as $CH_3R_2N$ with R: $—CH_2CH_2OH$, the acid-base reaction involves protonation of the amine electron pair to form a positively charged ammonium group $CH_3R_2NW$, and which can be represented by $CH_3R_2N+H_2S=CH_3R_2NH^++HS^-$.

There are also examples of the amine not being MDEA, for instance, as indicated in $CH_3R_2N+H_2CO_3=CH_3R_2NH^++HCO_3^-$ that is associated with absorbing $CO_2$ into the amine.

The chemical structure of the selective amine MDEA is not suited to form a carbamate, does not have a proton on the nitrogen, and can only sequester dissolved $CO_2$ (or carbonic acid) via deprotonation. Similarly, this amine will capture $H_2S$ via deprotonation. The rate of gas dissolution in amine solution ($H_2S$ being faster than $CO_2$) is large enough that, using the residence time and absorber temperature, the selective amine process can separate with high selectivity $H_2S$ from $CO_2$.

The system depicted in FIG. 16 is only an example a typical amine gas treating process and includes an absorber column and a regenerator distillation column. The sour gas enters a bottom portion of the absorber column (vessel) and flows upward through the absorber column. An aqueous solution of amine enters a top portion of the absorber column and flows downward through the absorber column in a countercurrent direction with respect to the sour gas flowing upward. This amine solution that enters the absorber column may be labeled as lean amine in having little or no $H_2S$. The absorber column may have trays as indicated, or may have packing, to provide surface area for contact of the lean amine with the sour gas and thus give mass transfer stages for absorption of acid gas from the sour gas into the lean amine. Sweet gas (e.g., analogous to intermediate product 140, 340, 440, 740) having little or no $H_2S$ discharges overhead from the absorber column for use or further processing. Rich amine (rich in $H_2S$ by having the $H_2S$ absorbed from the sour gas) discharges from a bottom portion of the absorber column. In the illustrated example, a liquid level of the rich amine solution may be maintained in the bottom portion of the absorber column via a control valve and a level sensor.

The rich amine may flow to the regenerator (regenerator distillation column) that removes the $H_2S$ from the rich amine to discharge the lean amine from a bottom portion of the regenerator. An overhead gas with removed H2S may discharge overhead from the regenerator and be partially condensed. Reflux may be sent via a reflux drum (vessel) and a reflux pump (e.g., centrifugal pump) to the regenerator. H2S (e.g., analogous the H2S 143, 343, 443, 743) may discharge from the system as gas from the vapor space of the reflux drum. The H2S may be sent, for instance, to a sulfur burner or an SRU (e.g., Claus process system) in which the H2S is converted to elemental sulfur. The lean amine discharges from a bottom portion of the regenerator. The regenerator includes a steam reboiler to vaporize a portion of the lean amine for return to the regenerator. The liquid amine is pumped through a cross exchanger (cooled by the rich amine) and a cooler heat exchanger (e.g., cooling water is cooling medium) for supply to the absorber column.

An embodiment is a method of producing hydrogen. The method includes steam reforming elemental sulfur from a sulfur pit, thereby generating hydrogen gas and sulfur dioxide, to give a mixture including hydrogen gas, sulfur dioxide, elemental sulfur gas, and water vapor. The steam reforming of elemental sulfur may be performed, for example, at a temperature in a range of 445° C. to 720° C. The method includes condensing elemental sulfur gas in the mixture in a condenser (heat exchanger) into liquid elemental sulfur and discharging liquid elemental sulfur from the condenser to the sulfur pit. The method includes discharging a process gas from the condenser, wherein the process gas includes hydrogen gas and sulfur dioxide generated in the steam reforming, and generally does not include the liquid elemental sulfur discharged from the condenser to the sulfur pit.

In implementations, the method may include quenching the process gas in a quench tower with water to absorb sulfur dioxide from the process gas into the water to discharge overhead from the quench tower a gas stream including hydrogen gas from the steam reforming as product.

In implementations, the method includes hydrogenating the process gas to convert sulfur dioxide in the process gas into hydrogen sulfide to give a hydrogenated process gas having hydrogen gas generated in the steam reforming as product, quenching the hydrogenated process gas with water to remove water vapor from the hydrogenated process gas, and absorbing hydrogen sulfide from the hydrogenated process gas into liquid amine to give a stream including hydrogen gas generated in the steam reforming as product.

In implementations, the method includes catalytic converting hydrogen sulfide and sulfur dioxide in the process gas into elemental sulfur and removing elemental sulfur to give a second process gas comprising hydrogen gas generated in the steam reforming. If so, the method may include hydrogenating sulfur dioxide in the second process gas into hydrogen sulfide to give a third process gas having the hydrogen sulfide formed in the hydrogenating and hydrogen gas generated in the steam reforming. The method may include quenching the third process gas with water to remove water vapor from the third process gas, and absorbing hydrogen sulfide from the third process gas into liquid amine to give a stream comprising hydrogen gas generated in the steam reforming as product. The method may include quenching the third process gas with water in a quench tower to remove water vapor from the third process gas, and discharging an overhead gas from the quench tower to an absorber column, the overhead gas including the third process gas without the water vapor removed from the third process gas in the quench tower, absorbing hydrogen sulfide from the overhead gas into liquid amine in the absorber column, and discharging overhead from the absorber column a stream comprising hydrogen gas generated in the steam reforming as product.

In implementations, the method includes injecting the elemental sulfur from the sulfur pit into an intermediate zone of a furnace and injecting water into the intermediate zone, wherein the steam reforming is performed in the intermediate zone, and discharging the mixture that is furnace exhaust gas from the furnace to the condenser. The method may include feeding oxygen gas and acid gas including hydrogen sulfide and carbon dioxide to the furnace for combustion in a first zone of the furnace, wherein the furnace exhaust gas thus includes carbon dioxide. The method may include heating the elemental sulfur injected into the intermediate zone and the water injected into the intermediate zone by direct contact with combustion gas from the first zone. In these implementations, the method of producing hydrogen may be producing hydrogen in a sulfur recovery unit (SRU) having the furnace.

In implementations, the method may include providing the elemental sulfur from the sulfur pit to a vessel that is a sulfur steam reformer and providing water to the vessel, wherein the steam reforming is performed in the vessel, and discharging the mixture from the vessel to the condenser. The providing of the elemental sulfur may involve heating the elemental sulfur in an economizer (heat exchanger) with heat from the mixture discharged from the vessel, and wherein discharging the mixture includes discharging the mixture from the vessel through the economizer to the condenser. The providing of the elemental sulfur may involve heating the elemental sulfur upstream of the vessel, wherein the heating includes heating the elemental sulfur in an electric heater, a boiler, or a sulfur burner. The providing of the water may involve heating the water upstream of the vessel, wherein the heating includes heating the water in an electric heater, a boiler, or a sulfur burner. The method may include providing oxygen gas and acid gas including hydrogen sulfide and carbon dioxide to a furnace, and discharging furnace exhaust gas from the furnace to combine with the mixture flowing to the condenser, wherein the furnace exhaust gas includes carbon dioxide. If so, the method of producing hydrogen may be producing hydrogen in a sulfur recovery unit (SRU) having the vessel and the furnace.

Another embodiment is a hydrogen production system including a vessel (e.g., furnace or stand-alone sulfur steam reformer) configured to receive elemental sulfur from a sulfur pit and steam reform the elemental sulfur into hydrogen gas and sulfur dioxide, and discharge a mixture having hydrogen gas, sulfur dioxide, elemental sulfur gas, and water vapor. The hydrogen production system includes a condenser heat exchanger to receive the mixture and condense elemental sulfur gas in the mixture into liquid elemental sulfur, and discharge liquid elemental sulfur to the sulfur pit and discharge a process gas having hydrogen gas and sulfur dioxide generated via steam reforming in the vessel.

In implementations, the hydrogen production system includes a quench tower to quench the process gas with water to remove water vapor from the process gas and discharge an overhead gas comprising hydrogen gas generated in the steam reforming to an absorber column as product.

In implementations, the hydrogen production system includes: [A] catalytic stages to convert hydrogen sulfide and sulfur dioxide in the process gas into elemental sulfur and remove elemental sulfur to give a second process gas having hydrogen gas generated in the steam reforming, wherein the catalytic stages each included a catalytic converter and a condenser heat exchanger; [B] a hydrogenation reactor to hydrogenate sulfur dioxide in the second process gas into hydrogen sulfide to give a third process gas comprising the hydrogen sulfide formed in the hydrogenation reactor and hydrogen gas generated in the steam reforming; [C] a quench tower to quench the third process gas with water to remove water vapor from the third process gas and discharge an overhead gas comprising hydrogen gas generated in the steam reforming to an absorber column; and [D] the absorber column configured to absorb hydrogen sulfide from the overhead gas from the quench tower into liquid amine to give an overhead stream from the absorber column comprising hydrogen gas from the steam reforming as product.

In implementations, the vessel is a furnace having an intermediate zone to receive the elemental sulfur and water to steam reform the elemental sulfur, wherein the furnace is configured to receive acid gas and oxygen gas for combustion in a first zone of the furnace and to heat the elemental sulfur and water in the intermediate zone with combustion gas from the first zone, and wherein the mixture discharged includes carbon dioxide. The hydrogen production system may be or include a SRU having the furnace and catalytic stages each including a catalytic reactor and a condenser heat exchanger, wherein a first catalytic stage of the catalytic stages is configured to receive the process gas.

In implementations, the vessel is a sulfur steam reformer that receives the elemental sulfur and water to steam reform the elemental sulfur and discharge the mixture to the condenser. The hydrogen production system may include an economizer that is a heat exchanger configured to receive the elemental sulfur from the sulfur pit and heat the elemental sulfur with heat from the mixture discharged from the sulfur steam reformer through the economizer to the condenser, wherein the economizer is configured to discharge the elemental sulfur as heated for the sulfur steam reformer. The hydrogen production system may include a heater operationally disposed between the sulfur pit and the sulfur steam reformer to heat the elemental sulfur upstream of the sulfur steam reformer, wherein the heater includes an electric heater, a boiler, or a sulfur burner. The hydrogen production system may include a furnace (in addition to the vessel) to receive acid gas and oxygen and discharge furnace exhaust gas to combine with the mixture flowing to the condenser, wherein the furnace exhaust gas includes carbon dioxide. The hydrogen production may be or include an SRU having the furnace and catalytic stages each comprising a catalytic reactor and a condenser heat exchanger, wherein a first catalytic stage of the catalytic stages is configured to receive the process gas.

A number of implementations have been described. Nevertheless, it will be understood that various modifications may be made without departing from the spirit and scope of the disclosure.

What is claimed is:

1. A method of producing hydrogen, comprising:

steam reforming elemental sulfur from a sulfur pit, thereby generating hydrogen gas and sulfur dioxide, to give a mixture comprising hydrogen gas, sulfur dioxide, elemental sulfur gas, and water vapor;

condensing the elemental sulfur gas in the mixture in a condenser into liquid elemental sulfur and discharging the liquid elemental sulfur from the condenser to the sulfur pit, wherein the condenser comprises a heat exchanger; and discharging a process gas from the condenser, wherein the process gas comprises the hydrogen gas and the sulfur dioxide generated in the steam reforming.

2. The method of claim 1, wherein the steam reforming of the elemental sulfur is performed at a temperature in a range of 445° C. to 720° C., and wherein the process gas does not comprise the liquid elemental sulfur discharged from the condenser to the sulfur pit.

3. The method of claim 1, comprising:

injecting the elemental sulfur from the sulfur pit into an intermediate zone of a furnace;

injecting water into the intermediate zone, wherein the steam reforming is performed in the intermediate zone; and discharging a mixture that is furnace exhaust gas from the furnace to the condenser.

4. The method of claim 3, comprising:

feeding oxygen gas and acid gas comprising hydrogen sulfide and carbon dioxide to the furnace for combustion in a first zone of the furnace; and heating the elemental sulfur injected into the intermediate zone and the water injected into the intermediate zone by direct contact with combustion gas from the first zone, wherein the furnace exhaust gas comprises carbon dioxide.

5. The method of claim 4, wherein the method of producing hydrogen comprises producing the hydrogen in a sulfur recovery unit (SRU) comprising the furnace.

6. The method of claim 1, comprising:

providing the elemental sulfur from the sulfur pit to a vessel that is a sulfur steam reformer;

providing water to the vessel, wherein the steam reforming is performed in the vessel; and discharging the mixture from the vessel to the condenser.

7. The method of claim 6, wherein providing the elemental sulfur comprises heating the elemental sulfur in an economizer comprising a heat exchanger with heat from the mixture discharged from the vessel, and wherein discharging the mixture comprises discharging the mixture from the vessel through the economizer to the condenser.

8. The method of claim 6, wherein providing the elemental sulfur comprises heating the elemental sulfur upstream of the vessel, and wherein the heating comprises heating the elemental sulfur in an electric heater, a boiler, or a sulfur burner.

9. The method of claim 6, wherein providing the water comprises heating the water upstream of the vessel, and wherein the heating comprises heating the water in an electric heater, a boiler, or a sulfur burner.

10. The method of claim 6, comprising:

providing oxygen gas and acid gas comprising hydrogen sulfide and carbon dioxide to a furnace; and discharging furnace exhaust gas from the furnace to combine with the mixture flowing to the condenser, wherein the furnace exhaust gas comprises carbon dioxide.

11. The method of claim 10, wherein the method of producing hydrogen comprises producing the hydrogen in a sulfur recovery unit (SRU) comprising the vessel and the furnace.

12. The method of claim 1, comprising quenching the process gas in a quench tower with water to absorb the sulfur dioxide from the process gas into the water to discharge overhead from the quench tower a gas stream comprising the hydrogen gas from the steam reforming as product.

13. The method of claim 1, comprising:

hydrogenating the process gas to convert the sulfur dioxide in the process gas into hydrogen sulfide to give a hydrogenated process gas comprising the hydrogen gas generated in the steam reforming as product;

quenching the hydrogenated process gas with water to remove water vapor from the hydrogenated process gas; and absorbing the hydrogen sulfide from the hydrogenated process gas into liquid amine to give a stream comprising the hydrogen gas generated in the steam reforming as product.

14. The method of claim 1, comprising:

catalytic converting hydrogen sulfide and the sulfur dioxide in the process gas into elemental sulfur and removing the elemental sulfur to give a second process gas comprising the hydrogen gas generated in the steam reforming; and hydrogenating the sulfur dioxide in the second process gas into hydrogen sulfide to give a third process gas comprising the hydrogen sulfide formed in the hydrogenating and the hydrogen gas generated in the steam reforming.

15. The method of claim 14, comprising quenching the third process gas with water to remove water vapor from the third process gas, and absorbing the hydrogen sulfide from the third process gas into liquid amine to give a stream comprising the hydrogen gas generated in the steam reforming as product.

16. The method of claim 14, comprising:

quenching the third process gas with water in a quench tower to remove water vapor from the third process gas;

discharging an overhead gas from the quench tower to an absorber column, the overhead gas comprising the third process gas without the water vapor removed from the third process gas in the quench tower;

absorbing hydrogen sulfide from the overhead gas into liquid amine in the absorber column; and discharging overhead from the absorber column a stream comprising hydrogen gas generated in the steam reforming as product.

* * * * *